(12) United States Patent
Haddock et al.

(10) Patent No.: US 11,616,468 B2
(45) Date of Patent: Mar. 28, 2023

(54) PV MODULE MOUNTING ASSEMBLY WITH CLAMP/STANDOFF ARRANGEMENT

(71) Applicant: RMH Tech LLC, Colorado Springs, CO (US)

(72) Inventors: Dustin M. M. Haddock, Colorado Springs, CO (US); Nikolaus Jo Holley, Colorado Springs, CO (US); Paul Benjamin Leitch, Colorado Springs, CO (US)

(73) Assignee: RMH Tech LLC, Colorado Springs, CO (US)

( * ) Notice: Subject to any disclaimer, the term of this patent is extended or adjusted under 35 U.S.C. 154(b) by 0 days.

(21) Appl. No.: 17/156,469

(22) Filed: Jan. 22, 2021

(65) Prior Publication Data

US 2021/0143771 A1 May 13, 2021

Related U.S. Application Data

(63) Continuation of application No. 16/360,923, filed on Mar. 21, 2019, now Pat. No. 10,903,785.

(60) Provisional application No. 62/645,963, filed on Mar. 21, 2018.

(51) Int. Cl.
*H02S 30/10* (2014.01)
*H02S 20/23* (2014.01)
*F16B 5/06* (2006.01)
*F16B 5/02* (2006.01)

(52) U.S. Cl.
CPC ............ *H02S 30/10* (2014.12); *F16B 5/0208* (2013.01); *F16B 5/0685* (2013.01); *H02S 20/23* (2014.12)

(58) Field of Classification Search
CPC ........ F16B 2/065; F16B 5/065; F16B 5/0685; F16B 5/0208; F24S 25/636; H02S 20/10; H02S 20/22; H02S 20/24; H02S 20/23; H02S 30/10
See application file for complete search history.

(56) References Cited

U.S. PATENT DOCUMENTS

| 42,992 A | 5/1864 | Howe |
| 97,316 A | 11/1869 | Rogers |
| 106,580 A | 8/1870 | Hathorn |
| 189,431 A | 4/1877 | Creighton |
| 224,608 A | 2/1880 | Rendle |

(Continued)

FOREIGN PATENT DOCUMENTS

| AT | 13076 | 8/1903 |
| AT | 26329 | 11/1906 |

(Continued)

OTHER PUBLICATIONS

"Ace Clamp Cut Sheet | 5031 Z1-2," Ace Clamp, Nov. 2018, 1 page.

(Continued)

*Primary Examiner* — Christopher Garft
(74) *Attorney, Agent, or Firm* — Sheridan Ross P.C.

(57) ABSTRACT

A mounting assembly for use in mid-grab and/or edge-grab applications may include a clamp secured to a stanchion by a clamping fastener. The mounting assembly may also include a mounting plate which may be secured to a mounting device by the stanchion. The mounting assembly may be used, for example, to secure photovoltaic modules (or other devices or structures) of varying heights to a roof or other building surface.

16 Claims, 52 Drawing Sheets

(56) References Cited

U.S. PATENT DOCUMENTS

| | | |
|---|---|---|
| 250,580 A | 12/1881 | Rogers |
| 332,413 A | 12/1885 | List |
| 386,316 A | 7/1888 | Hawthorne |
| 405,605 A | 6/1889 | Sagendorph |
| 407,772 A | 7/1889 | Curtis et al. |
| 446,217 A | 2/1891 | Dickelman |
| 459,876 A | 9/1891 | Powers |
| 472,014 A | 3/1892 | Densmore |
| 473,512 A | 4/1892 | Laird |
| 491,173 A | 2/1893 | Hayward |
| 507,776 A | 10/1893 | Berger et al. |
| 529,774 A | 11/1894 | Baird |
| 602,983 A | 4/1898 | Folsom |
| 733,697 A | 7/1903 | Chronik |
| 756,884 A | 4/1904 | Parry |
| 831,445 A | 9/1906 | Kosmatka |
| 881,757 A | 3/1908 | Winsor |
| 884,850 A | 4/1908 | Peter |
| 927,522 A | 7/1909 | Gery |
| 933,784 A | 9/1909 | Peter |
| 939,516 A | 11/1909 | Laird |
| 1,054,091 A | 2/1913 | Darnall |
| 1,085,474 A | 1/1914 | Peterson |
| 1,136,460 A | 4/1915 | Wright |
| 1,230,363 A | 6/1917 | Baird |
| 1,330,309 A | 2/1920 | Dixon |
| 1,399,461 A | 12/1921 | Childs |
| 1,463,065 A | 7/1923 | Sieger |
| 1,465,042 A | 8/1923 | Hruska |
| 1,477,088 A | 12/1923 | Turner |
| 1,511,529 A | 10/1924 | Standlee |
| 1,620,428 A | 3/1927 | Becker |
| 1,735,927 A | 11/1929 | Shaffer |
| 1,735,937 A | 11/1929 | Shaffer |
| 1,893,481 A * | 1/1933 | Adams .............. A47B 3/12 52/584.1 |
| 1,946,862 A | 2/1934 | Koch, Jr. |
| 1,957,933 A | 5/1934 | Brandl |
| 2,079,768 A | 5/1937 | Levow |
| 2,150,497 A | 3/1939 | Fernberg |
| 2,183,008 A | 12/1939 | Camp |
| 2,183,844 A | 12/1939 | Murphy |
| 2,192,720 A | 3/1940 | Tapman |
| 2,201,320 A | 5/1940 | Place |
| 2,250,401 A | 7/1941 | Sylvester |
| 2,274,010 A | 2/1942 | Stellin |
| 2,340,692 A | 2/1944 | Ridd |
| 2,429,833 A | 10/1947 | Luce |
| 2,443,362 A | 6/1948 | Tinnerman |
| 2,448,752 A | 9/1948 | Wagner |
| 2,457,250 A | 12/1948 | Macomber |
| 2,472,586 A | 6/1949 | Harvey |
| 2,504,776 A | 4/1950 | Woodfield et al. |
| 2,525,217 A | 10/1950 | Glitsch |
| 2,574,007 A | 11/1951 | Anderson |
| 2,658,247 A | 11/1953 | Heuer |
| 2,714,037 A | 7/1955 | Singer et al. |
| 2,730,381 A | 1/1956 | Curtiss |
| 2,740,027 A | 3/1956 | Budd et al. |
| 2,808,491 A | 10/1957 | Rhee et al. |
| 2,810,173 A | 10/1957 | Bearden |
| 2,875,805 A | 3/1959 | Flora |
| 2,985,174 A | 5/1961 | Guth |
| 3,039,161 A | 6/1962 | Gagnon |
| 3,064,772 A | 11/1962 | Clay |
| 3,095,672 A | 7/1963 | Di Tullio |
| 3,112,016 A | 11/1963 | Peterson |
| 3,136,206 A | 6/1964 | Adams |
| 3,194,524 A | 7/1965 | Trumbull |
| 3,221,467 A | 12/1965 | Henkels |
| 3,231,076 A | 1/1966 | Frieman |
| 3,232,393 A | 2/1966 | Atwwod |
| 3,232,573 A | 2/1966 | Berman |
| 3,242,620 A | 3/1966 | Kaiser |
| 3,247,316 A | 4/1966 | Weimer, Jr. |
| 3,288,409 A | 11/1966 | Bethea, Jr. |
| 3,296,750 A | 1/1967 | Zaleski |
| 3,298,653 A | 1/1967 | Omholt |
| 3,301,513 A | 1/1967 | Masao |
| 3,307,235 A | 3/1967 | Hennings |
| 3,318,057 A | 5/1967 | Norsworthy |
| 3,333,799 A | 8/1967 | Peterson |
| 3,335,995 A | 8/1967 | Pickles |
| 3,341,909 A | 9/1967 | Havener |
| 3,363,864 A | 1/1968 | Olgreen |
| 3,394,524 A | 7/1968 | Howarth |
| 3,425,127 A | 2/1969 | Long |
| 3,482,369 A | 12/1969 | Burke |
| 3,495,363 A | 2/1970 | Johnson |
| 3,496,691 A | 2/1970 | Seaburg et al. |
| 3,503,244 A | 3/1970 | Joslin |
| 3,523,709 A | 8/1970 | Heggy et al. |
| 3,527,619 A | 9/1970 | Miley |
| 3,565,380 A | 2/1971 | Langren |
| 3,572,623 A | 3/1971 | Lapp |
| 3,590,543 A | 7/1971 | Heirich |
| 3,656,747 A | 4/1972 | Revell, Jr. et al. |
| 3,667,182 A | 6/1972 | Stemler |
| 3,667,185 A | 6/1972 | Maurer |
| 3,715,705 A | 2/1973 | Kuo |
| 3,719,919 A | 3/1973 | Tibolla |
| 3,753,326 A | 8/1973 | Kaufman, Sr. |
| 3,778,537 A | 12/1973 | Miller |
| 3,792,560 A | 2/1974 | Naylor |
| 3,809,799 A | 5/1974 | Taylor |
| 3,810,069 A | 5/1974 | Jaconette, Jr. |
| 3,817,270 A | 6/1974 | Ehrens et al. |
| 3,824,664 A | 7/1974 | Seeff |
| 3,845,601 A | 11/1974 | Kostecky |
| 3,861,098 A | 1/1975 | Schaub |
| 3,904,161 A | 9/1975 | Scott |
| 3,914,001 A | 10/1975 | Nelson et al. |
| 3,921,253 A | 11/1975 | Nelson |
| 3,960,352 A | 6/1976 | Plattner et al. |
| 3,986,746 A | 10/1976 | Chartier |
| 4,001,474 A | 1/1977 | Hereth |
| 4,007,574 A | 2/1977 | Riddell |
| 4,018,538 A | 4/1977 | Smyrni et al. |
| 4,034,532 A | 7/1977 | Reinwall, Jr. |
| 4,051,289 A | 9/1977 | Adamson |
| 4,127,975 A | 12/1978 | Judkins |
| 4,130,970 A | 12/1978 | Cable |
| 4,141,182 A | 2/1979 | McMullen |
| 4,147,257 A | 4/1979 | Zippel |
| 4,162,595 A | 7/1979 | Ramos et al. |
| 4,162,755 A | 7/1979 | Bott |
| 4,189,882 A | 2/1980 | Harrison et al. |
| 4,189,891 A | 2/1980 | Johnson et al. |
| 4,200,107 A | 4/1980 | Reid |
| 4,203,646 A | 5/1980 | Desso et al. |
| 4,215,677 A | 8/1980 | Erickson |
| 4,223,053 A | 9/1980 | Brogan |
| 4,252,458 A | 2/1981 | Keen |
| 4,261,338 A | 4/1981 | McAlister |
| 4,261,384 A | 4/1981 | Dahlbring |
| 4,263,474 A | 4/1981 | Tennant |
| 4,270,721 A | 6/1981 | Mainor, Jr. |
| 4,291,934 A | 9/1981 | Kund |
| 4,307,976 A | 12/1981 | Butler |
| 4,321,416 A | 3/1982 | Tennant |
| 4,351,140 A | 9/1982 | Simpson |
| 4,358,916 A | 11/1982 | Lacasse |
| 4,366,656 A | 1/1983 | Simpson |
| 4,393,859 A | 7/1983 | Marossy et al. |
| 4,449,335 A | 5/1984 | Fahey |
| 4,456,321 A | 6/1984 | Jones et al. |
| 4,461,514 A | 7/1984 | Schwarz |
| 4,467,582 A | 8/1984 | Hague |
| 4,475,776 A | 10/1984 | Teramachi |
| 4,546,586 A | 10/1985 | Knudson |
| 4,560,224 A | 12/1985 | Weisenburger |
| 4,567,706 A | 2/1986 | Wendt |
| 4,570,405 A | 2/1986 | Knudson |
| 4,588,240 A | 5/1986 | Ruehl et al. |

(56) References Cited

U.S. PATENT DOCUMENTS

| | | |
|---|---|---|
| 4,593,877 A | 6/1986 | van der Wyk |
| 4,601,600 A | 7/1986 | Karlsson |
| 4,656,794 A | 4/1987 | Thevenin et al. |
| 4,666,116 A | 5/1987 | Lloyd |
| 4,674,252 A | 6/1987 | Nicholas et al. |
| 4,682,454 A | 7/1987 | Simpson |
| 4,686,809 A | 8/1987 | Skelton |
| 4,701,586 A | 10/1987 | Hagberg |
| 4,704,058 A | 11/1987 | Crunwell |
| 4,753,425 A | 6/1988 | Yang |
| 4,773,791 A | 9/1988 | Hartkorn |
| 4,782,642 A | 11/1988 | Conville |
| 4,799,444 A | 1/1989 | Lisowski |
| 4,805,364 A | 2/1989 | Smolik |
| 4,809,476 A | 3/1989 | Satchell |
| 4,810,573 A | 3/1989 | Harriett |
| 4,835,927 A | 6/1989 | Michlovic |
| 4,840,529 A | 6/1989 | Phillips |
| 4,848,858 A | 7/1989 | Suzuki |
| 4,854,096 A | 8/1989 | Smolik |
| 4,878,331 A | 11/1989 | Taylor |
| 4,895,338 A | 1/1990 | Froutzis |
| 4,901,963 A | 2/1990 | Yoder |
| 4,905,444 A | 3/1990 | Semaan |
| 4,909,011 A | 3/1990 | Freeman et al. |
| 4,949,929 A | 8/1990 | Kesselman et al. |
| 4,961,712 A | 10/1990 | Schwenk et al. |
| 4,970,833 A | 11/1990 | Porter |
| 4,987,699 A | 1/1991 | Gold |
| 4,991,368 A | 2/1991 | Amstutz |
| 5,007,612 A | 4/1991 | Manfre |
| 5,019,111 A | 5/1991 | Dempsey et al. |
| 5,036,949 A | 8/1991 | Crocker et al. |
| 5,039,352 A | 8/1991 | Mueller |
| 5,092,939 A | 3/1992 | Nath et al. |
| 5,094,435 A | 3/1992 | Depperman |
| 5,118,571 A | 6/1992 | Petersen |
| 5,119,612 A | 6/1992 | Taylor et al. |
| 5,125,608 A | 6/1992 | McMaster et al. |
| 5,127,205 A | 7/1992 | Eidson |
| 5,138,820 A | 8/1992 | Pearce |
| 5,140,793 A | 8/1992 | Knudson |
| 5,152,107 A | 10/1992 | Strickert |
| 5,164,020 A | 11/1992 | Wagner et al. |
| 5,176,462 A | 1/1993 | Chen |
| 5,187,911 A | 2/1993 | Cotter |
| 5,213,300 A | 5/1993 | Rees |
| 5,222,340 A | 6/1993 | Bellem |
| 5,224,427 A | 7/1993 | Riches et al. |
| 5,228,248 A | 7/1993 | Haddock |
| 5,251,993 A | 10/1993 | Sigourney |
| 5,268,038 A | 12/1993 | Riermeier et al. |
| 5,271,194 A | 12/1993 | Drew |
| 5,277,006 A | 1/1994 | Ruster |
| 5,282,340 A | 2/1994 | Cline et al. |
| 5,287,670 A | 2/1994 | Funaki |
| 5,290,366 A | 3/1994 | Riermeier et al. |
| 5,307,601 A | 5/1994 | McCracken |
| 5,312,079 A | 5/1994 | Little, Jr. |
| 5,313,752 A | 5/1994 | Hatzinikolas |
| D347,701 S | 6/1994 | McCracken |
| 5,352,154 A | 10/1994 | Rotter et al. |
| 5,356,519 A | 10/1994 | Grabscheid et al. |
| 5,356,705 A | 10/1994 | Kelch et al. |
| D351,989 S | 11/1994 | Cline et al. |
| 5,363,624 A | 11/1994 | Cotter |
| 5,379,567 A | 1/1995 | Vahey |
| 5,390,453 A | 2/1995 | Untiedt |
| 5,392,574 A | 2/1995 | Sayers |
| 5,408,797 A | 4/1995 | Bellem |
| 5,409,549 A | 4/1995 | Mori |
| 5,413,063 A | 5/1995 | King |
| 5,413,397 A | 5/1995 | Gold |
| 5,417,028 A | 5/1995 | Meyer |
| 5,425,209 A | 6/1995 | Funaki |
| 5,426,906 A | 6/1995 | McCracken |
| 5,439,307 A | 8/1995 | Steinhilber |
| 5,453,027 A | 9/1995 | Buell et al. |
| D364,338 S | 11/1995 | Cline |
| 5,479,752 A | 1/1996 | Menegoli |
| 5,482,234 A | 1/1996 | Lyon |
| 5,483,772 A | 1/1996 | Haddock |
| 5,483,782 A | 1/1996 | Hall |
| 5,491,931 A | 2/1996 | Haddock |
| 5,497,591 A | 3/1996 | Nelson |
| 5,522,185 A | 6/1996 | Cline |
| 5,533,839 A | 7/1996 | Shimada |
| D372,421 S | 8/1996 | Cline |
| 5,557,903 A | 9/1996 | Haddock |
| 5,571,338 A | 11/1996 | Kadonome et al. |
| 5,596,858 A | 1/1997 | Jordan |
| 5,596,859 A | 1/1997 | Horton et al. |
| 5,598,785 A | 2/1997 | Zaguroli, Jr. |
| 5,600,971 A | 2/1997 | Suk |
| D378,343 S | 3/1997 | Macor |
| 5,609,326 A | 3/1997 | Stearns et al. |
| 5,613,328 A | 3/1997 | Alley |
| 5,640,812 A | 6/1997 | Crowley et al. |
| 5,647,178 A | 7/1997 | Cline |
| 5,660,008 A | 8/1997 | Bevilacqua |
| 5,664,750 A | 9/1997 | Cohen |
| 5,667,181 A | 9/1997 | van Leeuwen et al. |
| 5,681,191 A | 10/1997 | Robicheau et al. |
| 5,688,131 A | 11/1997 | Byfield, Jr. |
| D387,443 S | 12/1997 | Blankenbiller |
| 5,694,721 A | 12/1997 | Haddock |
| 5,697,197 A | 12/1997 | Simpson |
| 5,715,640 A | 2/1998 | Haddock |
| 5,732,513 A | 3/1998 | Alley |
| 5,743,063 A | 4/1998 | Boozer |
| 5,743,497 A | 4/1998 | Michael |
| 5,746,029 A | 5/1998 | Ullman |
| 5,755,824 A | 5/1998 | Blechschmidt et al. |
| 5,765,310 A | 6/1998 | Gold |
| 5,765,329 A | 6/1998 | Huang |
| 5,787,653 A | 8/1998 | Sakai et al. |
| 5,794,386 A | 8/1998 | Klein |
| 5,809,703 A | 9/1998 | Kelly |
| 5,826,379 A | 10/1998 | Curry |
| 5,826,390 A | 10/1998 | Sacks |
| 5,828,008 A | 10/1998 | Lockwood et al. |
| 5,829,723 A | 11/1998 | Brunner et al. |
| 5,842,318 A | 12/1998 | Bass et al. |
| 5,890,340 A | 4/1999 | Kafarowski |
| 5,897,088 A | 4/1999 | Kirschner |
| 5,901,507 A | 5/1999 | Smeja et al. |
| 5,942,046 A | 8/1999 | Kahlfuss et al. |
| 5,970,586 A | 10/1999 | Demel et al. |
| 5,983,588 A | 11/1999 | Haddock |
| 5,994,640 A | 11/1999 | Bansemir et al. |
| 5,997,368 A | 12/1999 | Mello et al. |
| 6,029,415 A | 2/2000 | Culpepper et al. |
| 6,073,410 A | 6/2000 | Schimpf et al. |
| 6,073,920 A | 6/2000 | Colley |
| 6,079,678 A | 6/2000 | Schott et al. |
| 6,083,010 A | 7/2000 | Daoud |
| 6,088,979 A | 7/2000 | Neal |
| 6,095,462 A | 8/2000 | Morgan |
| 6,099,203 A | 8/2000 | Landes |
| 6,105,317 A | 8/2000 | Tomiuchi et al. |
| 6,106,310 A | 8/2000 | Davis et al. |
| 6,111,189 A | 8/2000 | Garvison et al. |
| 6,119,317 A | 9/2000 | Pfister |
| 6,132,070 A | 10/2000 | Vosika et al. |
| 6,158,180 A | 12/2000 | Edwards |
| 6,164,033 A | 12/2000 | Haddock |
| 6,182,403 B1 | 2/2001 | Mimura et al. |
| 6,186,799 B1 | 2/2001 | Mello |
| 6,206,991 B1 | 3/2001 | Starr |
| 6,223,477 B1 | 5/2001 | Alley |
| 6,237,297 B1 | 5/2001 | Paroly |
| 6,253,496 B1 | 7/2001 | Gilchrist |
| 6,256,934 B1 | 7/2001 | Alley |
| 6,269,596 B1 | 8/2001 | Ohtsuka et al. |

(56) References Cited

U.S. PATENT DOCUMENTS

| | | | |
|---|---|---|---|
| 6,276,285 B1 | 8/2001 | Ruch |
| 6,320,114 B1 | 11/2001 | Kuechler |
| 6,336,616 B1 | 1/2002 | Lin |
| 6,360,491 B1 | 3/2002 | Ullman |
| 6,364,262 B1 | 4/2002 | Gibson et al. |
| 6,364,374 B1 | 4/2002 | Noone et al. |
| 6,370,828 B1 | 4/2002 | Genschorek |
| 6,382,569 B1 | 5/2002 | Schattner et al. |
| 6,385,914 B2 | 5/2002 | Alley |
| 6,393,796 B1 | 5/2002 | Goettl et al. |
| 6,443,680 B1 | 9/2002 | Bodin |
| 6,453,623 B1 | 9/2002 | Nelson et al. |
| 6,470,629 B1 | 10/2002 | Haddock |
| 6,497,080 B1 | 12/2002 | Malcolm |
| 6,499,259 B1 | 12/2002 | Hockman |
| 6,508,442 B1 | 1/2003 | Dolez |
| 6,521,821 B2 | 2/2003 | Makita et al. |
| 6,534,702 B1 | 3/2003 | Makita et al. |
| 6,536,166 B1 | 3/2003 | Alley |
| 6,536,729 B1 | 3/2003 | Haddock |
| 6,576,830 B2 | 6/2003 | Nagao et al. |
| 6,602,016 B2 | 8/2003 | Eckart et al. |
| 6,622,441 B2 | 9/2003 | Miller |
| 6,637,671 B2 | 10/2003 | Alley |
| 6,647,671 B1 | 11/2003 | Alley |
| 6,655,633 B1 | 12/2003 | Chapman, Jr. |
| 6,665,991 B2 | 12/2003 | Hasan |
| 6,688,047 B1 | 2/2004 | McNichol |
| D487,595 S | 3/2004 | Sherman |
| 6,715,256 B1 | 4/2004 | Fischer |
| 6,718,718 B2 | 4/2004 | Haddock |
| 6,725,623 B1 | 4/2004 | Riddell et al. |
| 6,730,841 B2 | 5/2004 | Heckeroth |
| 6,732,982 B1 | 5/2004 | Messinger |
| 6,751,919 B2 | 6/2004 | Calixto |
| D495,595 S | 9/2004 | Dressler |
| D496,738 S | 9/2004 | Sherman |
| 6,799,742 B2 | 10/2004 | Nakamura et al. |
| 6,834,466 B2 | 12/2004 | Trevorrow et al. |
| 6,918,217 B2 | 7/2005 | Jakob-Bamberg et al. |
| 6,918,727 B2 | 7/2005 | Huang |
| 6,922,948 B2 | 8/2005 | Smeja et al. |
| 6,967,278 B2 | 11/2005 | Hatsukaiwa et al. |
| 7,012,188 B2 | 3/2006 | Erling |
| 7,013,612 B2 | 3/2006 | Haddock |
| 7,063,763 B2 | 6/2006 | Chapman, Jr. |
| 7,100,338 B2 | 9/2006 | Haddock |
| 7,104,020 B1 | 9/2006 | Suttle |
| 7,127,852 B1 | 10/2006 | Dressler |
| 7,191,794 B2 | 3/2007 | Hodges |
| 7,195,513 B1 | 3/2007 | Gherardini |
| 7,219,863 B1 | 5/2007 | Collett, II |
| 7,240,770 B2 | 7/2007 | Mullins et al. |
| 7,260,918 B2 | 8/2007 | Liebendorfer |
| 7,281,695 B2 | 10/2007 | Jordan |
| 7,386,922 B1 | 6/2008 | Taylor et al. |
| 7,406,924 B1 | 8/2008 | Impey |
| 7,410,139 B1 | 8/2008 | Rorich |
| 7,431,252 B2 | 10/2008 | Birli et al. |
| 7,435,134 B2 | 10/2008 | Lenox |
| 7,451,573 B2 | 11/2008 | Orszulak et al. |
| 7,458,555 B2 | 12/2008 | Mastropaolo et al. |
| 7,459,196 B2 | 12/2008 | Sturm |
| 7,469,511 B2 | 12/2008 | Wobber |
| 7,493,730 B2 | 2/2009 | Fennell, Jr. |
| 7,513,080 B1 | 4/2009 | Showalter |
| 7,516,580 B2 | 4/2009 | Fennell, Jr. |
| 7,568,871 B2 | 8/2009 | Chopp, Jr. et al. |
| 7,578,711 B2 | 8/2009 | Robinson |
| 7,600,349 B2 | 10/2009 | Liebendorfer |
| 7,658,356 B1 | 2/2010 | Nehls |
| 7,686,625 B1 | 3/2010 | Dyer et al. |
| 7,703,256 B2 | 4/2010 | Haddock |
| 7,707,800 B2 | 5/2010 | Kannisto |
| 7,712,278 B2 | 5/2010 | Lonardi |
| 7,721,492 B2 | 5/2010 | Plaisted et al. |
| 7,731,138 B2 | 6/2010 | Wiesner et al. |
| 7,733,667 B2 * | 6/2010 | Qin ................. H05K 13/00 361/742 |
| 7,758,003 B2 | 7/2010 | Pourtier et al. |
| 7,758,011 B2 | 7/2010 | Haddock |
| 7,762,027 B1 | 7/2010 | Wentworth et al. |
| 7,766,292 B2 | 8/2010 | Liebendorfer |
| 7,780,472 B2 | 8/2010 | Lenox |
| 7,788,874 B2 | 9/2010 | Miller |
| 7,788,879 B2 | 9/2010 | Brandes et al. |
| 7,824,191 B1 | 11/2010 | Browder |
| 7,827,920 B2 | 11/2010 | Beck et al. |
| 7,845,127 B2 | 12/2010 | Brescia |
| 7,847,181 B2 | 12/2010 | Brescia |
| 7,861,480 B2 | 1/2011 | Wendelburg et al. |
| 7,861,485 B1 | 1/2011 | Wentworth et al. |
| 7,874,117 B1 | 1/2011 | Simpson |
| 7,891,618 B2 | 2/2011 | Carnevali |
| 7,895,808 B1 | 3/2011 | Wentworth et al. |
| 7,905,064 B1 | 3/2011 | Wentworth et al. |
| 7,915,519 B2 | 3/2011 | Kobayashi |
| 7,926,777 B2 | 4/2011 | Koesema, Jr. |
| 7,954,287 B2 | 6/2011 | Bravo et al. |
| 7,988,464 B2 | 8/2011 | Kossak et al. |
| 8,011,153 B2 | 9/2011 | Orchard |
| 8,066,200 B2 | 11/2011 | Hepner et al. |
| 8,070,119 B2 | 12/2011 | Taylor |
| 8,092,129 B2 | 1/2012 | Wiley et al. |
| 8,096,503 B2 | 1/2012 | Verweyen |
| 8,109,048 B2 | 2/2012 | West |
| 8,146,299 B2 | 4/2012 | Stearns et al. |
| 8,151,522 B2 | 4/2012 | Stearns et al. |
| 8,153,700 B2 | 4/2012 | Stearns et al. |
| D658,977 S | 5/2012 | Riddell et al. |
| 8,226,061 B2 | 7/2012 | Nehls |
| 8,251,326 B2 | 8/2012 | McPheeters |
| 8,272,172 B2 | 9/2012 | Li |
| 8,294,026 B2 | 10/2012 | Wang et al. |
| 8,312,678 B1 | 11/2012 | Haddock |
| 8,316,590 B2 | 11/2012 | Cusson |
| 8,316,621 B2 | 11/2012 | Safari Kermanshahi et al. |
| D674,513 S | 1/2013 | Liu |
| 8,344,239 B2 * | 1/2013 | Plaisted ................. F24S 25/636 136/251 |
| 8,347,572 B2 | 1/2013 | Piedmont |
| 8,375,654 B1 | 2/2013 | West et al. |
| 8,387,319 B1 | 3/2013 | Gilles-Gagnon et al. |
| 8,404,963 B2 | 3/2013 | Kobayashi |
| 8,407,895 B2 | 4/2013 | Hartelius et al. |
| 8,413,946 B2 | 4/2013 | Hartelius et al. |
| 8,424,821 B2 | 4/2013 | Liu |
| 8,430,372 B2 | 4/2013 | Haddock |
| 8,448,405 B2 * | 5/2013 | Schaefer ................. E04D 13/00 52/60 |
| 8,453,986 B2 | 6/2013 | Schnitzer |
| 8,458,967 B2 | 6/2013 | Kalkanoglu et al. |
| 8,495,997 B1 | 7/2013 | Laubach |
| 8,505,254 B2 | 8/2013 | Welter et al. |
| 8,528,888 B2 | 9/2013 | Header |
| 8,584,424 B2 | 11/2013 | Smith |
| 8,590,223 B2 | 11/2013 | Kilgore et al. |
| 8,627,617 B2 * | 1/2014 | Haddock ................. H02S 20/23 52/173.3 |
| D699,176 S | 2/2014 | Salomon et al. |
| 8,640,402 B1 | 2/2014 | Bilge |
| 8,656,649 B2 | 2/2014 | Haddock |
| 8,683,751 B2 | 4/2014 | Stearns |
| 8,695,290 B1 | 4/2014 | Kim et al. |
| 8,701,354 B2 | 4/2014 | Stearns et al. |
| 8,713,881 B2 | 5/2014 | DuPont et al. |
| 8,733,027 B1 | 5/2014 | Marston et al. |
| 8,745,935 B2 | 6/2014 | DuPont et al. |
| 8,752,338 B2 | 6/2014 | Schaefer et al. |
| 8,756,870 B2 | 6/2014 | Teller et al. |
| 8,770,885 B2 | 7/2014 | Myers |
| 8,776,456 B1 | 7/2014 | Schrock |
| 8,782,983 B2 | 7/2014 | Stearns |
| 8,791,611 B2 | 7/2014 | Arnould et al. |

(56) References Cited

U.S. PATENT DOCUMENTS

| | | |
|---|---|---|
| 8,806,813 B2 | 8/2014 | Plaisted et al. |
| 8,806,815 B1 | 8/2014 | Liu et al. |
| 8,813,441 B2 | 8/2014 | Rizzo |
| 8,826,163 B1 | 9/2014 | Chanin et al. |
| 8,826,618 B2 | 9/2014 | Stearns |
| 8,829,330 B2 | 9/2014 | Meyer et al. |
| 8,833,714 B2 | 9/2014 | Haddock et al. |
| 8,839,573 B2 | 9/2014 | Cusson et al. |
| 8,839,575 B1 | 9/2014 | Liu et al. |
| 8,844,234 B2 | 9/2014 | Haddock et al. |
| 8,850,754 B2 | 10/2014 | Rizzo |
| 8,854,829 B1 | 10/2014 | Bopp et al. |
| 8,888,431 B2 | 11/2014 | Haney |
| 8,893,441 B1 | 11/2014 | Hess, III et al. |
| 8,894,424 B2 | 11/2014 | DuPont |
| D718,703 S | 12/2014 | Rizzo |
| D718,704 S | 12/2014 | Rizzo |
| 8,910,928 B2 | 12/2014 | Header |
| 8,925,263 B2 | 1/2015 | Haddock et al. |
| 8,935,893 B2 | 1/2015 | Liu et al. |
| 8,938,932 B1 | 1/2015 | Wentworth et al. |
| 8,950,157 B1 | 2/2015 | Schrock |
| 8,955,259 B2 | 2/2015 | Hemingway |
| 8,966,833 B2 | 3/2015 | Ally |
| 8,991,065 B1 | 3/2015 | Schrock |
| 9,003,728 B2 | 4/2015 | Asci |
| 9,003,733 B1 | 4/2015 | Simpson et al. |
| 9,010,042 B2 | 4/2015 | Anderson et al. |
| 9,011,034 B2 | 4/2015 | Liu |
| 9,052,123 B2 | 6/2015 | Anderson et al. |
| 9,065,191 B2 | 6/2015 | Martin et al. |
| 9,076,899 B2 | 7/2015 | Schrock |
| 9,085,900 B2 | 7/2015 | Haddock |
| 9,086,185 B2 | 7/2015 | Haddock |
| 9,097,443 B2 | 8/2015 | Liu et al. |
| 9,127,451 B1 | 9/2015 | Boor |
| 9,134,044 B2 | 9/2015 | Stearns et al. |
| 9,147,785 B2 | 9/2015 | Haddock et al. |
| D740,113 S | 10/2015 | Olenick |
| 9,200,456 B2 | 12/2015 | Murphy |
| 9,222,263 B2 | 12/2015 | Haddock |
| 9,223,907 B2 | 12/2015 | Chanin et al. |
| 9,306,490 B2 | 4/2016 | Haddock et al. |
| 9,309,910 B2 | 4/2016 | Anderson et al. |
| 9,331,629 B2 | 5/2016 | Cheung et al. |
| 9,341,285 B2 | 5/2016 | Magno, Jr. et al. |
| 9,447,988 B2 | 9/2016 | Stearns et al. |
| 9,473,066 B2 | 10/2016 | Stehan et al. |
| 9,479,110 B2 | 10/2016 | Patton et al. |
| 9,496,697 B1 | 11/2016 | Wentworth |
| 9,530,916 B2 | 12/2016 | Haddock et al. |
| 9,534,390 B2 | 1/2017 | Pendley et al. |
| 9,608,559 B2 | 3/2017 | Haddock et al. |
| 9,611,652 B2 | 4/2017 | Haddock et al. |
| 9,647,433 B2 | 5/2017 | Meine |
| 9,647,607 B2 | 5/2017 | Patton et al. |
| 9,689,411 B2 | 6/2017 | Meine et al. |
| 9,712,106 B2 | 7/2017 | Wentworth et al. |
| 9,714,670 B2 | 7/2017 | Header |
| 9,722,532 B2 | 8/2017 | Almy |
| 9,732,512 B2 | 8/2017 | Haddock |
| 9,742,173 B2 | 8/2017 | Wentworth |
| 9,755,572 B2 | 9/2017 | Wentworth et al. |
| D800,055 S | 10/2017 | Rothschild |
| 9,813,012 B2 | 11/2017 | Wentworth et al. |
| 9,819,303 B2 | 11/2017 | Ash |
| 9,831,817 B2 | 11/2017 | Rothschild |
| 9,845,584 B1 | 12/2017 | Goldammer |
| 9,850,661 B2 | 12/2017 | Kovacs |
| 9,853,593 B2 | 12/2017 | Cinnamon et al. |
| 9,865,938 B2 | 1/2018 | Meine et al. |
| 9,876,463 B2 | 1/2018 | Jasmin |
| 9,893,676 B2 | 2/2018 | Anderson et al. |
| 9,893,677 B1 | 2/2018 | Liu |
| 9,920,958 B2 | 3/2018 | Haddock et al. |
| 9,926,706 B2 | 3/2018 | Hockman |
| 9,957,988 B2 | 5/2018 | Kovacs et al. |
| 9,966,745 B2 | 5/2018 | Wentworth |
| 10,036,414 B2 | 7/2018 | Wiley et al. |
| D827,160 S | 8/2018 | Menton |
| 10,053,856 B2 | 8/2018 | Haddock |
| 10,054,336 B2 | 8/2018 | Haddock et al. |
| D827,873 S | 9/2018 | Menton |
| D827,874 S | 9/2018 | Menton |
| 10,077,562 B2 | 9/2018 | Haddock et al. |
| 10,103,682 B2 | 10/2018 | Haddock et al. |
| 10,103,683 B2 | 10/2018 | Wentworth |
| 10,106,987 B2 | 10/2018 | Haddock et al. |
| 10,141,662 B2 | 11/2018 | Bernard et al. |
| 10,186,791 B2 | 1/2019 | Meine et al. |
| 10,202,991 B2 | 2/2019 | Lewis |
| 10,205,418 B2 | 2/2019 | Nayar |
| 10,211,773 B2 | 2/2019 | Jasmin et al. |
| 10,211,775 B1 | 2/2019 | Wentworth et al. |
| 10,218,305 B1 | 2/2019 | Schrock |
| 10,291,176 B2 | 5/2019 | Wentworth et al. |
| 10,312,855 B2 | 6/2019 | Lester et al. |
| 10,337,764 B2 | 7/2019 | Ash et al. |
| 10,359,069 B2 | 7/2019 | Ash et al. |
| 10,385,573 B2 | 8/2019 | Van Leuven |
| 10,443,896 B2 | 10/2019 | Haddock et al. |
| 10,454,190 B1 | 10/2019 | Martin |
| 10,472,828 B2 | 11/2019 | Stearns et al. |
| 10,502,457 B2 | 12/2019 | Haddock et al. |
| 10,511,252 B2 | 12/2019 | Wentworth et al. |
| 10,530,293 B2 | 1/2020 | Legall et al. |
| 10,551,090 B2 | 2/2020 | De Vogel et al. |
| 10,594,251 B2 | 3/2020 | Stearns et al. |
| 10,622,935 B1 | 4/2020 | Liu |
| 10,634,175 B2 | 4/2020 | Haddock |
| 10,640,980 B2 | 5/2020 | Haddock |
| 10,644,643 B2 | 5/2020 | Stearns et al. |
| 10,673,151 B2 | 6/2020 | Ash et al. |
| 10,686,401 B2 | 6/2020 | Ash et al. |
| 10,731,355 B2 | 8/2020 | Haddock et al. |
| 10,749,459 B1 * | 8/2020 | Liu ............... F16B 5/0685 |
| 10,749,466 B2 | 8/2020 | Smeja |
| 10,763,777 B2 | 9/2020 | Stearns et al. |
| 10,797,634 B1 | 10/2020 | Jasmin et al. |
| 10,837,476 B2 | 11/2020 | Lewis |
| 10,851,826 B2 | 12/2020 | Ash et al. |
| 10,859,292 B2 | 12/2020 | Haddock et al. |
| 10,868,491 B2 | 12/2020 | Wentworth et al. |
| 10,903,785 B2 | 1/2021 | Haddock et al. |
| D909,853 S | 2/2021 | Jasmin |
| 10,931,225 B2 | 2/2021 | Yang et al. |
| 11,009,262 B2 | 5/2021 | Ash et al. |
| 11,012,023 B2 | 5/2021 | Stearns et al. |
| D923,203 S | 6/2021 | Muther |
| D923,823 S | 6/2021 | Muther |
| 11,118,353 B2 | 9/2021 | Stearns et al. |
| 11,121,484 B2 | 9/2021 | Ash et al. |
| 11,121,669 B2 | 9/2021 | Stearns et al. |
| 11,139,773 B2 * | 10/2021 | Eriksson ............... H02S 20/23 |
| 11,139,774 B2 | 10/2021 | Wentworth et al. |
| 11,189,941 B2 | 11/2021 | Ash et al. |
| 11,196,187 B2 | 12/2021 | Ash et al. |
| 11,201,581 B2 | 12/2021 | Stearns et al. |
| 11,296,648 B1 | 4/2022 | Jasmin et al. |
| 11,368,005 B2 | 6/2022 | Meine et al. |
| 2002/0026765 A1 | 3/2002 | Vahey |
| 2002/0088196 A1 | 7/2002 | Haddock |
| 2003/0015637 A1 | 1/2003 | Liebendorfer |
| 2003/0062078 A1 | 4/2003 | Mimura |
| 2003/0070368 A1 | 4/2003 | Shingleton |
| 2003/0131551 A1 | 7/2003 | Mollinger et al. |
| 2003/0146346 A1 | 8/2003 | Chapman, Jr. |
| 2003/0173460 A1 | 9/2003 | Chapman, Jr. |
| 2003/0201009 A1 | 10/2003 | Nakajima et al. |
| 2004/0035065 A1 | 2/2004 | Orszulak et al. |
| 2004/0055233 A1 | 3/2004 | Showalter |
| 2004/0164208 A1 | 8/2004 | Nielson et al. |
| 2004/0231949 A1 | 11/2004 | Le et al. |
| 2004/0237465 A1 | 12/2004 | Refond |

(56) References Cited

U.S. PATENT DOCUMENTS

| | | |
|---|---|---|
| 2005/0102958 A1 | 5/2005 | Anderson |
| 2005/0115176 A1 | 6/2005 | Russell |
| 2005/0117997 A1* | 6/2005 | Pinzl .................. F16B 37/005 411/367 |
| 2005/0210769 A1 | 9/2005 | Harvey |
| 2005/0257434 A1 | 11/2005 | Hockman |
| 2006/0065805 A1 | 3/2006 | Barton et al. |
| 2006/0075691 A1 | 4/2006 | Verkamlp |
| 2006/0096061 A1 | 5/2006 | Weiland et al. |
| 2006/0118163 A1* | 6/2006 | Plaisted .................. F24S 25/10 136/251 |
| 2006/0174571 A1 | 8/2006 | Panasik et al. |
| 2006/0174931 A1 | 8/2006 | Mapes et al. |
| 2006/0254192 A1 | 11/2006 | Fennell, Jr. |
| 2007/0075198 A1 | 4/2007 | Foser |
| 2007/0131273 A1 | 6/2007 | Kobayashi |
| 2007/0199590 A1 | 8/2007 | Tanaka et al. |
| 2007/0241238 A1 | 10/2007 | Neace |
| 2007/0246039 A1 | 10/2007 | Brazier et al. |
| 2007/0248434 A1* | 10/2007 | Wiley .................... H01B 5/002 411/160 |
| 2007/0289229 A1 | 12/2007 | Aldo |
| 2007/0289233 A1 | 12/2007 | Haddock |
| 2008/0035140 A1 | 2/2008 | Placer et al. |
| 2008/0041011 A1 | 2/2008 | Kannisto |
| 2008/0184639 A1 | 8/2008 | Cotter |
| 2008/0190047 A1 | 8/2008 | Allen |
| 2008/0236520 A1 | 10/2008 | Maehara et al. |
| 2008/0265232 A1 | 10/2008 | Terrels et al. |
| 2008/0302407 A1 | 12/2008 | Kobayashi |
| 2009/0000220 A1 | 1/2009 | Lenox |
| 2009/0007520 A1 | 1/2009 | Navon |
| 2009/0194098 A1 | 8/2009 | Placer |
| 2009/0229213 A1 | 9/2009 | Mistelski |
| 2009/0230205 A1 | 9/2009 | Hepner et al. |
| 2009/0320826 A1 | 12/2009 | Kufner |
| 2010/0058701 A1 | 3/2010 | Yao et al. |
| 2010/0133040 A1 | 6/2010 | London |
| 2010/0154784 A1 | 6/2010 | King et al. |
| 2010/0162641 A1 | 7/2010 | Reyal et al. |
| 2010/0171016 A1 | 7/2010 | Haddock |
| 2010/0175738 A1 | 7/2010 | Huss et al. |
| 2010/0193651 A1 | 8/2010 | Railsback et al. |
| 2010/0206303 A1 | 8/2010 | Thorne |
| 2010/0212720 A1 | 8/2010 | Meyer et al. |
| 2010/0276558 A1 | 11/2010 | Faust et al. |
| 2010/0288337 A1 | 11/2010 | Rizzo |
| 2010/0293874 A1 | 11/2010 | Liebendorfer |
| 2010/0314517 A1 | 12/2010 | Patzer |
| 2011/0039458 A1 | 2/2011 | Byrne |
| 2011/0078892 A1 | 4/2011 | Hartelius et al. |
| 2011/0120047 A1 | 5/2011 | Stearns et al. |
| 2011/0138585 A1* | 6/2011 | Kmita .................. F24S 25/636 24/522 |
| 2011/0154750 A1 | 6/2011 | Welter et al. |
| 2011/0174360 A1* | 7/2011 | Plaisted .................. H02S 20/23 136/248 |
| 2011/0179606 A1 | 7/2011 | Magno, Jr. et al. |
| 2011/0209745 A1 | 9/2011 | Korman |
| 2011/0214365 A1 | 9/2011 | Aftanas |
| 2011/0214388 A1 | 9/2011 | London |
| 2011/0232212 A1 | 9/2011 | Pierson et al. |
| 2011/0239546 A1 | 10/2011 | Tsuzuki et al. |
| 2011/0247292 A1 | 10/2011 | Li |
| 2011/0260027 A1 | 10/2011 | Farnham, Jr. |
| 2011/0271611 A1 | 11/2011 | Maracci et al. |
| 2011/0272545 A1 | 11/2011 | Liu |
| 2011/0314752 A1 | 12/2011 | Meier |
| 2012/0073630 A1 | 3/2012 | Wu |
| 2012/0079781 A1 | 4/2012 | Koller |
| 2012/0085041 A1 | 4/2012 | Place |
| 2012/0099943 A1 | 4/2012 | Chiu |
| 2012/0102853 A1* | 5/2012 | Rizzo .................. F24S 25/61 52/173.3 |
| 2012/0153108 A1 | 6/2012 | Schneider |
| 2012/0167364 A1 | 7/2012 | Koch et al. |
| 2012/0175322 A1 | 7/2012 | Park et al. |
| 2012/0192519 A1 | 8/2012 | Ray |
| 2012/0193310 A1 | 8/2012 | Fluhrer et al. |
| 2012/0201601 A1 | 8/2012 | Rizzo |
| 2012/0244729 A1 | 9/2012 | Rivera et al. |
| 2012/0248271 A1 | 10/2012 | Zeilenga |
| 2012/0298188 A1 | 11/2012 | West et al. |
| 2012/0299233 A1 | 11/2012 | Header |
| 2012/0325761 A1 | 12/2012 | Kubsch et al. |
| 2013/0011187 A1 | 1/2013 | Schuit et al. |
| 2013/0048056 A1 | 2/2013 | Kilgore et al. |
| 2013/0089388 A1 | 4/2013 | Liu et al. |
| 2013/0091692 A1* | 4/2013 | Stanley .................. F24S 25/61 248/560 |
| 2013/0118545 A1 | 5/2013 | Bosler et al. |
| 2013/0149030 A1 | 6/2013 | Merhar et al. |
| 2013/0167470 A1 | 7/2013 | Montgomery et al. |
| 2013/0168525 A1 | 7/2013 | Haddock |
| 2013/0220403 A1 | 8/2013 | Rizzo |
| 2013/0227833 A1 | 9/2013 | Rizzo |
| 2013/0263917 A1 | 10/2013 | Hamamura |
| 2013/0313043 A1 | 11/2013 | Lallier |
| 2013/0340358 A1 | 12/2013 | Danning |
| 2014/0000681 A1 | 1/2014 | Zhao et al. |
| 2014/0003861 A1 | 1/2014 | Cheung |
| 2014/0041202 A1 | 2/2014 | Schnitzer et al. |
| 2014/0069048 A1 | 3/2014 | Ally |
| 2014/0096462 A1 | 4/2014 | Haddock |
| 2014/0179133 A1 | 6/2014 | Redel |
| 2014/0220834 A1 | 8/2014 | Rizzo |
| 2014/0231605 A1 | 8/2014 | Sharpe et al. |
| 2014/0260068 A1 | 9/2014 | Pendley et al. |
| 2014/0283467 A1 | 9/2014 | Chabas et al. |
| 2014/0338273 A1 | 11/2014 | Stapleton |
| 2014/0341645 A1 | 11/2014 | Liu et al. |
| 2015/0052834 A1 | 2/2015 | Gies et al. |
| 2015/0060620 A1 | 3/2015 | Smeja |
| 2015/0107168 A1 | 4/2015 | Kobayashi |
| 2015/0129517 A1 | 5/2015 | Wildes |
| 2015/0200620 A1 | 7/2015 | Haddock et al. |
| 2015/0214884 A1 | 7/2015 | Rizzo |
| 2015/0249423 A1 | 9/2015 | Braunstein et al. |
| 2015/0288320 A1* | 10/2015 | Stearns .................. F24S 25/40 52/173.3 |
| 2016/0025262 A1 | 1/2016 | Stearns et al. |
| 2016/0049901 A1 | 2/2016 | Muther et al. |
| 2016/0060869 A1 | 3/2016 | Smeja |
| 2016/0087576 A1 | 3/2016 | Johansen et al. |
| 2016/0111835 A1* | 4/2016 | Nayar .................. H02S 20/23 439/122 |
| 2016/0111997 A1* | 4/2016 | Ganshaw ................ F24S 25/61 248/224.7 |
| 2016/0111998 A1 | 4/2016 | Schmid |
| 2016/0130815 A1 | 5/2016 | Menegoli |
| 2016/0160524 A1 | 6/2016 | Malins |
| 2016/0177984 A1 | 6/2016 | Kovacs et al. |
| 2016/0268958 A1* | 9/2016 | Wildes .................. H02S 20/23 |
| 2017/0040928 A1 | 2/2017 | Schuit et al. |
| 2017/0067258 A1 | 3/2017 | Stearns et al. |
| 2017/0073974 A1 | 3/2017 | Kovacs |
| 2017/0107723 A1 | 4/2017 | Stearns et al. |
| 2017/0237386 A1 | 8/2017 | Stephan et al. |
| 2017/0301265 A1 | 10/2017 | Kyle et al. |
| 2017/0302221 A1 | 10/2017 | Jasmin |
| 2017/0336021 A1 | 11/2017 | Anderson |
| 2018/0013382 A1 | 1/2018 | Smeja |
| 2018/0167026 A1* | 6/2018 | Xie ....................... F24S 25/00 |
| 2019/0013772 A1* | 1/2019 | Bamat .................. F24S 25/636 |
| 2019/0049151 A1 | 2/2019 | Harris et al. |
| 2019/0106885 A1 | 4/2019 | Stearns et al. |
| 2019/0123460 A1* | 4/2019 | Ash ...................... F24S 25/636 |
| 2019/0165717 A1 | 5/2019 | Haddock et al. |
| 2019/0195252 A1 | 6/2019 | Pryor et al. |
| 2019/0226214 A1 | 7/2019 | Van Leuven |
| 2019/0273460 A1 | 9/2019 | Kovacs |
| 2019/0285224 A1 | 9/2019 | McKechnie et al. |
| 2019/0330853 A1 | 10/2019 | Van Leuven |

(56) References Cited

U.S. PATENT DOCUMENTS

| | | | |
|---|---|---|---|
| 2019/0343085 A1 | 11/2019 | Donado | |
| 2019/0345719 A1 | 11/2019 | Header | |
| 2019/0363667 A1 | 11/2019 | Braunstein et al. | |
| 2019/0372501 A1 | 12/2019 | Wada et al. | |
| 2020/0032523 A1 | 1/2020 | Haddock et al. | |
| 2020/0144959 A1 | 5/2020 | Stearns et al. | |
| 2020/0191180 A1 | 6/2020 | Haddock | |
| 2020/0208658 A1 | 7/2020 | Roman | |
| 2020/0217339 A1 | 7/2020 | Haddock | |
| 2020/0252023 A1 | 8/2020 | Stearns et al. | |
| 2020/0263432 A1 | 8/2020 | Haddock | |
| 2020/0313604 A1 | 10/2020 | Harris et al. | |
| 2020/0313611 A1 | 10/2020 | Ash et al. | |
| 2020/0318349 A1 | 10/2020 | Stearns et al. | |
| 2020/0321763 A1 | 10/2020 | Joshi et al. | |
| 2020/0340712 A1 | 10/2020 | Leitch et al. | |
| 2020/0362632 A1 | 11/2020 | Fort | |
| 2021/0005115 A1 | 1/2021 | Johnson | |
| 2021/0028741 A1 | 1/2021 | Stearns et al. | |
| 2021/0067085 A1 | 3/2021 | Stearns et al. | |
| 2021/0079947 A1 | 3/2021 | Ash et al. | |
| 2021/0104973 A1 | 4/2021 | Stearns et al. | |
| 2021/0111546 A1 | 4/2021 | Varale | |
| 2021/0159843 A1 | 5/2021 | Stearns et al. | |
| 2021/0167720 A1 | 6/2021 | Stearns et al. | |
| 2021/0184626 A1 | 6/2021 | Yang et al. | |
| 2021/0194157 A1 | 6/2021 | Ash et al. | |
| 2021/0194158 A1 | 6/2021 | Ash et al. | |
| 2021/0265940 A1 | 8/2021 | Stearns et al. | |
| 2021/0376781 A1 | 12/2021 | Stearns et al. | |
| 2021/0376782 A1 | 12/2021 | Stearns et al. | |
| 2021/0388618 A1 | 12/2021 | Stearns et al. | |
| 2022/0010823 A1* | 1/2022 | Moss | F16B 2/065 |
| 2022/0140771 A1 | 5/2022 | Stearns et al. | |
| 2022/0145634 A1 | 5/2022 | Stearns et al. | |
| 2022/0149545 A1 | 5/2022 | Ash et al. | |
| 2022/0178586 A1 | 6/2022 | Ash et al. | |
| 2022/0278516 A1 | 9/2022 | Meine et al. | |
| 2022/0298795 A1 | 9/2022 | Haddock et al. | |

FOREIGN PATENT DOCUMENTS

| | | | |
|---|---|---|---|
| AT | 298762 | 5/1972 | |
| AU | 2005201707 | 11/2006 | |
| AU | 2009101276 | 1/2010 | |
| AU | 2009245849 | 6/2010 | |
| AU | 2014362215 | 6/2015 | |
| AU | 2017203660 | 10/2018 | |
| AU | 2016294152 | 12/2018 | |
| CA | 2704915 | 9/2011 | |
| CH | 204783 | 5/1939 | |
| CH | 388590 | 2/1965 | |
| CH | 469159 | 2/1969 | |
| CH | 671063 | 7/1989 | |
| CN | 202025767 | 11/2011 | |
| CN | 202577780 | 12/2012 | |
| CN | 103774795 | 5/2014 | |
| CN | 104254654 | 12/2014 | |
| CN | 105208941 | 12/2015 | |
| CN | 206628755 | 11/2017 | |
| CN | 206717199 | 12/2017 | |
| CN | 206737192 | 12/2017 | |
| CN | 206849001 | 1/2018 | |
| CN | 108105222 | 6/2018 | |
| CO | 6511275 | 8/2012 | |
| DE | 298762 | 4/1916 | |
| DE | 941690 | 4/1956 | |
| DE | 2126082 | 12/1972 | |
| DE | 2523087 | 11/1976 | |
| DE | 2556095 | 6/1977 | |
| DE | 3326223 | 4/1984 | |
| DE | 3617225 | 11/1987 | |
| DE | 3723020 | 1/1989 | |
| DE | 3728831 | 1/1989 | |
| DE | 9112788 | 12/1991 | |
| DE | 4115240 | 10/1992 | |
| DE | 10056177 | * 5/2002 | E04F 13/08 |
| DE | 10062697 | 7/2002 | |
| DE | 10344202 | 4/2004 | |
| DE | 202005006951 | 8/2005 | |
| DE | 102005002828 | 8/2006 | |
| DE | 202006015336 | 12/2006 | |
| DE | 202007002252 | 4/2007 | |
| DE | 202007018367 | 7/2008 | |
| DE | 102007036206 | 2/2009 | |
| DE | 202009010984 | 12/2009 | |
| DE | 102008032985 | 1/2010 | |
| DE | 202015102936 | 9/2016 | |
| DE | 202012013476 | 2/2017 | |
| EP | 0481905 | 4/1992 | |
| EP | 0722023 | 7/1996 | |
| EP | 0952272 | 10/1999 | |
| EP | 1126098 | 8/2001 | |
| EP | 1447494 | 8/2004 | |
| EP | 1804008 | 7/2007 | |
| EP | 2105971 | 9/2009 | |
| EP | 2327942 | 6/2011 | |
| EP | 2375185 | 10/2011 | |
| EP | 2746695 | 6/2014 | |
| EP | 2528166 | 9/2015 | |
| EP | 3092350 | 4/2019 | |
| EP | 3364124 | 10/2019 | |
| EP | 3552307 | 10/2019 | |
| EP | 3361183 | 12/2019 | |
| FR | 469159 | 7/1914 | |
| FR | 1215468 | 4/1960 | |
| FR | 2468209 | 4/1981 | |
| FR | 2515236 | 4/1983 | |
| FR | 2638772 | 5/1990 | |
| FR | 2697060 | 4/1994 | |
| FR | 2793827 | 11/2000 | |
| FR | 2950375 | 3/2011 | |
| FR | 2971577 | 8/2012 | |
| FR | 2997169 | 4/2014 | |
| FR | 3074369 | 12/2019 | |
| GB | 2149829 | 6/1985 | |
| GB | 2364077 | 1/2002 | |
| GB | 2430946 | 4/2007 | |
| GB | 2465484 | 5/2010 | |
| GB | 2476104 | 6/2011 | |
| JP | S56-158486 | 12/1981 | |
| JP | H03-166452 | 7/1991 | |
| JP | H04-73367 | 3/1992 | |
| JP | H04-366294 | 12/1992 | |
| JP | H05-346055 | 12/1993 | |
| JP | H08-189150 | 7/1996 | |
| JP | H09-177272 | 7/1997 | |
| JP | H09-256562 | 9/1997 | |
| JP | H11-172861 | 6/1999 | |
| JP | 2000-120235 | 4/2000 | |
| JP | 2000-179106 | 6/2000 | |
| JP | 2000-234423 | 8/2000 | |
| JP | 2000-303638 | 10/2000 | |
| JP | 2001-193231 | 6/2001 | |
| JP | 2001-303724 | 10/2001 | |
| JP | 2002-146978 | 5/2002 | |
| JP | 2002-180609 | 6/2002 | |
| JP | 2003-096986 | 4/2003 | |
| JP | 2003-155803 | 5/2003 | |
| JP | 2003-213854 | 7/2003 | |
| JP | 2004-060358 | 2/2004 | |
| JP | 2004-068270 | 3/2004 | |
| JP | 2004-092134 | 3/2004 | |
| JP | 2004-124583 | 4/2004 | |
| JP | 2004-156326 | 6/2004 | |
| JP | 2004-264009 | 9/2004 | |
| JP | 2004-278145 | 10/2004 | |
| JP | 2005-171623 | 6/2005 | |
| JP | 2005-322821 | 11/2005 | |
| JP | 2006-097291 | 4/2006 | |
| JP | 2009-052278 | 3/2009 | |
| JP | 2009-179955 | 8/2009 | |
| JP | 2009-185599 | 8/2009 | |
| JP | 2011-069130 | 4/2011 | |

(56) References Cited

FOREIGN PATENT DOCUMENTS

| | | |
|---|---|---|
| JP | 2011-185014 | 9/2011 |
| JP | 2011-236611 | 11/2011 |
| JP | 2012-144903 | 8/2012 |
| JP | 6033922 | 11/2016 |
| JP | 2018-091009 | 6/2018 |
| KR | 100957530 | 5/2010 |
| MX | 2017016056 | 8/2018 |
| NL | 2021378 | 1/2020 |
| NL | 2021379 | 1/2020 |
| NL | 2021380 | 1/2020 |
| NL | 2021740 | 5/2020 |
| PT | 3066398 | 12/2019 |
| PT | 3066399 | 12/2019 |
| WO | WO 96/08617 | 3/1996 |
| WO | WO 96/30606 | 10/1996 |
| WO | WO 97/08399 | 3/1997 |
| WO | WO 99/55982 | 11/1999 |
| WO | WO 01/39331 | 5/2001 |
| WO | WO 03/098126 | 11/2003 |
| WO | WO 2008/021714 | 2/2008 |
| WO | WO 2008/028151 | 3/2008 |
| WO | WO 2010/112049 | 10/2010 |
| WO | WO 2010/113003 | 10/2010 |
| WO | WO 2010/121830 | 10/2010 |
| WO | WO 2010/140878 | 12/2010 |
| WO | WO 2011/019460 | 2/2011 |
| WO | WO 2011/154019 | 12/2011 |
| WO | WO 2012/014203 | 2/2012 |
| WO | WO 2012/017711 | 2/2012 |
| WO | WO 2012/048056 | 4/2012 |
| WO | WO 2012/116121 | 8/2012 |
| WO | WO 2013/009375 | 1/2013 |
| WO | WO 2014/194576 | 12/2014 |
| WO | WO 2015/061113 | 4/2015 |
| WO | WO 2016/198305 | 12/2016 |
| WO | WO 2018/169391 | 9/2018 |
| WO | WO 2019/239024 | 12/2019 |
| WO | WO 2020/022879 | 1/2020 |
| WO | WO 2020/022880 | 1/2020 |
| WO | WO 2020/162746 | 8/2020 |
| WO | WO 2020/187472 | 9/2020 |
| WO | WO 2021/043407 | 3/2021 |
| WO | WO 2021/061866 | 4/2021 |
| WO | WO 2021/086185 | 5/2021 |
| WO | WO 2021/102062 | 5/2021 |
| WO | WO 2021/119458 | 6/2021 |

OTHER PUBLICATIONS

"S-5! WindClamp™ Install," Metal Roof Innovations, Ltd., 2014, 1 page.
"Universal Clamps Brochure for Web," Universal Clamps, 2020, 2 pages.
"Wind Clamps for Metal Roofs," Metal Roof Innovations, Ltd., 2017, Version 081717, 2 pages.
"Wind Clamp Ultra DEK," Metal Roof Innovations, Ltd., Mar. 7, 2011, Drawing No. WC14-A-0-A_CCD, 1 page.
"Wind Clamp Double LOK," Metal Roof Innovations, Ltd., Mar. 7, 2011, Drawing No. WC15-A-0-A_CCD, 1 page.
Official Action for New Zealand Patent Application No. 768908, dated Jan. 21, 2021, 4 pages.
U.S. Appl. No. 08/091,176, filed Jul. 13, 1993 now U.S. Pat. No. 5,483,772.
U.S. Appl. No. 08/482,274, filed Jun. 7, 1995 now U.S. Pat. No. 5,715,640.
U.S. Appl. No. 08/987,368, filed Dec. 9, 1997 now U.S. Pat. No. 5,983,588.
U.S. Appl. No. 09/312,013, filed May 14, 1990 now U.S. Pat. No. 6,164,033.
U.S. Appl. No. 09/698,358, filed Oct. 27, 2000.
U.S. Appl. No. 10/118,057, filed Apr. 8, 2002 now U.S. Pat. No. 6,718,718.
U.S. Appl. No. 10/824,320, filed Apr. 13, 2004.
U.S. Appl. No. 08/335,987, filed Nov. 8, 1994 now U.S. Pat. No. 5,694,721.
U.S. Appl. No. 08/336,288, filed Nov. 8, 1994 now U.S. Pat. No. 5,491,931.
U.S. Appl. No. 09/313,105, filed May 17, 1999 now U.S. Pat. No. 6,536,729.
U.S. Appl. No. 09/313,103, filed May 17, 1999, now U.S. Pat. No. 6,470,629.
U.S. Appl. No. 09/758,805, filed Jan. 11, 2001.
U.S. Appl. No. 10/746,546, filed Dec. 23, 2003 now U.S. Pat. No. 7,100,338.
U.S. Appl. No. 10/746,596, filed Dec. 23, 2003 now U.S. Pat. No. 7,013,612.
U.S. Appl. No. 10/818,469, filed Apr. 5, 2004.
U.S. Appl. No. 10/823,410, filed Apr. 13, 2004 now U.S. Pat. No. 7,703,256.
U.S. Appl. No. 12/767,983, filed Apr. 27, 2010.
U.S. Appl. No. 12/960,679, filed Dec. 6, 2010.
U.S. Appl. No. 11/325,704, filed Jan. 5, 2006.
U.S. Appl. No. 11/425,338, filed Jun. 20, 2006.
U.S. Appl. No. 12/707,724, filed Feb. 18, 2010.
U.S. Appl. No. 11/759,172, filed Jun. 6, 2007 now U.S. Pat. No. 7,758,011.
U.S. Appl. No. 12/832,281, filed Jul. 8, 2010 now U.S. Pat. No. 8,430,372.
U.S. Appl. No. 13/857,759, filed Apr. 5, 2013.
U.S. Appl. No. 14/697,387, filed Apr. 27, 2015.
U.S. Appl. No. 14/789,607, filed Jul. 1, 2015 now U.S. Pat. No. 9,732,512.
U.S. Appl. No. 15/471,179, filed Mar. 28, 2017 now U.S. Pat. No. 10,053,856.
U.S. Appl. No. 15/663,081, filed Jul. 28, 2017 now U.S. Pat. No. 10,443,896.
U.S. Appl. No. 12/629,179, filed Dec. 2, 2009.
U.S. Appl. No. 12/542,132, filed Aug. 17, 2009 now U.S. Pat. No. 8,312,678.
U.S. Appl. No. 13/667,816, filed Nov. 2, 2012 now U.S. Pat. No. 8,656,649.
U.S. Appl. No. 14/153,925, filed Jan. 13, 2014 now U.S. Pat. No. 9,222,263.
U.S. Appl. No. 13/403,463, filed Feb. 23, 2012 now U.S. Pat. No. 8,833,714.
U.S. Appl. No. 14/444,405, filed Jul. 28, 2014.
U.S. Appl. No. 14/500,919, filed Sep. 29, 2014 now U.S. Pat. No. 9,611,652.
U.S. Appl. No. 15/452,388, filed Mar. 7, 2017.
U.S. Appl. No. 15/621,092, filed Jun. 13, 2017 now U.S. Pat. No. 10,077,562.
U.S. Appl. No. 15/621,739, filed Jun. 13, 2017 now U.S. Pat. No. 10,106,987.
U.S. Appl. No. 16/129,606, filed Sep. 12, 2018 now U.S. Pat. No. 10,731,355.
U.S. Appl. No. 16/592,521, filed Oct. 3, 2019.
U.S. Appl. No. 14/030,615, filed Sep. 18, 2013.
U.S. Appl. No. 14/005,784, filed Jun. 13, 2014 now U.S. Pat. No. 9,530,916.
U.S. Appl. No. 15/386,911, filed Dec. 21, 2016.
U.S. Appl. No. 14/205,613, filed Mar. 12, 2014 now U.S. Pat. No. 9,147,785.
U.S. Appl. No. 14/840,206, filed Aug. 31, 2015 now U.S. Pat. No. 9,608,559.
U.S. Appl. No. 15/470,533, filed Mar. 27, 2017 now U.S. Pat. No. 10,103,682.
U.S. Appl. No. 16/139,853, filed Sep. 24, 2018.
U.S. Appl. No. 16/754,519, filed Apr. 8, 2020.
U.S. Appl. No. 10/810,114, filed Mar. 25, 2004 now U.S. Pat. No. 7,513,080.
U.S. Appl. No. 13/545,808, filed Jul. 10, 2012.
U.S. Appl. No. 13/724,976, filed Dec. 21, 2012 now U.S. Pat. No. 9,086,185.
U.S. Appl. No. 14/789,714, filed Jul. 1, 2015.

(56) References Cited

OTHER PUBLICATIONS

U.S. Appl. No. 13/712,474, filed Dec. 12, 2012 now U.S. Pat. No. 8,844,234.
U.S. Appl. No. 14/469,153, filed Aug. 26, 2014.
U.S. Appl. No. 16/539,960, filed Aug. 13, 2019 now U.S. Pat. No. 10,859,292.
U.S. Appl. No. 17/110,621, filed Dec. 3, 2020.
U.S. Appl. No. 15/798,023, filed Oct. 30, 2017 now U.S. Pat. No. 10,640,980.
U.S. Appl. No. 13/965,441, filed Aug. 13, 2013 now U.S. Pat. No. 8,925,263.
U.S. Appl. No. 14/558,356, filed Dec. 2, 2014 now U.S. Pat. No. 9,306,490.
U.S. Appl. No. 16/821,885, filed Mar. 17, 2020.
U.S. Appl. No. 16/866,080, filed May 4, 2020.
U.S. Appl. No. 16/360,923, filed Mar. 21, 2019 now U.S. Pat. No. 10,903,785.
U.S. Appl. No. 16/714,060, filed Dec. 13, 2019.
U.S. Appl. No. 13/720,461, filed Dec. 19, 2012.
U.S. Appl. No. 15/628,927, filed Jun. 21, 2017 now U.S. Pat. No. 10,634,175.
U.S. Appl. No. 16/824,651, filed Mar. 19, 2020.
U.S. Appl. No. 12/855,850, filed Aug. 13, 2010 now U.S. Pat. No. 10,054,336.
U.S. Appl. No. 12/856,827, filed Aug. 16, 2010 now U.S. Pat. No. 9,920,958.
U.S. Appl. No. 12/856,844, filed Aug. 16, 2010 now U.S. Pat. No. 8,627,617.
U.S. Appl. No. 16/106,299, filed Aug. 21, 2018 now U.S. Pat. No. 10,502,457.
U.S. Appl. No. 08/383,477, filed Feb. 2, 1995.
U.S. Appl. No. 08/285,280, filed Aug. 1, 1994 now U.S. Pat. No. 5,557,903.
Official Action for Panama Patent Application No. 92309-01, dated Jul. 8, 2021 4 pages.
"ERK-TRB-C16 RiverClack Roofing Profile Interface," Enerack, 2021, 2 pages [retrieved online from: www.enerack.com/erk-trb-c16-riverclack-roofing-profile-interface-p00231p1.html].
Official Action with machine translation for Mexico Patent Application No. MX/a/2020/009805, dated Jul. 27, 2021 10 pages.
Notice of Acceptance for New Zealand Patent Application No. 768908, dated Jul. 23, 2021 2 pages.
"ADJ Heavy Duty Lighting C-clamp," Sweetwater, 2011, 3 pages [retrieved online from: http://web.archive.org/web/20111112045516/http://www.sweetwater.com/store/detail/CClamp/].
"Aluminum," Wikipedia, Jul. 3, 2016, 21 pages [retrieved Oct. 3, 2017 from: en.wikipedia.org/w1ki/Aluminium].
"ClampFit-H Product Sheet," Schletter GmbH, Kirchdorf, Germany, Nov. 2015, 2 pages.
IDEEMATEC Tracking & Mounting Systems [online], Apr. 2008, [retrieved Mar. 6, 2012], Retrieved from http://www.ideematec.de.
"Kee Walk—Roof Top Walkway," Simplified Safety, 2011, 3 pages [retrieved online from: https://web.archive.org/web/20120207115154/http://simplifiedsafety.com/solutions/keewalk-rooftop-walkway/].
"KeeLine® The Safety Solution for Horizontal Life Lines," Kee Safety, Ltd. 2012, 2 pages [retrieved online from: https://web.archive.org/web/20120305120830/http://keesafety.co.uk/products/kee_line].
"Miller Fusion Roof Anchor Post," Miller Fall Protection, 2011, 3 pages [retrieved online from: https://web.archive.org/web/20111211154954/www.millerfallprotection.com/fall-protection-products/roofing-products/miller-fusion-roof-anchor-post].
"New 'Alzone 360 system'", Arrid, 2008, 34 pages [retrieved online from: https://web.archive.org/web/20120317120735/www.arrid.com.au/?act=racking_parts].
"Oil Canning—Solutions," Pac-Clad, 2001, 2 pages [retrieved online from: pac-clad.com/aiapresentation/sld021.htm].
"Oil Canning," Metal Construction Association, 2003, Technical Bulletin #95-1060, 2 pages.

"REES-Snow Retention Systems," Weerbewind, 2010, 3 pages [retrieved online from: https://web.archive.org/web/20100310075027/www.rees-oberstdorf.de/en/products/snow-retention-system.html].
"Solar mount. System," Schletter GmbH, 2012, 1 page [retrieved online from: https://web.archive.org/web/20120316154604/www.schletter.de/152-1-Solar-mounting-systems.html].
Gallo "Oil-Canning," Metal Roofing Alliance, Ask-the-experts forum, Jun. 7, 2005, 4 pages [retrieved online from: www.metalroofingalliance.net/v2/forums/printview.cfm?action=mboard.members/viewmessages&ForumTopicID=4921&ForumCategoryID=1].
Haddock "History and Materials," Metalmag, Metal roofing from A (Aluminum) to Z (Zinc)—Part I, Sep./Oct. 2001, 4 pages.
Haddock "Metallic Coatings for Carbon Steel," Metalmag, Metal roofing from a (Aluminum) to Z (Zinc)—Part II, Nov./Dec. 2001, 8 pages.
Notice of Allowance with English Translation for China Patent Application No. 201830515191.4, dated May 6, 2019 4 pages.
Notice of Allowance with English Translation for China Patent Application No. 201830515375.0, dated Feb. 12, 2019 4 pages.
Notice of Allowance with English Translation for China Patent Application No. 201830515387.3, dated Apr. 10, 2019 4 pages.
Notice of Allowance with English Translation for China Patent Application No. 201830515406.2, dated Mar. 26, 2019 4 pages.
Notice of Allowance with English Translation for China Patent Application No. 201830515409.6, dated Mar. 26, 2019 4 pages.
Notice of Allowance with English Translation for China Patent Application No. 201830515288.5, dated Mar. 26, 2019 4 pages.
International Search Report and Written Opinion for International (PCT) Patent Application No. PCT/US19/23423, dated Jun. 13, 2019 11 pages.
Official Action for U.S. Appl. No. 16/360,923, dated Nov. 14, 2019 6 pages Restriction Requirement.
Official Action for U.S. Appl. No. 16/360,923, dated Feb. 10, 2020 11 pages.
Official Action for U.S. Appl. No. 16/360,923, dated Jul. 10, 2020 11 pages.
Notice of Allowance for U.S. Appl. No. 16/360,923, dated Sep. 24, 2020 10 pages.
Corrected Notice of Allowance for U.S. Appl. No. 16/360,923, dated Nov. 3, 2020 6 pages.
"Wiley Grounding & Bonding Solutions," Hubbell, 2020, 2 pages [retrieved online from: www.hubbell.com/wiley/en/grounding-and-bonding].
International Preliminary Report on Patentability for International (PCT) Patent Application No. PCT/US2019/023423, dated Oct. 1, 2020 10 pages.
"Aerocompact® Compactmetal TR Checklist," Aerocompact, Aug. 30, 2021, CL TR Eng EU V1, 2 pages [retrieved online from: cdn.intelligencebank.com/eu/share/8MnR/YJMd/ZBPL4/original/AEROCOMPACT_CL_TR_Eng_V1_WEB].
"Aerocompact® Compactmetal TR," Aerocompact, Sep. 2, 2021, PB TR ENG EU V1, 3 pages[retrieved online from: cdn.intelligencebank.com/eu/share/8MnR/qMBXP/VYrWa/original/AEROCOMPACT_Leaflet_TR_Eng_V1_WEB].
"CompactMetal TR59 | TR74 Assembly Instructions," Aerocompact, Sep. 2021, 27 pages.
"Grounding Clip for Electrical Protection," ARaymond, 2016, 2 pages.
"Installation Instructions for Rayvolt®—Grounding clip for Framed PV Modules," ARaymond, Feb. 2016, Version 2.2, 1 page.
Official Action for Australia Patent Application No. 2019240320, dated Oct. 7, 2021 3 pages.
Official Action for Canada Patent Application No. 3,094,498, dated Oct. 5, 2021 4 pages.
Official Action with machine translation for Chile Patent Application No. 2408-2020, dated Sep. 14, 2021 24 pages.
Official Action with partial machine translation for China Patent Application No. 201980032371.9, dated Oct. 15, 2021 6 pages.
Extended Search Report for European Patent Application No. 19771033.8, dated Nov. 9, 2021 10 pages.

(56) References Cited

OTHER PUBLICATIONS

"Standing Seam RiverClack Clamp," Shanghai Woqin New Energy Technology Co., Ltd., 2018, 4 pages [retrieved online on Mar. 23, 2022 from: www.wochnmount.com/Details.html?product_id=36].

Official Action with machine translation for Chile Patent Application No. 202002408, dated Apr. 4, 2022 29 pages.

Notice of Allowance with English Translation for China Patent Application No. 201980032371.9, dated Apr. 26, 2022 5 pages.

Official Action with English Summary for Mexico Patent Application No. MX/a/2020/009805, dated Feb. 24, 2022 8 pages.

Official Action with English Summary for Saudi Arabia Patent Application No. 520420174, dated Mar. 30, 2022 8 pages.

"EZ Grip Metal Deck Mount," SunModo Corp., 2019, 1 page.

"EZ Grip Metal Deck Mount," SunModo Corp., 2019, Product page, 3 pages [retrieved online May 30, 2019 from: sunmodo.com/product/ez-grip-metal-deck-mount/#].

"Fix2000 check list," Schletter GmbH, last updated Jul. 2010, 1 page.

"Metal Roof Deck Mount Kit," SunModo Corp., Oct. 16, 2018, Product Drawing, 1 page.

"Slot definition," Merriam-Webster Dictionary, 2022, 1 page [retrieved online Aug. 24, 2022 from www.merriam-webster.com/dictionary/slot].

"Standing Seam Rail Free One Sheet," SunModo, Corp., 2020, 2 pages.

"SunDock™ Standing Seam Rail-Free Attachment System," SunModo Corp., 2018, 1 page.

"SunDock Standing Seam PV Mounting System Installation Manual," SunModo, 2019, Doc. No. D10160-V006, 14 pages.

Official Action for ARIPO Patent Application No. AP/P/2020/012727, dated Jul. 4, 2022 6 pages.

Notice of Acceptance for Australia Patent Application No. 2019240320, dated Sep. 28, 2022 4 pages.

Official Action with machine translation for Colombia Patent Application No. NC2020/0012829, dated Jul. 21, 2022 12 pages.

Official Action for Panama Patent Application No. 92309-01, dated Sep. 20, 2022 3 pages.

Official Action with English Summary for Saudi Arabia Patent Application No. 520420174, dated Jun. 30, 2022 7 pages.

Official Action with machine translation for Saudi Arabia Patent Application No. 522431324, dated Sep. 25, 2022 17 pages.

* cited by examiner

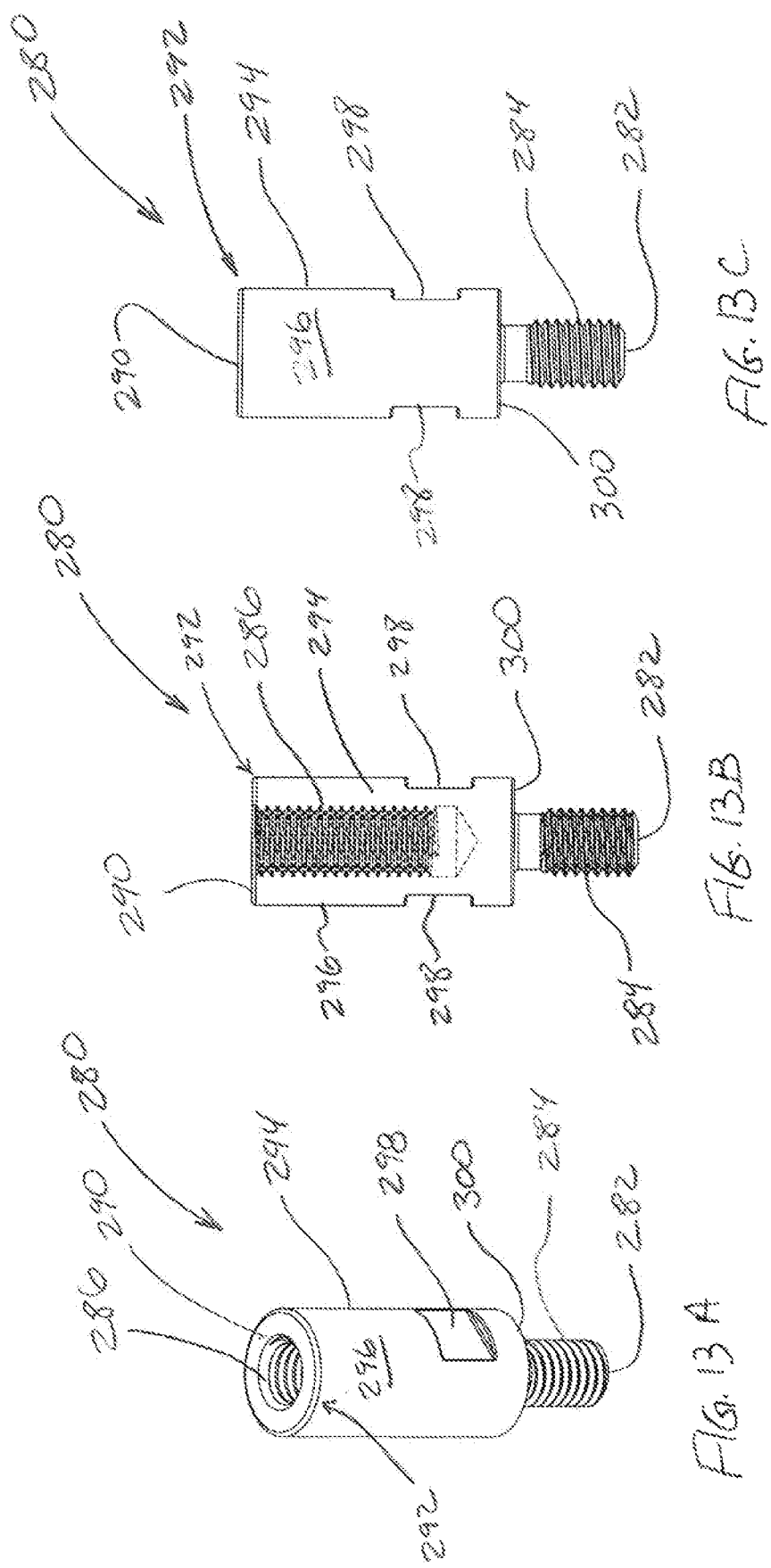

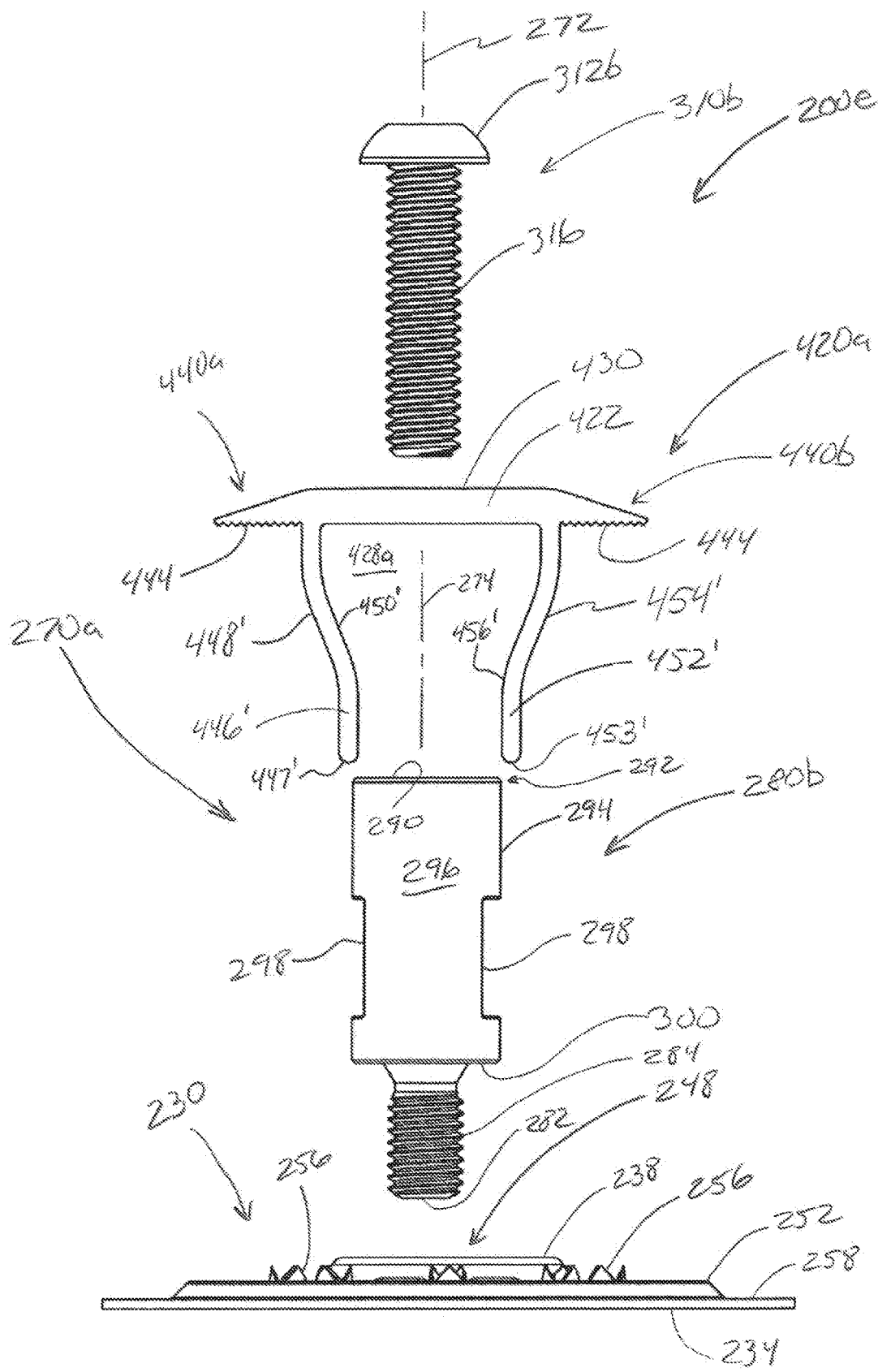

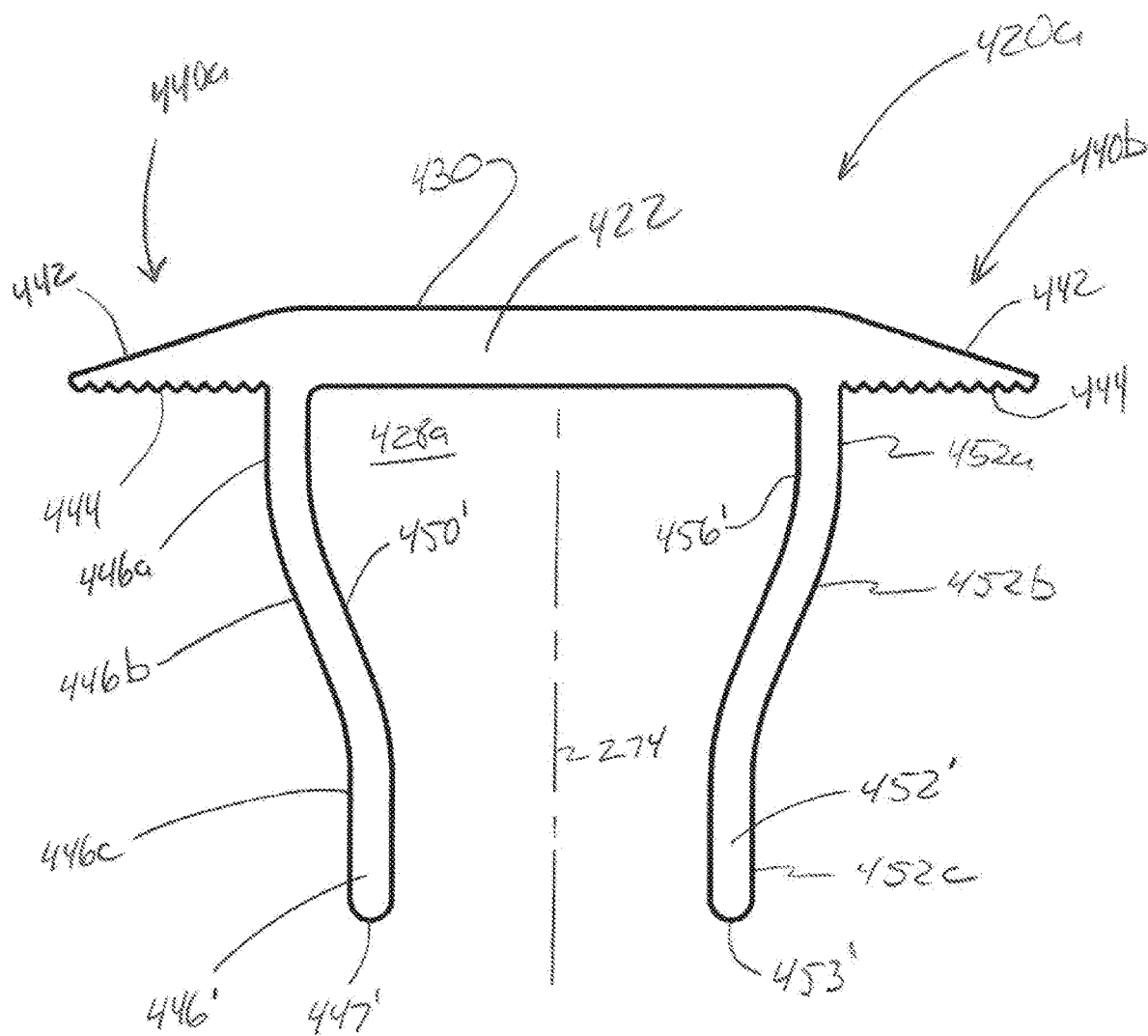

PV MODULE MOUNTING ASSEMBLY WITH CLAMP/STANDOFF ARRANGEMENT

CROSS REFERENCE TO RELATED APPLICATIONS

This application is a Continuation of U.S. patent application Ser. No. 16/360,923, entitled "PV Module Mounting Assembly with Clamp/Standoff Arrangement," filed on Mar. 21, 2019, now U.S. Pat. No. 10,903,785 which issued on Jan. 26, 2021, which claims the benefit of U.S. Provisional Application No. 62/645,963 filed on Mar. 21, 2018, and entitled "PV Module Mounting Assembly with Clamp/Standoff Arrangement", and the entire disclosure of each of which is hereby incorporated herein by reference.

FIELD OF THE INVENTION

The present invention generally relates to installing structures on a building surface and, more particularly, to mounting devices for installing attachments, such as photovoltaic modules, on such a building surface.

BACKGROUND

Metal panels are being increasingly used to define building surfaces such as roofs and sidewalls. One type of metal panel is a standing seam panel, where the edges of adjacent standing seam panels of the building surface are interconnected in a manner that defines a standing seam. Standing seam panels are expensive compared to other metal panels, and building surfaces defined by metal panels may be more costly than other types of building surface constructions.

It is often desirable to install various types of structures on building surfaces, such as heating, air conditioning, and ventilation equipment. Installing structures on standing seam panel building surfaces in a manner that punctures the building surface at one or more locations is undesirable in a number of respects. One is simply the desire to avoid puncturing what is a relatively expensive building surface. Another is that puncturing a metal panel building surface can present leakage and corrosion issues.

Photovoltaic or solar cells have existed for some time and have been installed on various building roofs. A photovoltaic cell is typically incorporated into a perimeter frame of an appropriate material (e.g., aluminum) to define a photovoltaic module or solar cell module. Multiple photovoltaic modules may be installed in one or more rows (e.g., a string) on a roofing surface to define an array.

FIG. 1 illustrates one prior art approach that has been utilized to mount a solar cell module to a standing seam. A mounting assembly 10 includes a mounting device 74, a bolt 14, and a clamping member 142. Generally, the mounting device 74 includes a slot 90 that receives at least an upper portion of a standing seam 42. A seam fastener 106 is directed through the mounting device 74 and into the slot 90 to forcibly retain the standing seam 42 therein. This then mounts the mounting device 74 to the standing seam 42.

A threaded shaft 22 of the bolt 14 from the mounting assembly 10 passes through an unthreaded hole in a base 154 of a clamping member 142, and into a threaded hole 98 on an upper surface 78 of the mounting device 74. This then mounts the clamping member 142 to the mounting device 74. The clamping member 142 is used to interconnect a pair of different solar cell module frames 62 with the mounting assembly 10. In this regard, the clamping member 142 includes a pair of clamping legs 146, where each clamping leg 146 includes an engagement section 152 that is spaced from the upper surface 78 of the mounting device 74. The bolt 14 may be threaded into the mounting device 74 to engage a head 18 of the bolt with the base 154 of the clamping member 142. Increasing the degree of threaded engagement between the bolt 14 and the mounting device 74 causes the engagement sections 152 of the clamping legs 146 to engage the corresponding solar cell module frame 62 and force the same against the upper surface 78 of the mounting device 74.

BRIEF DESCRIPTION OF THE FIGURES

FIG. 13A is a perspective view of a stanchion used by the mounting assembly of FIG. 11.

FIG. 13B is a cutaway view of the stanchion of FIG. 13A.

FIG. 13C is a side view of the stanchion of FIG. 13A.

FIG. 25A is an exploded, end view of another embodiment of a mounting assembly that accommodates engaging a pair of photovoltaic modules.

FIG. 25B is an end view of a clamp used by the mounting assembly of FIG. 25A.

DETAILED DESCRIPTION

Figure 1:
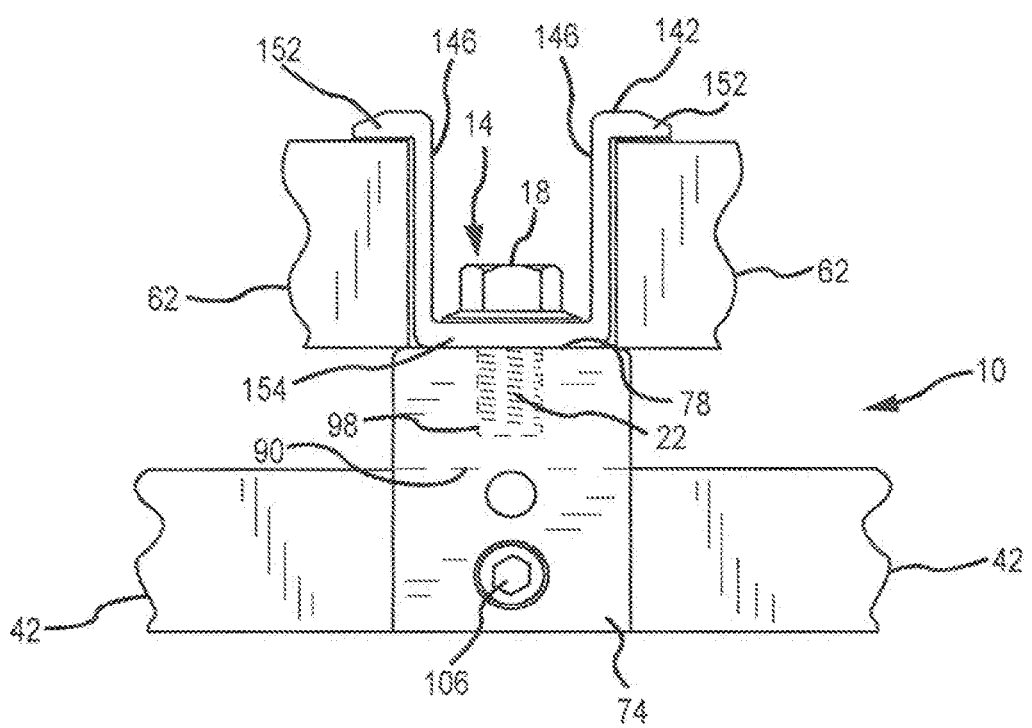
FIG. 1 is a side view of a prior art mounting assembly for interconnecting solar cell modules with a standing seam roof.
Figure 2:
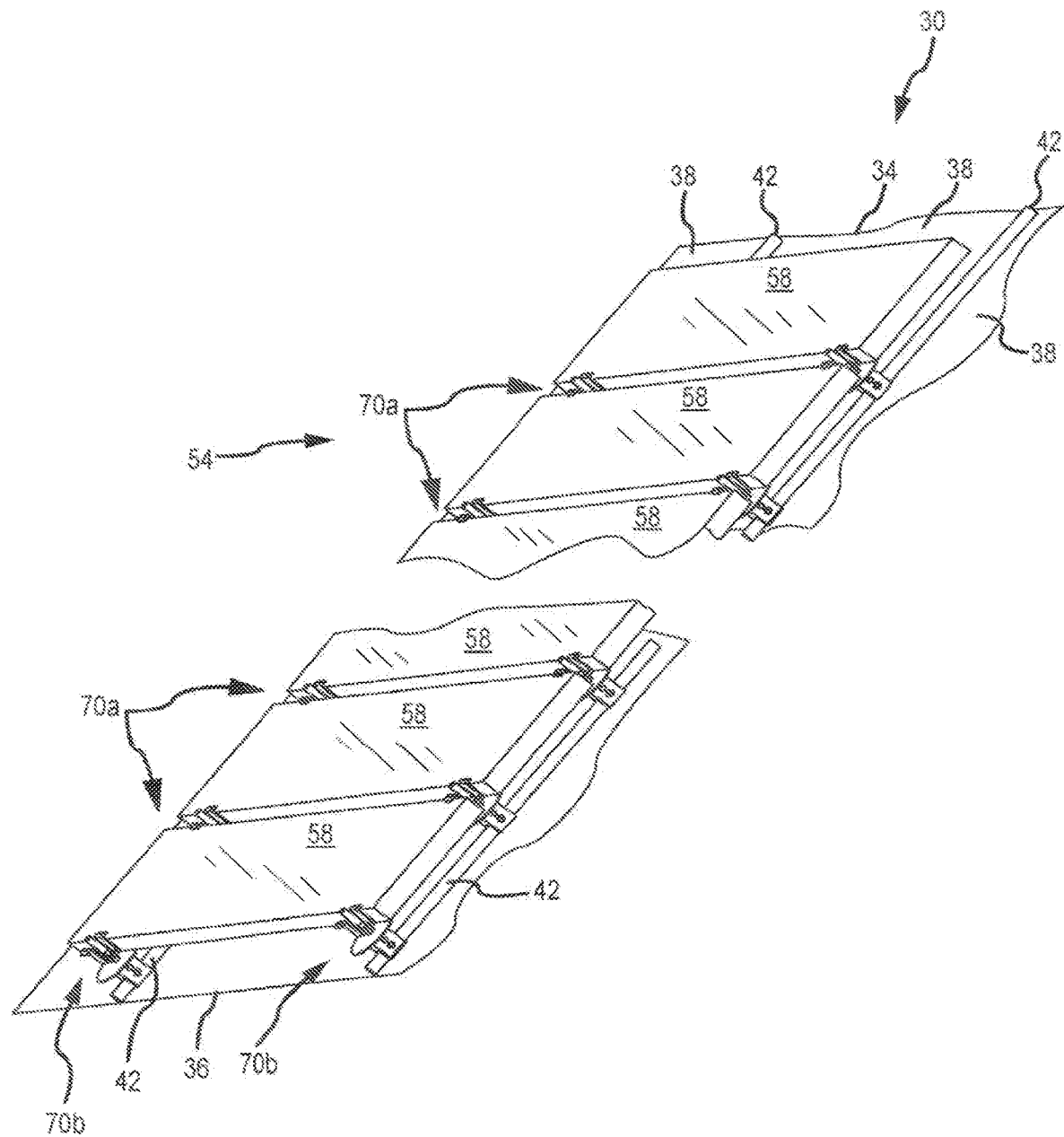
FIG. 2 is a perspective view of a plurality of solar cell modules installed on a standing seam building surface using a plurality of adjustable mounting assemblies.

FIG. 2 illustrates an assembly 30 in the form of a building surface 34, a photovoltaic module or solar cell array 54 defined by a plurality of photovoltaic modules or solar cell modules 58 (only schematically shown in FIG. 2), and a plurality of mounting assemblies 70a, 70b. The building surface 34 is defined by interconnecting a plurality of panels 38. Although the panels 38 may be formed from any appropriate material or combination of materials, typically they are in the form of metal panels 38. In any case, each adjacent pair of panels 38 is interconnected in a manner so as to define a standing seam 42 (only schematically shown in FIG. 2). A base 46 is disposed between the opposing edges of each panel 38 (e.g., FIG. 3). The entirety of the base 46 may be flat or planar. However, one or more small structures may be formed/shaped into the base 46 of one or more panels 38 of the building surface 34 to address oil canning. These structures are commonly referred to as crests, minor ribs, intermediate ribs, pencil ribs, striations, fluting, or flutes.

Figure 3:
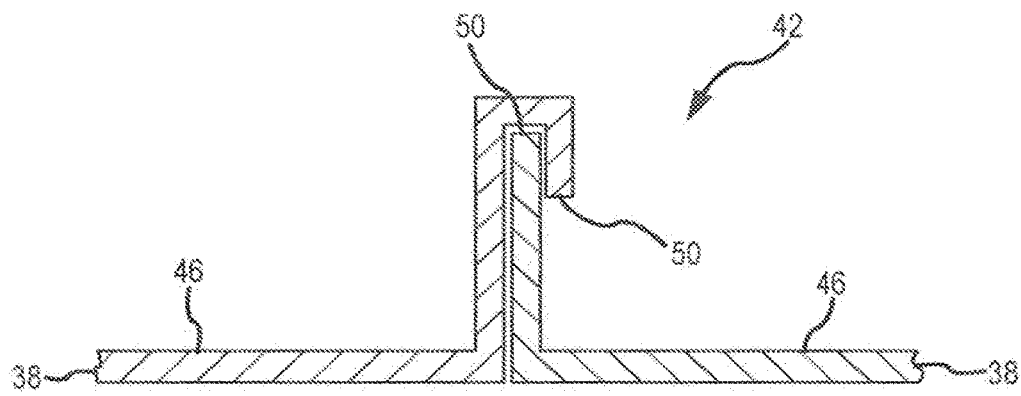
FIG. 3 is a cross-sectional schematic of a representative standing seam defined by interconnecting a pair of panels.

A cross-sectional schematic of one of the standing seams 42 is illustrated in FIG. 3. A pair of interconnected panels 38 define a standing seam 42. Generally, an edge or edge section 50 of one panel 38 is "nested" with the opposing edge or edge section 50 of the adjacent panel 38 to define a standing seam 42. Typically, each the two opposing edges 50 of a given panel 38 will be of a different configuration. That way, one edge 50 (one configuration) of one panel 38 will be able to "nest" with one edge 50 (another configuration) of the adjacent panel 38. Various configurations may be employed for the edges 50 of the panels 38, which may result in different configurations/profiles for the corresponding standing seam 42.

Figure 4:
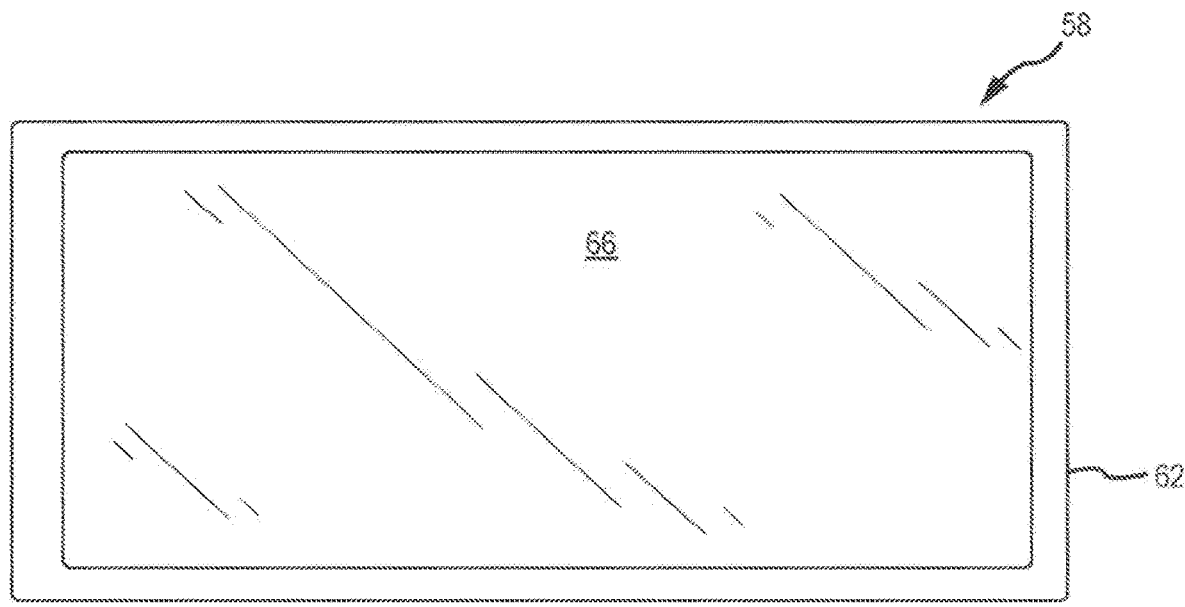
FIG. 4 is a top view of one of the solar cell modules illustrated in FIG. 2.

A more detailed view of one of the photovoltaic modules or solar cell modules 58 from FIG. 2 is presented in FIG. 4. Each solar cell module 58 includes a frame 62 that is disposed about the corresponding solar cell 66. The frame 62 may be of any appropriate size, shape, configuration, and/or type, and may be formed from any appropriate material or combination of materials. In the illustrated embodiment, the frame 62 is of a rectangular profile, and may be formed from an appropriate metal or metal alloy (e.g., aluminum). Similarly, the photovoltaic cell or solar cell 66 may be of any appropriate size, shape, configuration and/or type to convert light into electricity. Typically, the solar cell 66 will be in the form of a substrate having a stack of a plurality of layers. Any number of solar cell modules 58 may be used for the solar cell array of FIG. 2, and multiple solar cell modules 58 may be disposed in any appropriate arrangement (e.g., any appropriate number of rows and/or columns of solar cell modules 58).

Figure 5:
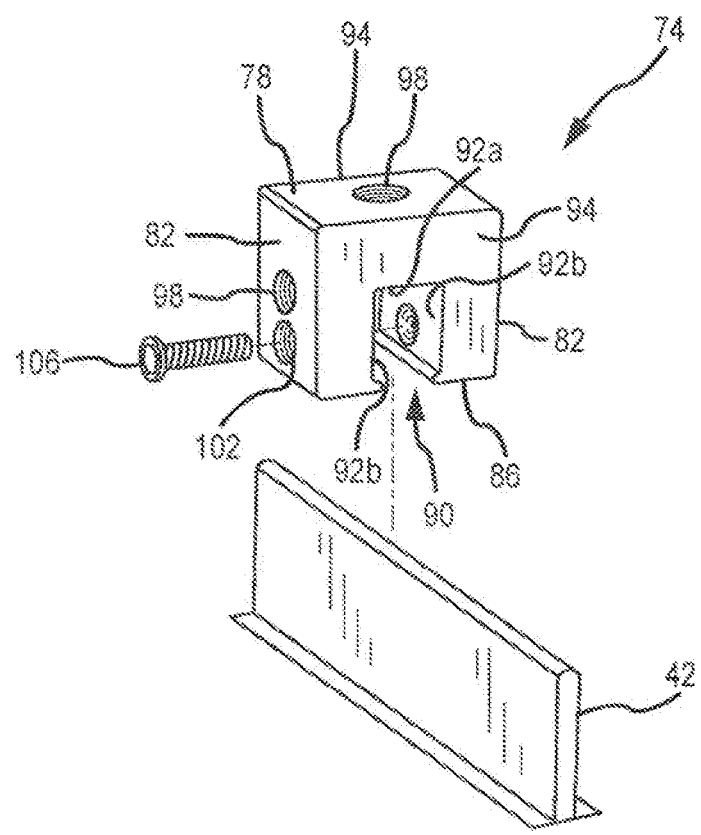
FIG. 5 is a perspective view of one of the mounting devices that is installed on a standing steam in FIG. 2.

The mounting assemblies 70*a*, 70*b* that are used to install the solar cell array 54 onto the building surface 34 in FIG. 2 utilize a mounting device 74 that may be of any appropriate size, shape, configuration, and/or type. One configuration of a mounting device that may be installed on a standing seam 42 is illustrated in FIG. 5 and is identified by reference numeral 74. This mounting device 74 includes an upper surface 78 and an oppositely disposed bottom surface 86, a pair of oppositely disposed side surfaces 82, and a pair of oppositely disposed ends 94. The upper surface 78 includes a threaded hole 98, as does at least one of the side surfaces 82, while the bottom surface 86 includes a slot 90 that extends between the two ends 94 of the mounting device 74.

The slot 90 on the bottom surface 86 of the mounting device 74 includes a base 92*a* and a pair of sidewalls 92*b* that are spaced apart to receive at least an end section of a standing seam 42. One or more seam fasteners 106 may be directed through a threaded hole 102 of the mounting device 74 and into the slot 90 to engage the standing seam 42 and secure the same against the opposing slot sidewall 92*b*. A cavity of any appropriate type may be on this opposing slot sidewall 92*b* to allow the aligned seam fastener 106 to deflect a corresponding portion of the standing seam 42 into this cavity, although such may not be required in all instances. In any case and in one embodiment, the seam fastener 106 only interfaces with an exterior surface of the standing seam 42. For instance, the end of the seam fastener 106 that interfaces with the standing seam 42 may be convex, rounded, or of a blunt-nosed configuration to provide a desirable interface with the standing seam 42.

Other mounting device configurations may be appropriate for mounting on standing seam 42 and may be used in place of the mounting device 74 shown in FIG. 5. Various mounting device configurations are disclosed in U.S. Pat. Nos. 5,228.248; 5,483,772; 5,491,931; 5,694,721; 5,715,640; 5,983,588; 6,164,033; 6,718,718; 7,100,338; and 7,013,612, various configurations may be utilized by either of the mounting assemblies 70*a*, 70*b*.

Figure 6:
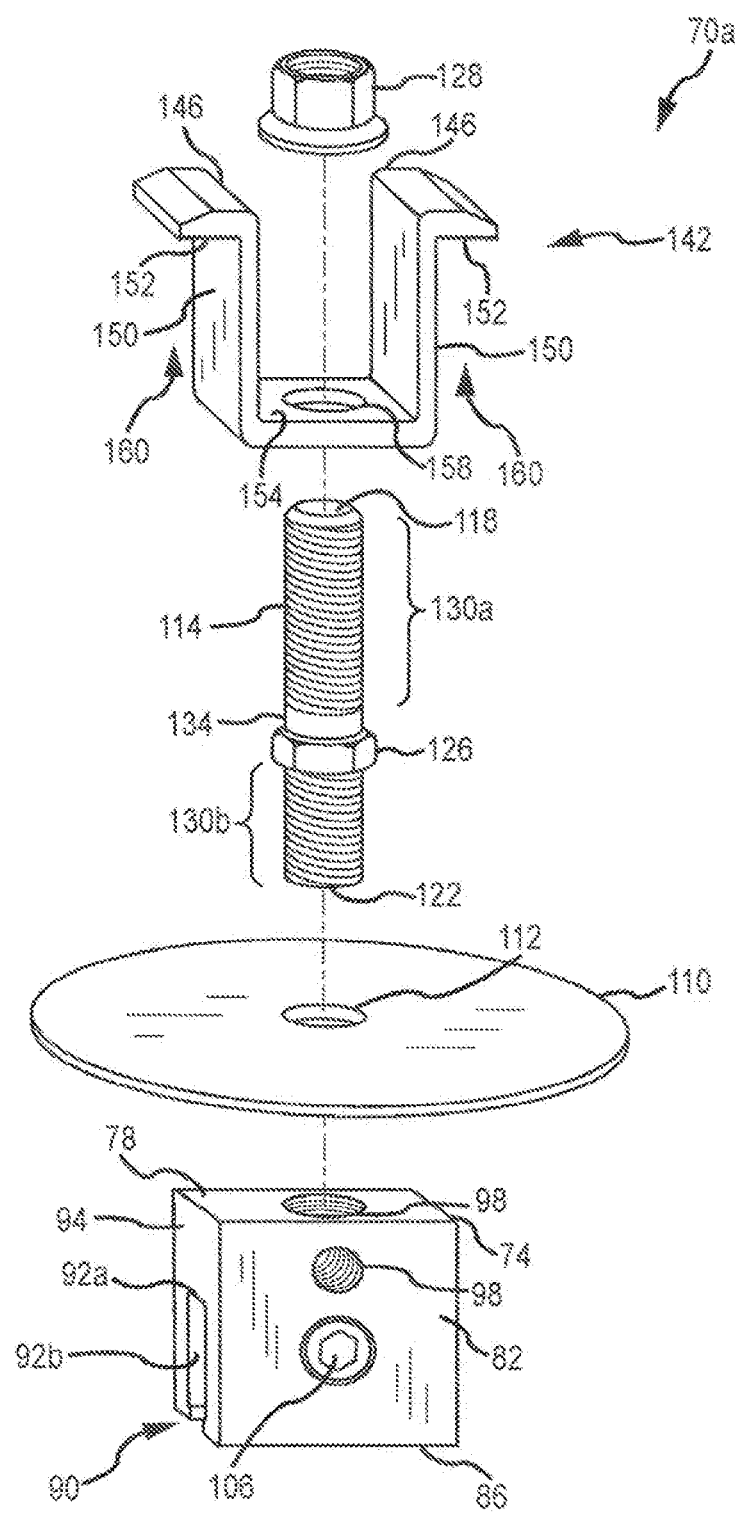
FIG. 6 is an exploded, perspective view of one of the adjustable mounting assemblies from FIG. 2.

The mounting assembly 70*a* that is used in the installation of a pair of adjacent solar cell modules 58 in FIG. 2, and that may use a mounting device 74, is illustrated in FIG. 6. The mounting assembly 70*a* includes a mounting device 74, along with a mounting plate 110, a clamping member 142, a stud 114, and a nut 128. The mounting plate 110 is disposed on the upper surface 78 of the mounting device 74, and includes a hole or aperture 112 that allows the stud 114 to pass therethrough. The mounting plate 110 may be utilized when it may be desirable to enhance the stability of the mounting assembly 70*a*, and in any case may be of any appropriate size, shape, configuration and/or type. In some embodiments, the mounting plate 110 is circular, which beneficially avoids any need for the mounting plate to be aligned in a particular direction. The surface area of the mounting plate 110 is at least about 5 $in^2$ in one embodiment, and is at least about 7 $in^2$ in another embodiment. It may be possible to eliminate the mounting plate 110 from the mounting assembly 70*a*, for instance when the surface area of the upper surface 78 of the mounting device 74 is sufficiently large.

The stud 114 provides an interface between the clamping member 142 and the mounting device 74, and includes a first stud end 118 and an oppositely disposed second stud end 122. A nut 126 is disposed between the first stud end 118 and the second stud end 122, and is fixed to the stud 114 in any appropriate manner (e.g., welded). That is, the nut 126 does not move relative to the stud 114, such that the nut 126 and stud 114 will move together as a single unit. In one embodiment, the nut 126 is threaded onto the stud 114, and is then fixed in the desired location.

A first threaded section 130*a* extends from the first stud end 118 toward the second stud end 122, while a second threaded section 130*b* extends from the second stud end 122 toward the first stud end 118. An unthreaded section 134 is disposed between the fixed nut 126 and the first threaded section 130*a* in the illustrated embodiment. However, the first threaded section 130*a* could extend all the way to the fixed nut 126 (e.g., the entire stud 114 could be threaded). In one embodiment, the length of the first threaded section is at least about 1.5 inches.

The second stud end 122 may be directed through the hole 112 in the mounting plate 110 if being utilized, and in any case into a threaded hole 98 of the mounting device 74. It should be appreciated that the mounting device 74 could also be disposed in a horizontal orientation on a standing seam having a horizontally disposed end section versus the vertically disposed orientation of the end section of the standing seam 42, and that in this case the second stud end 122 would be directed into the threaded hole 98 on a side surface 82 of the mounting device 74 (e.g., the mounting plate 110 could then be disposed on such a side surface 82 if desired/required). In any case, the stud 114 may be tightened onto the mounting device 74 by having an appropriate tool engage the fixed nut 126 to rotate the stud 114 relative to the mounting device 74 and into a desired forcible engagement with the mounting plate 110 or with the corresponding surface of the mounting device 74 if the mounting plate 110 is not being used. In one embodiment, the fixed nut 126 is located along the length of the stud 114 such that the second stud end 122 does not extend into the slot 90 of the mounting device 74 when the stud 114 is tightened onto the mounting device 74. Having this stud end 122 extend into the slot 90 could potentially damage the standing seam 42.

The clamping member 142 includes a base 154 that is disposed on the fixed nut 26 of the stud 114. A hole 158 extends through the base 154 and is aligned with a threaded hole 98 of the mounting device 74. In the illustrated embodiment, the hole 156 in the clamping member 142 is not threaded such that the clamping member 142 may "slide" along the stud 114.

A pair of clamping legs 146 that are disposed in opposing relation extend upwardly from the base 154 in a direction that is at least generally away from the mounting device 74 when the mounting assembly 70*a* is installed, such that the base 154 and clamping legs 146 define an at least generally U-shaped structure. Each clamping leg 146 includes an extension 150 and an engagement section 152. The engagement sections 152 are disposed in a different orientation than the extensions 150, and function to provide a surface to engage and clamp a structure to the mounting assembly 70*a*. In the illustrated embodiment, the engagement sections 150 include teeth, serrations, or the like to enhance the "grip" on the structure being clamped to the mounting assembly 70*a*. The clamping legs 146 may be of any appropriate size, shape, and/or configuration for clamping a structure to the mounting assembly 70*a*. Generally, a pocket 160 is defined between each engagement section 152 and the underlying mounting plate 110/mounting device 74 for receiving a structure to be clamped to the mounting assembly 70a.

Figure 7A:
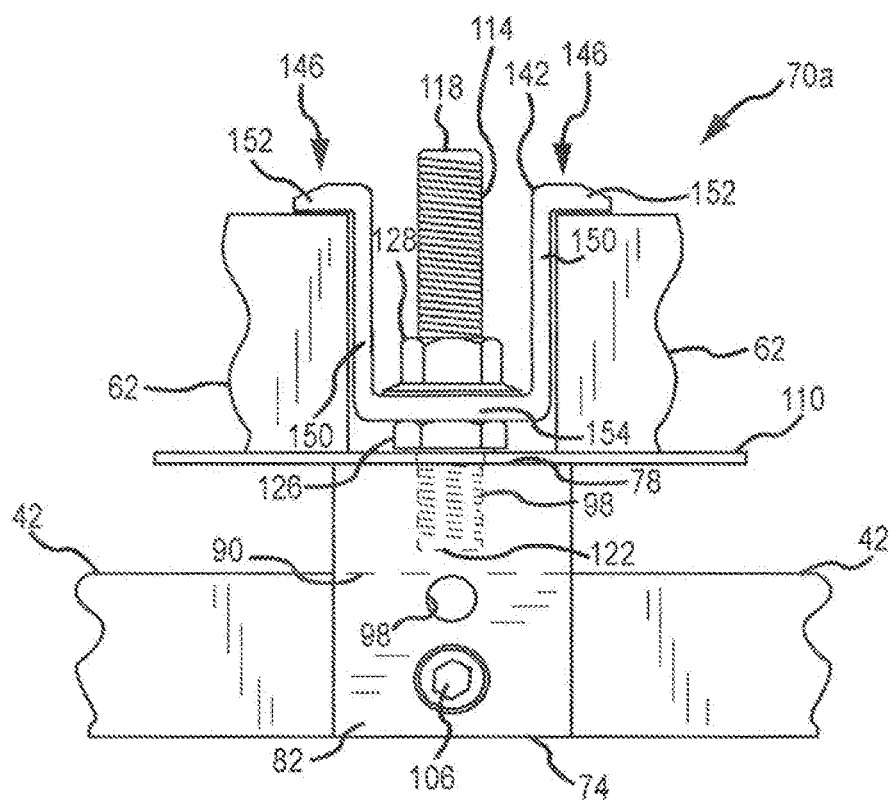
FIG. 7A is a side view of one of the adjustable mounting assemblies from FIG. 2, and which is engaging a pair of solar cell module frames.

FIG. 7A illustrates one of the mounting assemblies 70a from FIG. 2, which again interfaces with a pair of solar cell modules 58. Installation of such a mounting assembly 70a could entail directing at least the upper portion of the standing seam 42 into the slot 90 of the mounting device 74. Thereafter, the mounting device 74 may be secured to the standing seam 42 using at least one seam fastener 106. Once again, the seam fastener 106 may be directed through the mounting device 74 and into the slot 90 to force a corresponding portion of the standing seam 42 against the opposing slot sidewall 92b.

The mounting plate 110 may be disposed on the upper surface 78 of the mounting device 74 such that its hole 112 is aligned with a threaded hole 98 on the mounting device 74 that will receive the stud 114. The second stud end 122 may then be directed through the hole 112 of the mounting plate 110 such that the stud 114 may be threaded to the mounting device 74 (e.g., using a wrench on the fixed nut 126 to clamp the mounting plate 110 between the fixed nut 126 and the mounting device 74). At this time, the lower surface of the fixed nut 126 engages the upper surface of the mounting plate 110 or a corresponding surface of the mounting device 74 if the mounting plate 110 is not used. As previously noted, and as illustrated in FIG. 7A, in one embodiment the second stud end 122 does not pass into the slot 90 of the mounting device 74. It should be appreciated that the mounting plate 110 and stud 114 could be installed on the mounting device 74 prior to its installation on the standing seam 42.

A frame 62 from one of the solar cell modules 58 may be positioned on one side of the mounting plate 110, while a frame 62 from another of the solar cell modules 58 may be positioned on the opposite side of the mounting plate 110. The clamping member 142 may or may not be positioned on the stud 114 at the time the solar cell module frames 62 are positioned on the mounting plate 110. In any case, the first stud end 118 may be directed through the hole 158 on the base 154 of the clamping member 142. At this time a portion of one solar cell module frame 62 will then be positioned between the mounting plate 110 and the engagement section 152 of one of the clamping legs 146, while a portion of another solar cell module frame 62 will then be positioned between the mounting plate 110 and the engagement section 152 of the other clamping leg 146. The nut 128 may then be threaded onto the first stud end 118 of the stud 114 until the engagement sections 152 of the clamping member 142 exert a desired force on the two solar cell module frames 62 (e.g., to clamp these frames 62 between the engagement sections 152 of the clamping member 142 and the mounting plate 110, or between the engagement sections 152 of the clamping member 142 and the mounting device 74 if the mounting plate 110 is not being used). That is, turning the nut 128 may move the clamping member 142 along the stud 114 and toward the mounting device 74 (e.g., by the clamping member 142 "sliding" along the stud 114) to generate the desired clamping action. It should be appreciated that the clamping member 142 and possibly the nut 128 could be pre-positioned on the stud 114 before the solar cell module frames 62 are positioned on the mounting plate 110, although this may require that the clamping member 142 be lifted to a degree when the solar cell module frames 62 are positioned on the mounting plate 110 to accommodate positioning the frames 62 under the engagement sections 152 of the clamping member 142.

Figure 7B:
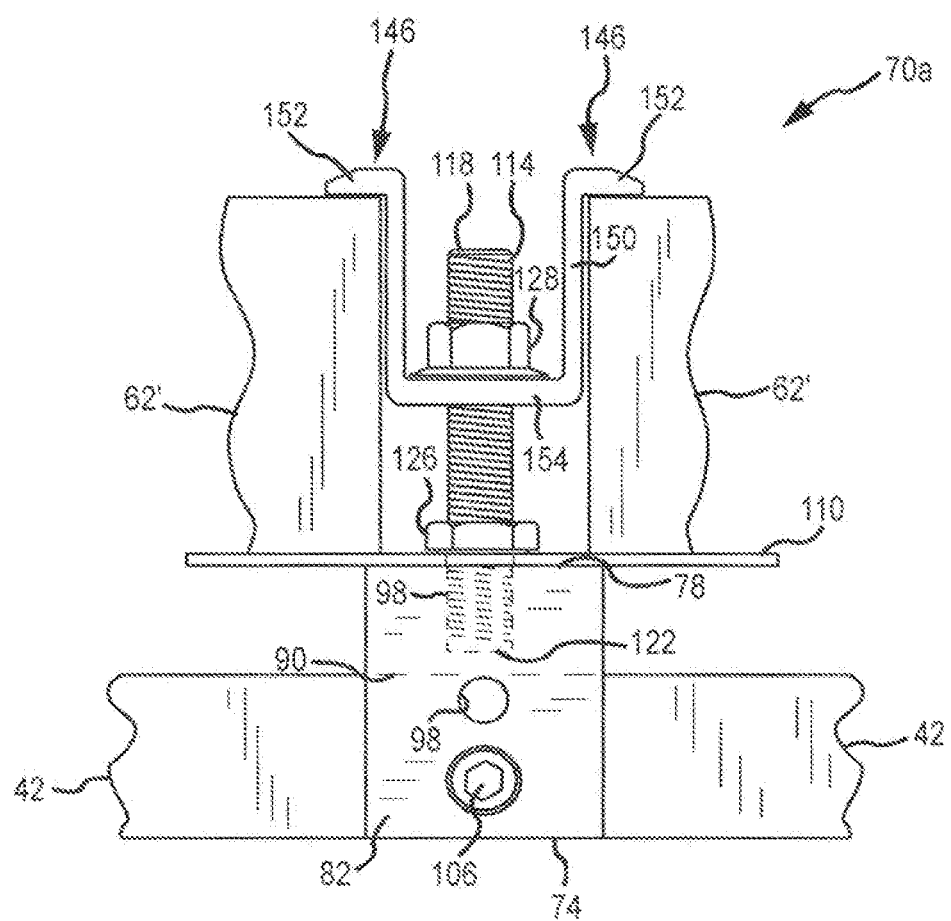
FIG. 7B shows the mounting assembly of FIG. 7A being used for solar cell module frames having a different thickness than those illustrated in FIG. 7A.

As evident by a review of FIG. 7A, the stud 114 may extend beyond the nut 128 in the installed configuration. Preferably the first threaded section 130a of the stud 114 is of a length that allows the mounting assembly 70a to be used to clamp structures of various thicknesses to the mounting assembly 70a. For instance, FIG. 7B illustrates a pair of solar cell module frames 62' being clamped to the mounting assembly 70a, where these frames 62' are thicker than the frames 62 presented in FIG. 7A. In one embodiment, the length of the first threaded section 130a is at least about 1.5 inches, and which accommodates use of the mounting assembly 70a to clamp solar cell modules of a number of different thicknesses (e.g., the fixed nut 126 may be spaced from the first stud end 118 by a distance of at least about 1.5 inches, the first threaded section 130a may extend all the way to the fixed nut 126, or both).

Figure 7C:
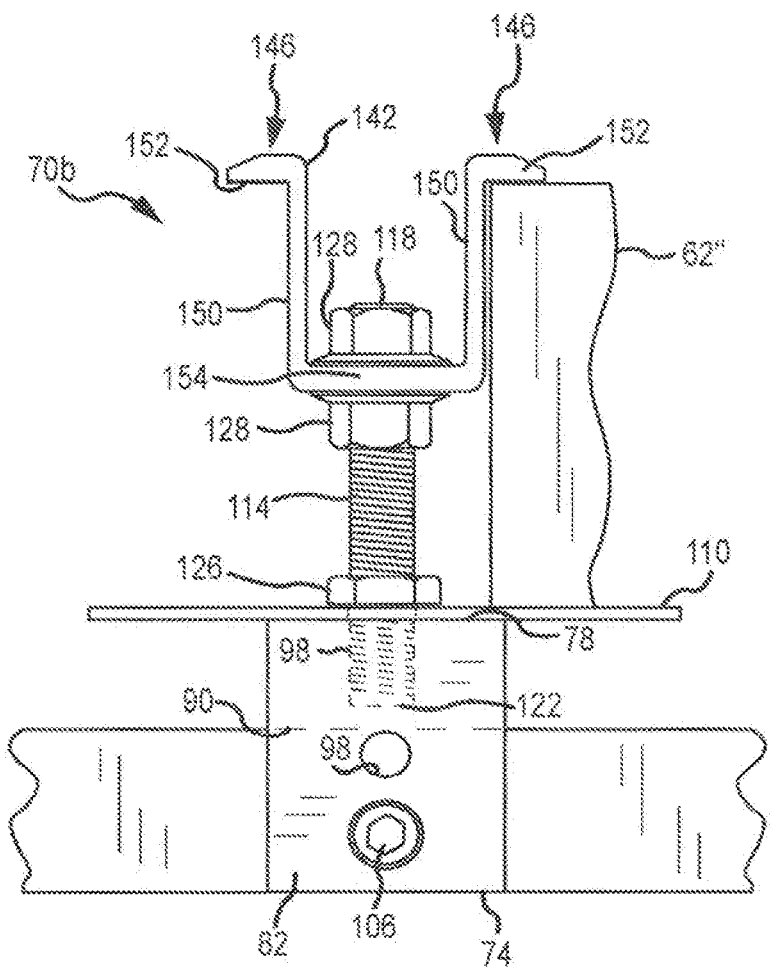
FIG. 7C is a side view of one of the adjustable mounting assemblies from FIG. 2 that is disposed adjacent to an edge of the building surface, and which is engaging a single solar cell module frame.

The above-described mounting assemblies 70a may be used to simultaneously engage the frame 62 of a pair of solar cell modules 58. In at least some cases, there may only be a need to engage a single solar cell 58, such as in the case of those solar cells 58 that are disposed closest to an edge 36 of the building surface 34 (FIG. 2). FIG. 7C illustrates a configuration for this situation, and which is identified by reference numeral 70b. Corresponding parts of the mounting assemblies 70a and 70b are identified by the same reference numeral. The only difference between the mounting assembly 70b and the mounting assembly 70a is that an additional nut 128 is used by the mounting assembly 70b. Therefore, the remainder of the discussion presented above also applies to the mounting assembly 70b.

Generally, one nut 128 is threaded onto the first stud end 118, followed by positioning a clamping member 142 over the first stud end 118 and onto the stud 114, then followed by a second nut 128 that is threaded onto the first stud end 118. The lower nut 128 may be threaded down a sufficient distance on the stud 114. Thereafter, the top nut 128 may be threaded to clamp a solar cell module frame 62" between the mounting plate 110 and the engagement section 152 of one of the clamping members 142. The lower nut 128 may then be threaded upwardly on the stud 118 to engage the underside of the base 154 of the clamping member 142.

Another embodiment of a mounting assembly, which may be used for mounting photovoltaic or solar cell modules to a building surface having a plurality of standing seams defined by a plurality of interconnected panels, is illustrated in FIGS. 8A-F and is identified by reference numeral 70c. Corresponding components between the mounting assembly 70c and the above-discussed mounting assembly 70a are identified by the same reference numerals. Those corresponding components between these two embodiments that differ in at least some respect are identified by the same reference numeral, but with a "single prime" designation in relation to the mounting assembly 70c.

The mounting assembly 70c of FIGS. 8A-F utilizes the above-discussed mounting device 74, clamping member 142, and stud 114. All of the features discussed above in relation to each of these components remain equally applicable to the mounting assembly 70c. The mounting assembly 70c does utilize a mounting plate 110' that is positioned on an upper surface 78 of the mounting device 74, and that is located between the clamping member 142 and the mounting device 74 in a dimension corresponding with the length dimension of the stud 114. However, the mounting place 110' is of a different configuration than the mounting plate 110 utilized by the mounting assembly 70a, and therefore the "single prime" designation is utilized.

The mounting plate 110' includes an upper surface 170 and an oppositely disposed lower surface 176. The upper surface 170 includes a plurality of grounding projections 172. The grounding projections 172 may be integrally formed with a remainder of the mounting plate 110' (e.g., the mounting plate 110' and grounding projections 172 may be of one-piece construction, such that the individual grounding projections 172 do not need to be separately attached to the mounting plate 110'). Any appropriate number of grounding projections 172 may be utilized. Each grounding projection 172 may be of any appropriate size, shape, and/or configuration. The various grounding projections 172 may be equally spaced from the stud 114, may be equally spaced about the stud 114, or both.

In one embodiment, the number of grounding projections 172 is selected and the grounding projections 172 are arranged such that at least one grounding projection 172 will engage each photovoltaic module being mounted to a building surface by the clamp assembly 70c, regardless of the angular position of the mounting plate 110' relative to the stud 114. "Angular position" does not mean that the mounting plate 110' is disposed at an angle relative to the upper surface 78 of the mounting device 74. Instead, "angular position" means a position of the mounting plate 110' that may be realized by rotating the mounting plate 110' relative to the stud 114 and/or the mounting device 74. For example, the ends 94 of the mounting device 74 may define the 12 o'clock and 6 o'clock positions. The mounting plate 110' may be positioned on the mounting device 74 with each of its grounding projections 172 being disposed at any angle relative to the 12 o'clock position (e.g., in the 1 o'clock position, in the 2 o'clock position, in the 8 o'clock position, etc.), and yet at least one grounding projection 172 will engage each photovoltaic module being mounted to a building surface by the clamp assembly 70c. The "angle" of each such grounding projection 172 is the angle between first and second reference lines that are disposed within a common plane, the first reference line remaining in a fixed position relative to the mounting plate 110' and extending from the stud 114, for instance, to the 12 o'clock position. The second reference line may also extend from the stud 114 to a particular grounding projection 172, and thereby may rotate along with the mounting plate 110' as its angular position is adjusted relative to the stud 114 and/or mounting device 74.

The grounding projections 172 may facilitate establishing an electrical connection with and/or grounding one or more photovoltaic modules. In some embodiments, the grounding projections 172 may comprise a sharpened point or edge to pierce or penetrate a surface or surface coating of a frame/frame section of a photovoltaic module so as to be able to establish an electrical connection with the underlying metal of the frame/frame section. The grounding projections 172 may be characterized as providing electrical continuity between adjacent photovoltaic modules that are positioned on the same mounting plate 110' (e.g., an electrical path may encompass or include the frame of one photovoltaic module, one or more grounding projections 172 engaged therewith, the mounting plate 110', one or more additional grounding projections 172, and the frame of another photovoltaic module engaged by such an additional grounding projection(s) 172). This may be referred to in the art as "bonding." In any case, the grounding projections 172 may be used in providing a grounding function for a corresponding photovoltaic module(s). The electrical connection provided by the grounding projections 172 may be used to electrically connect adjacent photovoltaic modules (e.g., those positioned on a common mounting plate 110'), and which may be used to provide an electrical path to ground a string or collection of photovoltaic modules.

The mounting plate 110' also includes a raised structure 174 on its upper surface 170. The raised structure 174 may be disposed about the un-threaded hole 112 in the mounting plate 110' through which the stud 114 passes. Generally, and as will be discussed in more detail below, the raised structure 174 may be used to determine where a photovoltaic module should be positioned on the upper surface 170 of the mounting plate 110' to ensure that the clamping member 142 will adequately engage not only this photovoltaic module, but an adjacently disposed photovoltaic module as well. As such, the raised structure 174 may be characterized as a positional registrant or alignment feature for each adjacent pair of photovoltaic modules being clamped by a common mounting assembly 70c.

The raised structure 174 may be integrally formed with a remainder of the mounting plate 110' (e.g., the mounting plate 110' and raised structure 174 may be of one-piece construction, such that the raised structure 174 does not need to be separately attached to the mounting plate 110'). The raised structure 174 may be characterized as being doughnut-shaped. The raised structure 174 may extend completely about the stud 114, the stud 114 may extend through a center of the raised structure 174, or both. The raised structure 174 may be circular in a plan view. This alleviates the requirement to have the mounting plate 110' be in a certain angular position on the upper surface 78 of the mounting device 74 to provide its positional registration or alignment function in relation to the photovoltaic modules to be clamped. An outer perimeter of the raised structure 174 and an outer perimeter of the mounting plate 110' may be concentrically disposed relative to the stud 114. The raised structure 174 may be centrally disposed relative to an outer perimeter of the mounting plate 110'.

The lower surface 176 of the mounting plate 110' includes a plurality of wiring tabs or clips 178. The wiring clips 178 may be integrally formed with a remainder of the mounting plate 110' (e.g., the mounting plate 110' and wiring clips 178 may be of one-piece construction, such that the individual wiring clips 178 do not need to be separately attached to the mounting plate 110'). For instance, the wiring clips 178 could be "stamped" from the body of the mounting plate 110'. In this regard, the mounting plate 110' includes an aperture 184 for each such wiring clip 178. Any appropriate number of wiring clips 178 may be utilized. The various wiring clips 178 may be equally spaced from the stud 114, may be equally spaced about the stud 114, or both. In some embodiments, the mounting plate 110' may comprise one or more apertures 184 that do not correspond to a wiring clip 178.

In one embodiment, a number of wiring clips 178 is selected and the wiring clips 178 are arranged such that at least one wiring clip 178 should be available for holding/retaining one or more wires from/for each photovoltaic module being mounted to a building surface by the clamp assembly 70c, regardless of the angular position of the mounting plate 110' relative to the stud 114 and/or mounting device 74.

Each wiring clip 178 may be of any appropriate size, shape, and/or configuration. In the illustrated embodiment, each wiring clip 178 includes a first segment 180a that extends away from the lower surface 176 of the mounting plate 110', along with a second segment 180b that extends from a distal end of the first segment 180a. The second segment 180b may be disposed at least generally parallel with the lower surface 176 of the mounting plate 110'. In any case, the second segment 180b may include a recessed region 182 (e.g., a concave area) to facilitate retention of one or more wires and/or quick-connect leads.

A wiring clip 178 may be used to support and/or retain the quick-connect lead(s) associated with one of the photovoltaic modules being clamped by the corresponding mounting assembly 70c (e.g., by being positioned within the space between the second segment 180b of a given wiring clip 178 and the lower surface 176 of the mounting plate 110', for instance by resting in a concave portion of the second segment 180b in the form of the recessed region 182). Other wires could be directed into the space between the second segment 180b of a given wiring clip 178 and the lower surface 176 of the mounting plate 110'.

Another function is indirectly provided by the wiring clips 178. The aperture 184 associated with each wiring clip 178 provides a space through which an installer may direct a cable or zip tie or the like to bundle together various wires that may be located at a lower elevation than the mounting plate 110' (e.g., wires underneath the mounting assembly 70c; wires underneath a photovoltaic module being clamped by the mounting assembly 70c; wires in a space between a pair of photovoltaic modules being clamped by the mounting assembly 70c).

Figure 8A:
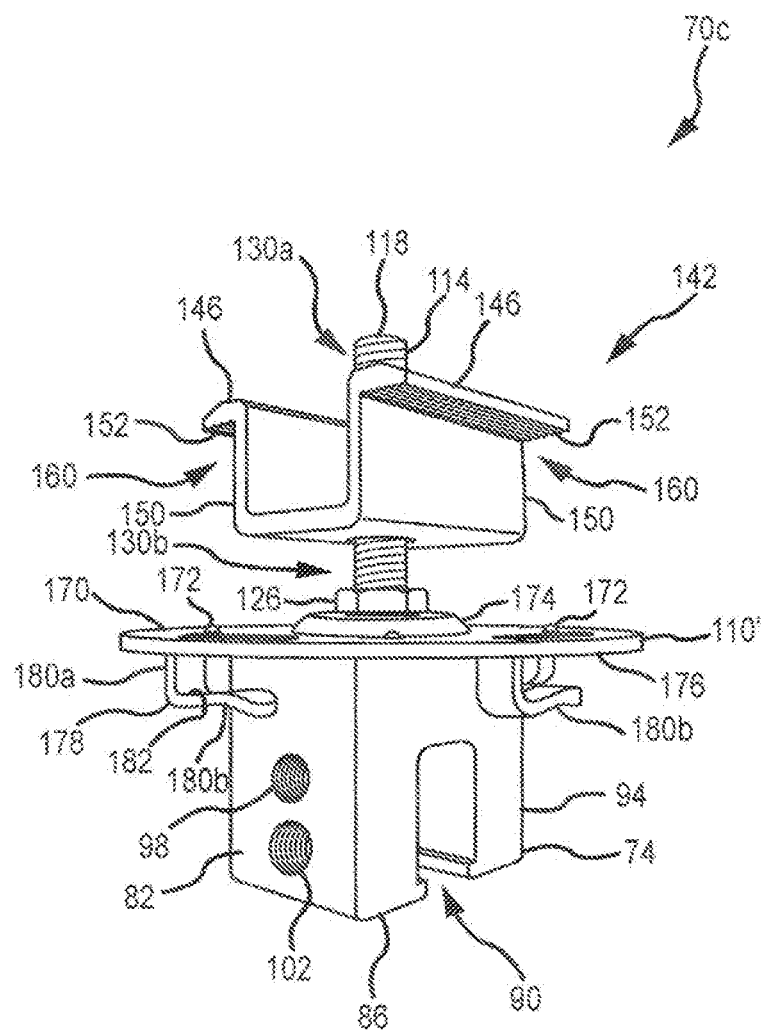
FIG. 8A is one side-based perspective view of another embodiment of a mounting assembly for photovoltaic modules.
Figure 8B:
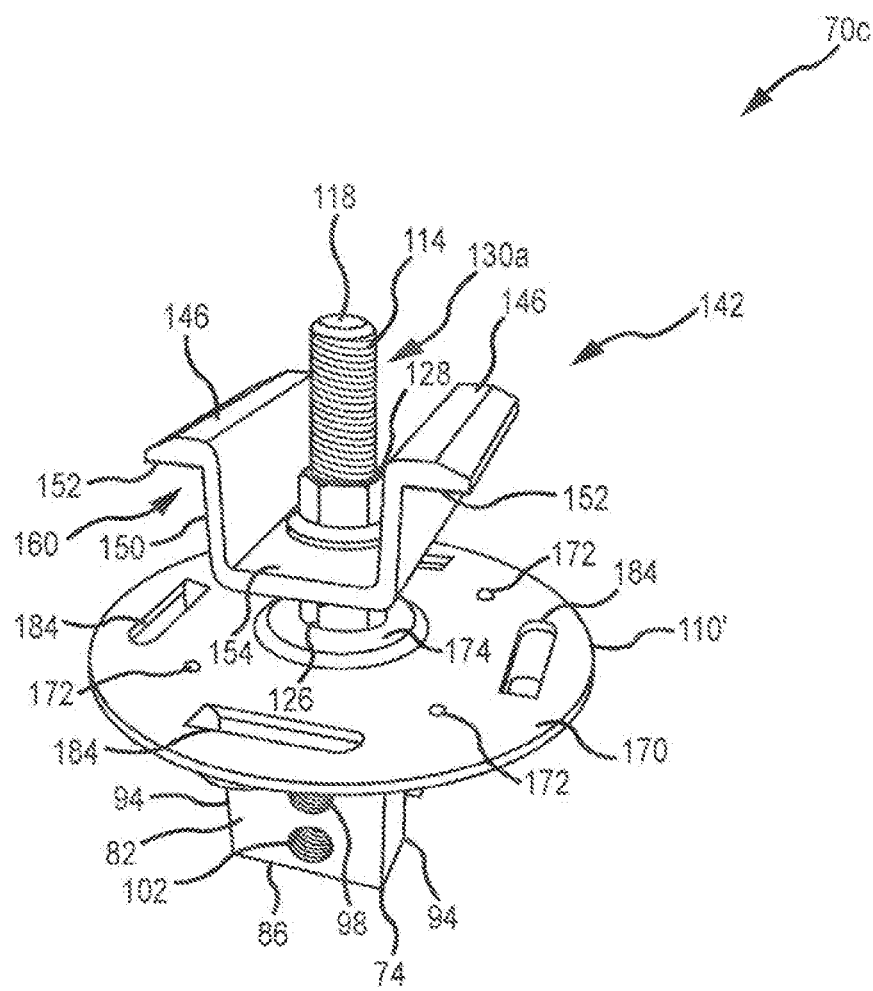
FIG. 8B is one top-based perspective view of the mounting assembly of FIG. 8A.
Figure 8C:
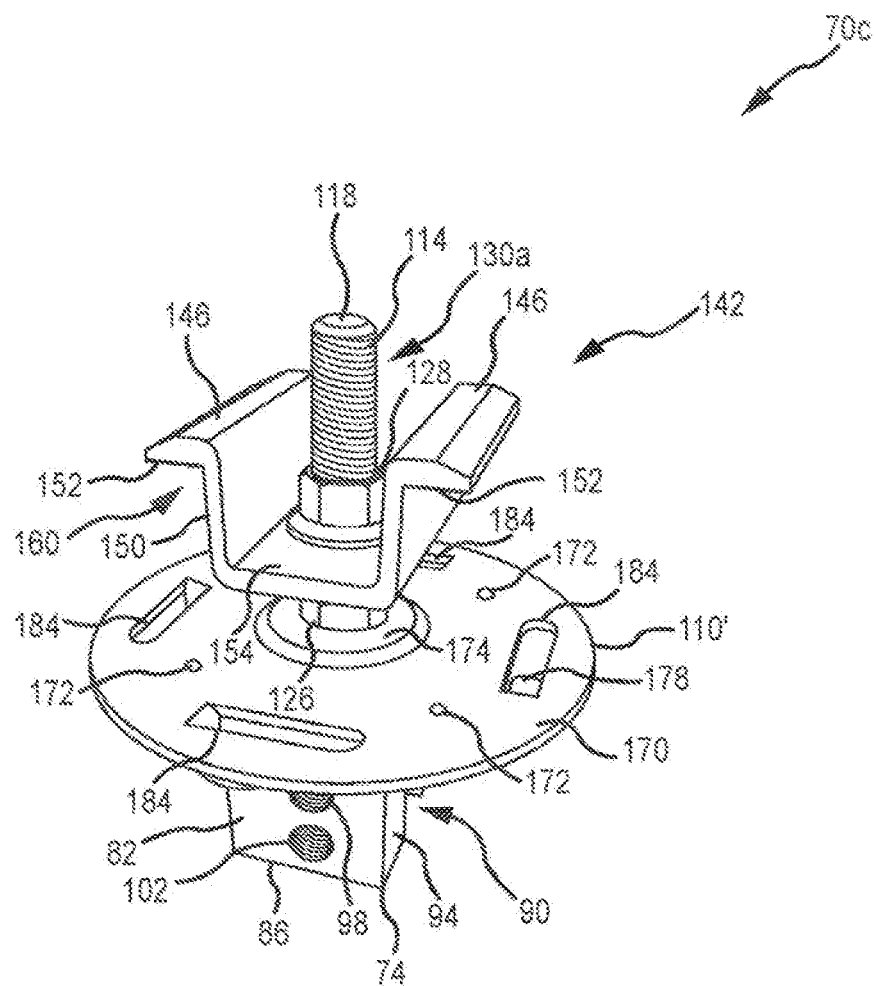
FIG. 8C is another top-based perspective view of the mounting assembly of FIG. 8A.
Figure 8D:
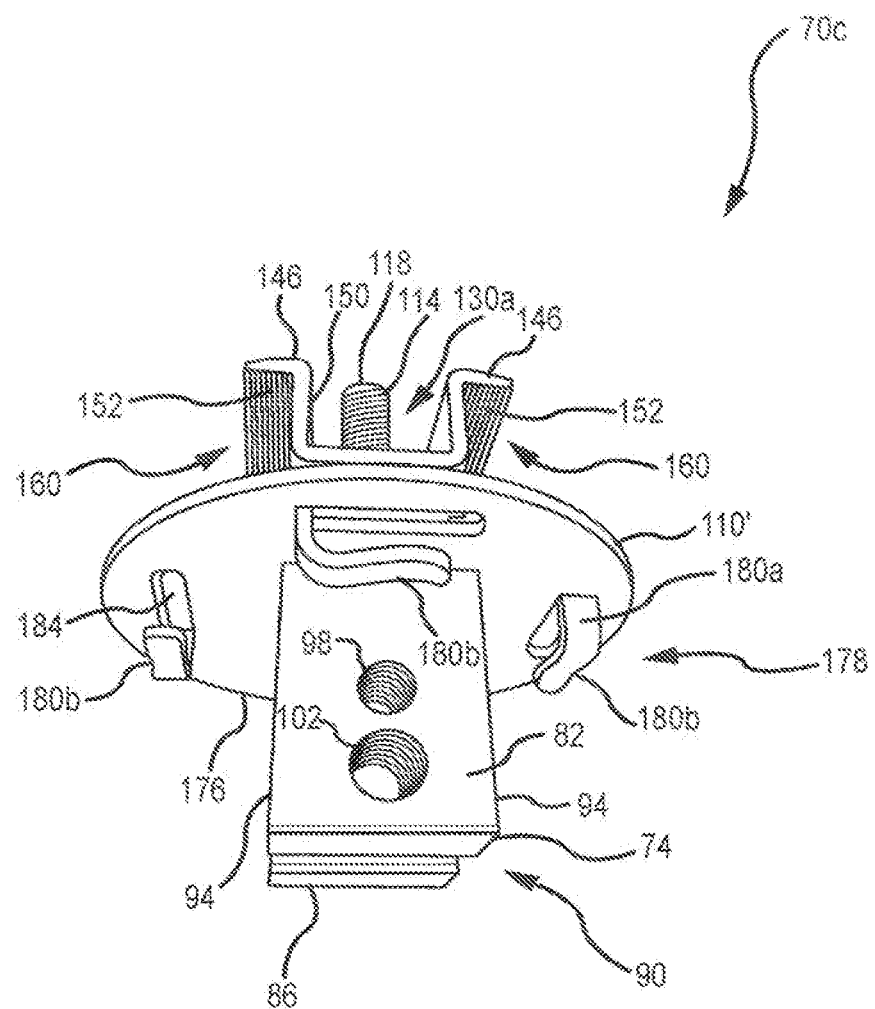
FIG. 8D is a bottom-based perspective view of the mounting assembly of FIG. 8A.
Figure 8E:
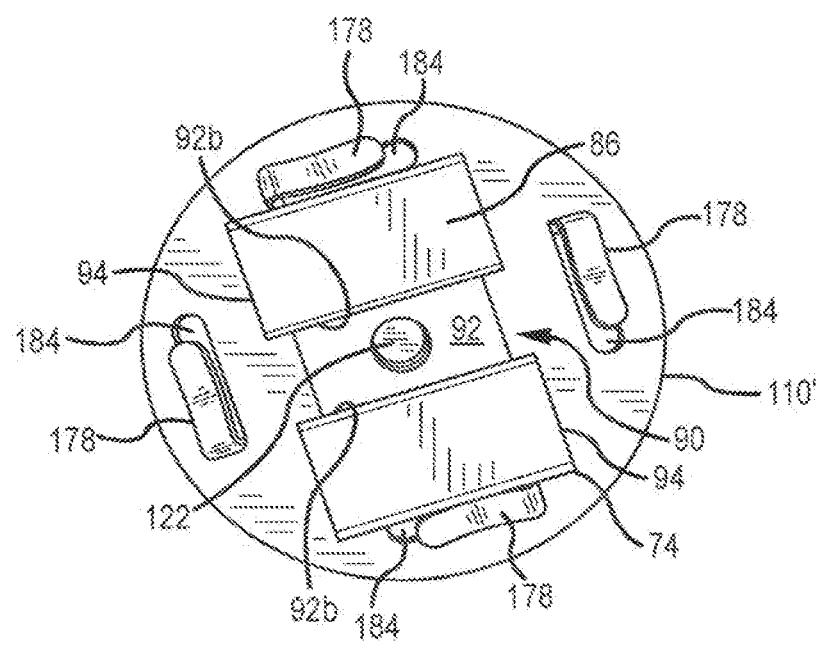
FIG. 8E is a plan view of a bottom of the mounting assembly of FIG. 8A.
Figure 8F:
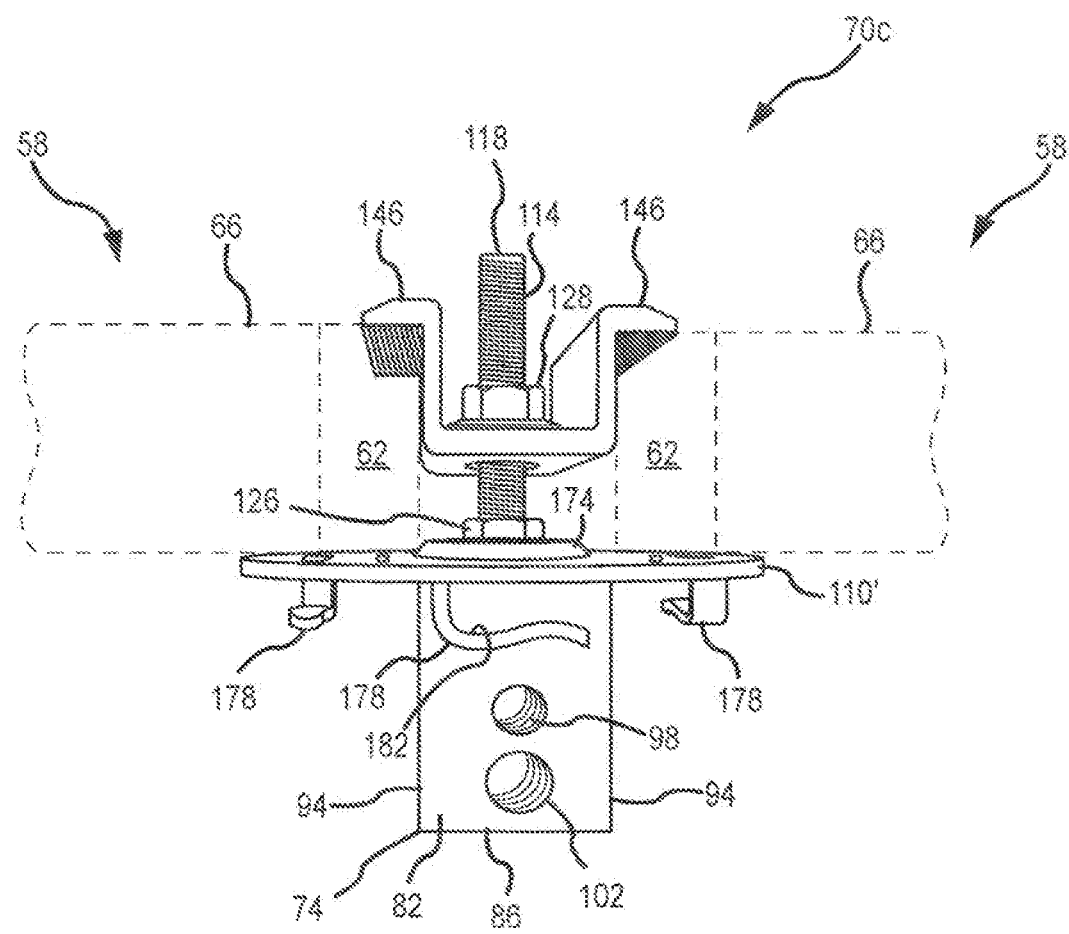
FIG. 8F is another side-based perspective view of the mounting assembly of FIG. 8A, and schematically illustrating the engagement of a pair of photovoltaic modules.

FIG. 8F schematically illustrates the positional registration/alignment function provided by the raised structure 174 of the mounting plate 110'. Here the frame 62 of one photovoltaic module 58 being clamped by the mounting assembly 70c abuts one portion on a perimeter of the raised structure 174, while the frame 62 of another photovoltaic module 58 being clamped by the mounting assembly 70c is disposed adjacent to (or possibly abutting with) an oppositely disposed portion on the perimeter of the raised structure 174. In one embodiment, the width or outer diameter of the raised structure 174 is the same as or slightly larger than the spacing between the two extensions 150 of the clamping member 142. In any case, the raised structure 174 should be sized such that when an adjacent pair of photovoltaic modules 58 are positioned to abut oppositely disposed portions on the perimeter of the raised structure 174, the clamping member 142 should be positionable on the stud 114 and should properly engage these photovoltaic modules.

At least one grounding projection 172 of the mounting plate 110' shown in FIG. 8F should be engaged with the frame 62 of one photovoltaic module 58 shown in FIG. 8F, and at least one other grounding projection 172 of this same mounting plate 110' should be engaged with the frame 62 of the other photovoltaic module 58 shown in FIG. 8F. This again provides electrical continuity between the two modules 58 shown in FIG. 8F—an electrical path exists from one module 58 to the other module 58 via the mounting plate 110' and each grounding projection 172 that is engaged with either of the modules 58.

Figure 9A:
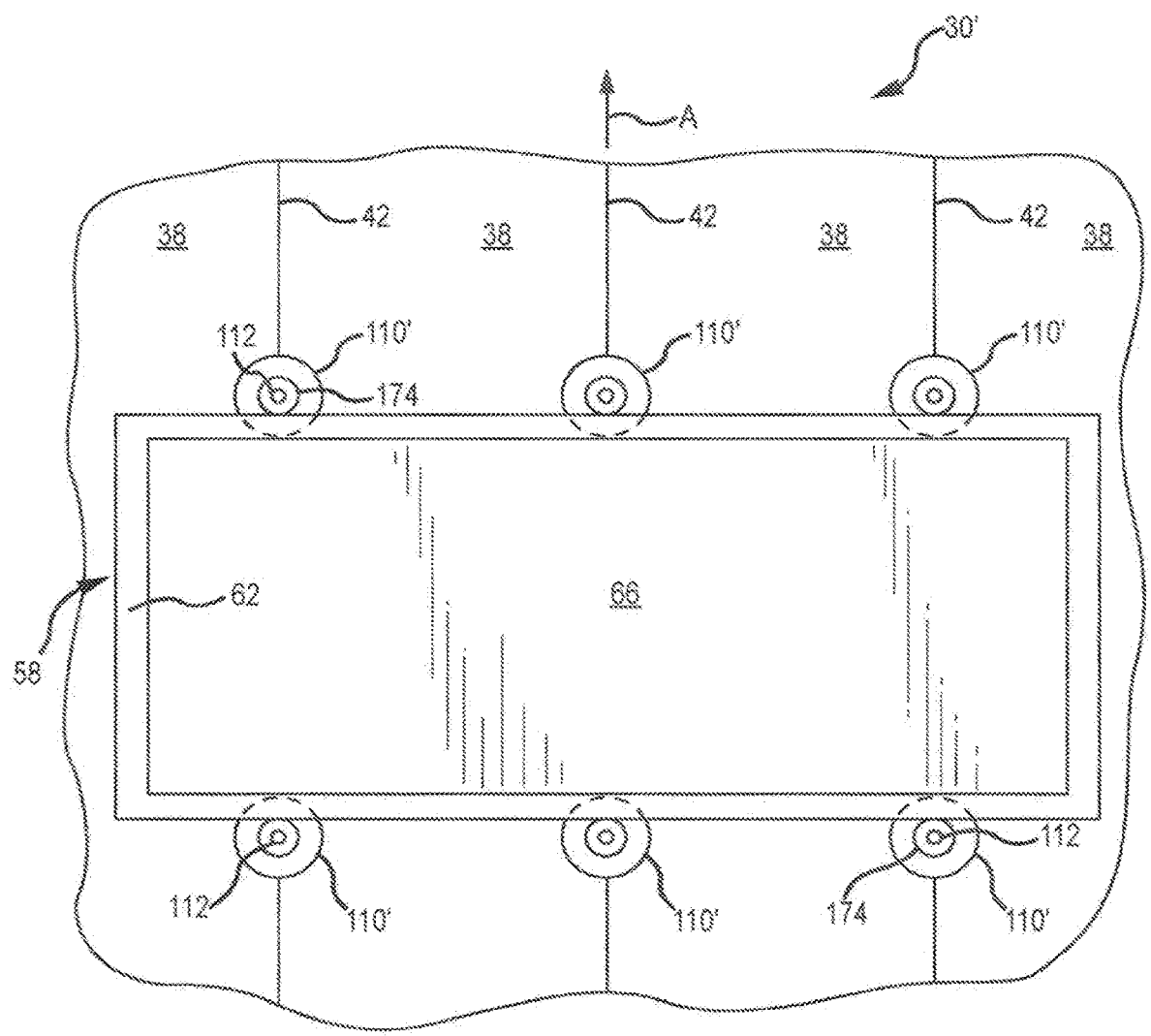
FIG. 9A is a plan view of one embodiment of a photovoltaic system using a plurality of the mounting assemblies of FIGS. 8A-F, in which the clamping members are omitted to illustrate a positional registration function incorporated by the mounting plate of such mounting assemblies.

FIG. 9A illustrates the positional registration or alignment function provided by the mounting plate 110' incorporating a raised structure 174 (which thereby may be referred to as a PV module positional registrant). In FIG. 9A, the mounting devices 74 are attached to the standing seams 42 such that the frame 62 of the photovoltaic module 58 engages a portion on the outer perimeter of the raised structure 174. The clamping member 142 for each such mounting device 74 should not only be in proper position to adequately engage the frame 62 of the photovoltaic module 58 shown in FIG. 9A, but the clamping member 142 for each such mounting device 74 should also be in proper position to adequately engage the frame 62 of another photovoltaic module 58 that would be positioned in the uphill direction A (e.g., the arrow A indicating the direction of increasing elevation) from the illustrated photovoltaic module 58. The frame 62 of this "uphill" photovoltaic module 58 would likely engage an opposing portion of the raised structure 174 (or be disposed in closely spaced relation thereto). Any "downward drifting" of this uphill photovoltaic module 58 should be stopped by engaging the raised structure 174 of the "downhill" mounting assemblies 70c.

Figure 9B:
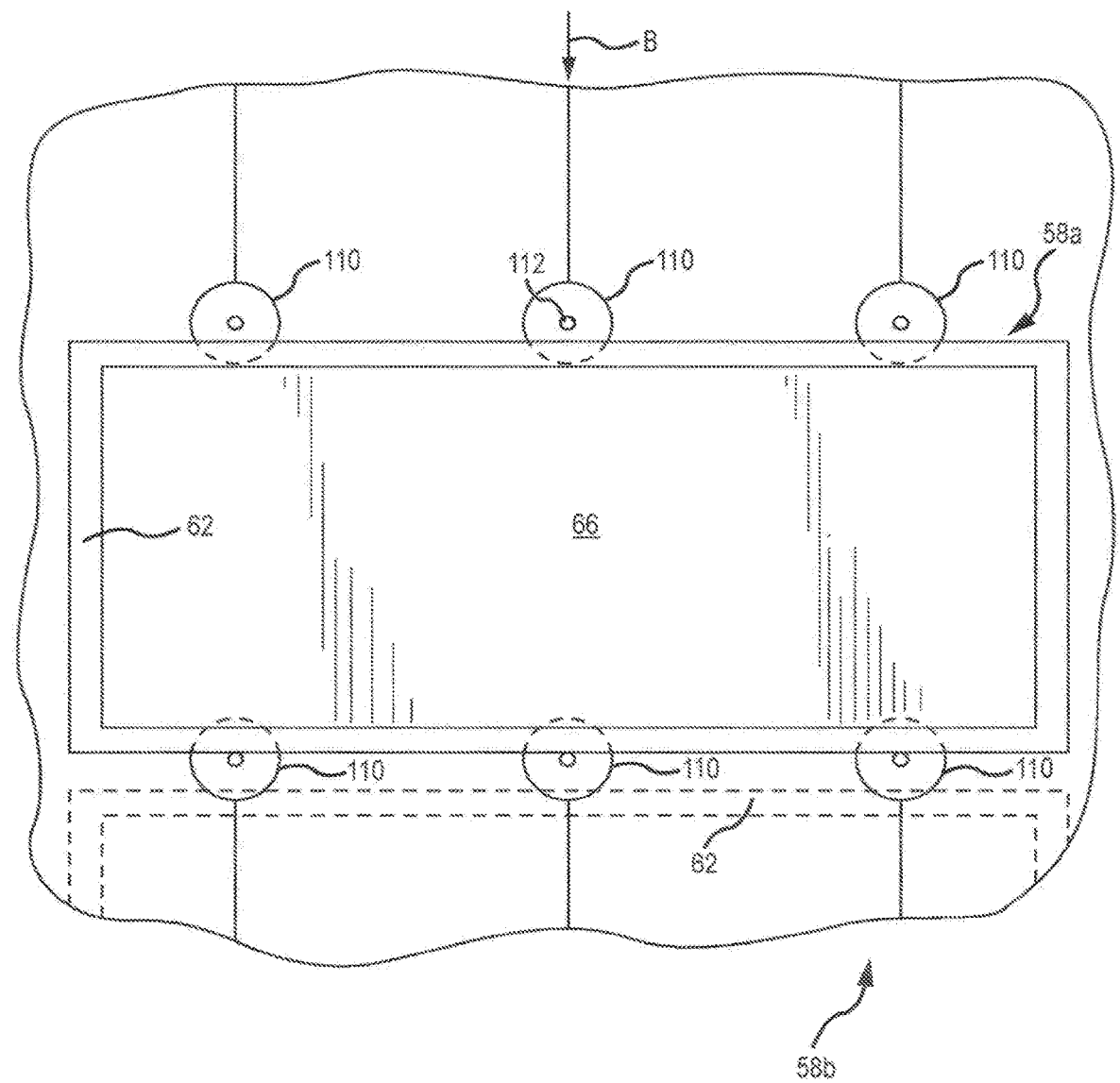
FIG. 9B is a plan view of a photovoltaic system using a plurality of the mounting assemblies of FIG. 6, in which the clamping members are omitted to illustrate how a misaligned mounting assembly can affect the ability of the same to clamp onto one or more photovoltaic modules.

In FIG. 9B, the mounting assembly 70a has been used, the mounting plate 110 of which does not incorporate the raised structure 174 from the mounting plate 110' of FIGS. 8A-F. The uphill photovoltaic module 58a (the arrow B in FIG. 9B indicating the downhill direction, or direction of decreasing elevation) has been positioned relative to the three lower mounting devices 74 such that its frame 62 is quite close to the hole 112 of the three lower mounting plates 110 (through which the stud 114 is directed to threadably engage the mounting device 74). The three clamping members 142 associated with these three "downhill" mounting plates 110 may not sufficiently engage the downhill photovoltaic module 58b.

Figure 10A:
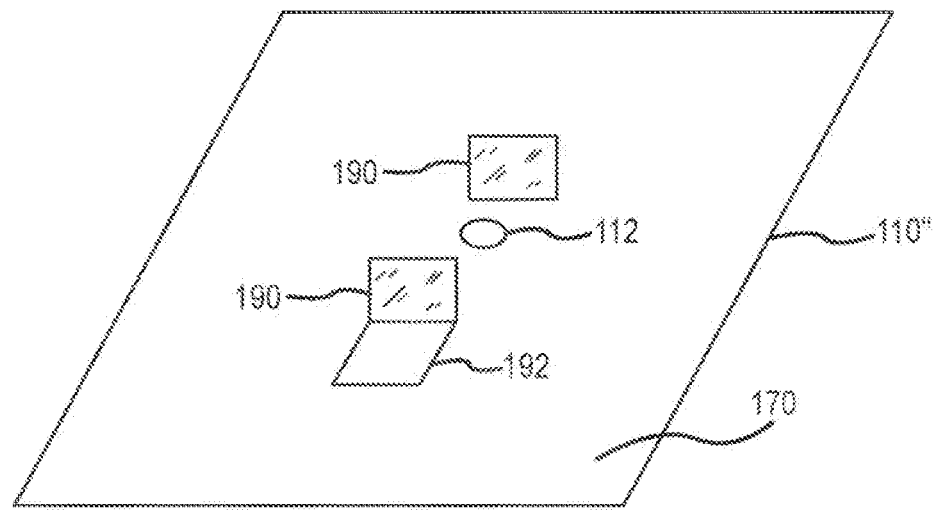
FIG. 10A is a perspective view of another embodiment of a mounting plate that incorporates a discrete pair of PV module positional registrants.
Figure 10B:
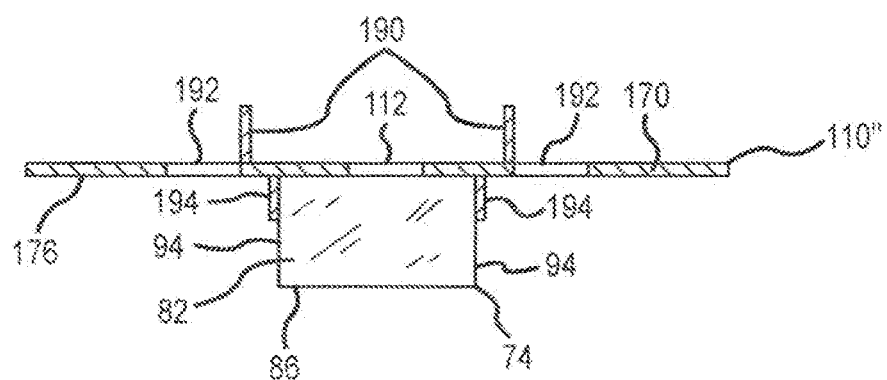
FIG. 10B is a side view of the mounting plate of FIG. 10 disposed on a mounting device, where the mounting plate includes a pair of mounting device positional registrants.

The mounting plate 110' from the mounting assembly 70c of FIGS. 8A-F uses a single raised structure 174 to provide a positional registration or alignment function for each of the two photovoltaic modules that may be clamped by a single mounting assembly 70c. Other types of positional registration or alignment features may be incorporated by a mounting plate. One representative embodiment is illustrated in FIGS. 10A-B in the form of a mounting plate 110". Generally, the mounting plate 110" may be used in place of the mounting plate 110' discussed above. Although not shown, it should be appreciated that the mounting plate 110" may also utilize the grounding projections 172 and/or wiring clips 178 (and their associated apertures 184).

The mounting plate 110" of FIGS. 10A and 10B differs from the mounting plate 110' of FIGS. 8A-F in a number of respects. One is the shape of the mounting plate 110'. Each of these mounting plates 110', 110" may be of any appropriate shape in relation to their respective outer perimeters (e.g., circular as in the case of the mounting plate 110'; square as in the case of the mounting plate 110"; rectangular). Another is that the mounting plate 110" utilizes at least two discrete PV module positional registrants 190. Each of the PV module positional registrants 190 may be of any appropriate size, shape, and/or configuration. The PV module positional registrants 190 may be integrally formed with a remainder of the mounting plate 110" as shown where they have been stamped from the mounting plate 110" (creating corresponding apertures 192), or the PV module registrants 190 could be separately attached to the mounting plate 110". When the mounting plate 110" is positioned in the proper orientation on a mounting device 74, one of the PV module positional registrants 190 may be used to position one photovoltaic module on the mounting plate 110" (e.g., by this first photovoltaic module butting up against this first PV module positional registrant 190) such that it should be adequately engaged by the clamping member 142, and furthermore such that the other or second photovoltaic module to be positioned on the mounting plate 110" should also be adequately engaged by this same clamping member 142. In this regard, this second photovoltaic module may be positioned such that it butts up against the other or second of the PV module positional registrants 190 of the mounting plate 110".

As there are only two PV module positional registrants 190 in the illustrated embodiment of FIGS. 10A and 10B, the mounting plate 110" may need to be in a certain angular position or orientation on the mounting device 74 to provide a positional registration or alignment function for the two photovoltaic modules to be clamped by the associated mounting assembly. An installer could be required to place the mounting plate 110" onto the mounting device 74 in the correct angular position or orientation. Another option is for the mounting plate 110" to include one or more mounting device positional registrants 194 that facilitate the positioning of the mounting plate 110" onto the upper surface 78 of the mounting device 74 such that the PV module positional registrants 190 should be positioned to provide a positional registration or alignment function for the two photovoltaic modules to be clamped by the associated mounting assembly. In the illustrated embodiment, the mounting plate 110" includes a pair of mounting device positional registrants 194—a separate mounting device positional registrant 194 for each of the two opposite ends 94 of the mounting device 74 (e.g., one mounting device positional registrant 194 may engage one end 94 of the mounting device 74, and another mounting device positional registrant 194 may engage the opposite end 94 of the mounting device 74). A pair of mounting device positional registrants could be utilized by the mounting plate 110" to engage the two opposite side surfaces 82 of the mounting device 74 to place the mounting plate 110" in the correct angular position relative to the mounting device 74. Yet another option would be to have at least one mounting device positional registrant for the mounting plate 110" that engages an end 94 of the mounting device 74 and at least one mounting device positional registrant for the mounting plate 110" that engages one of the side surfaces 82 of the mounting device 74. Any appropriate way of positionally registering the mounting plate 110" relative to the mounting device 74 may be utilized.

Figure 11:
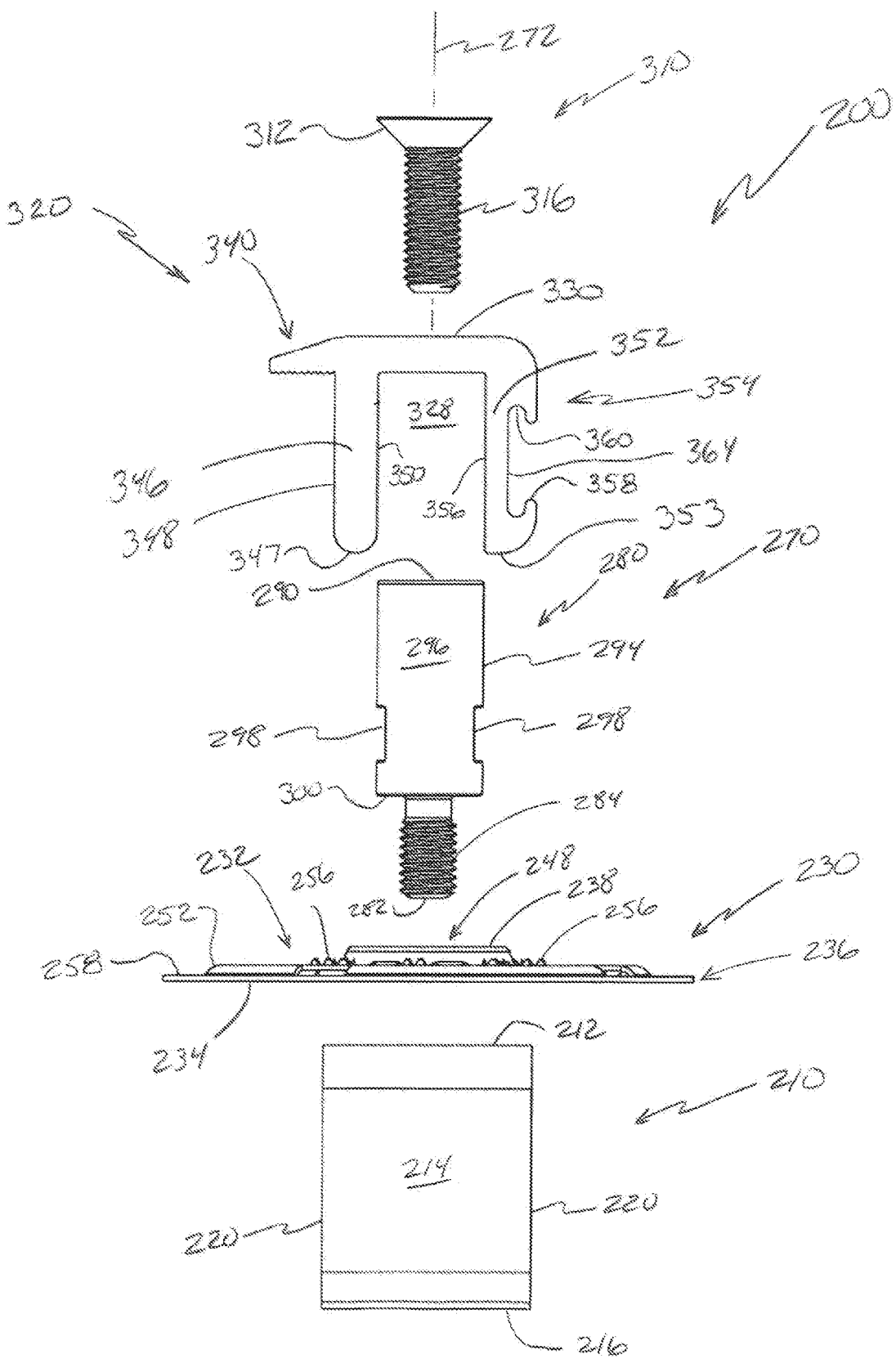
FIG. 11 is one embodiment of a mounting assembly for a single photovoltaic module.
Figure 12A:
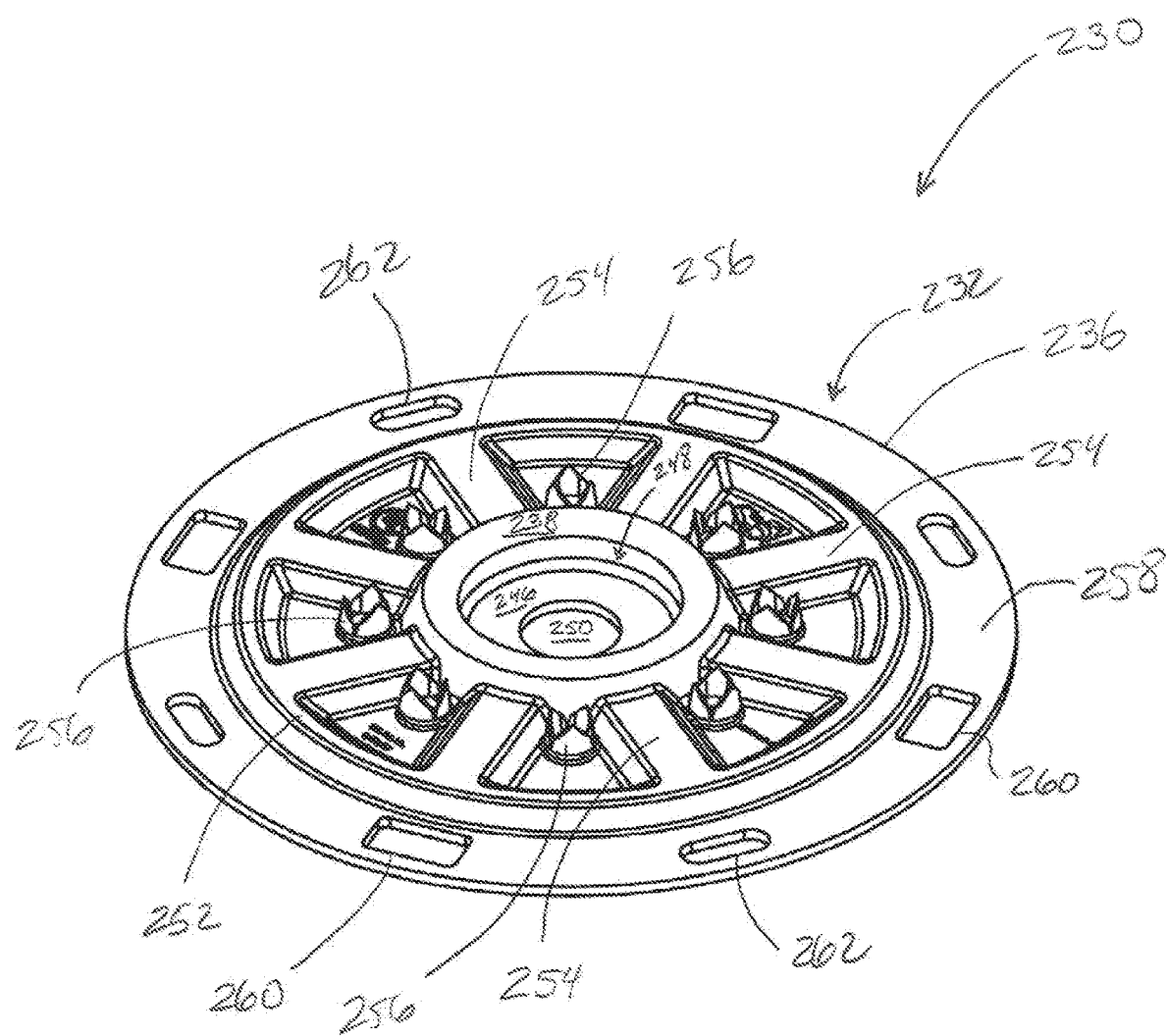
FIG. 12A is a perspective view of a mounting plate used by the mounting assembly of FIG. 11.
Figure 12B:
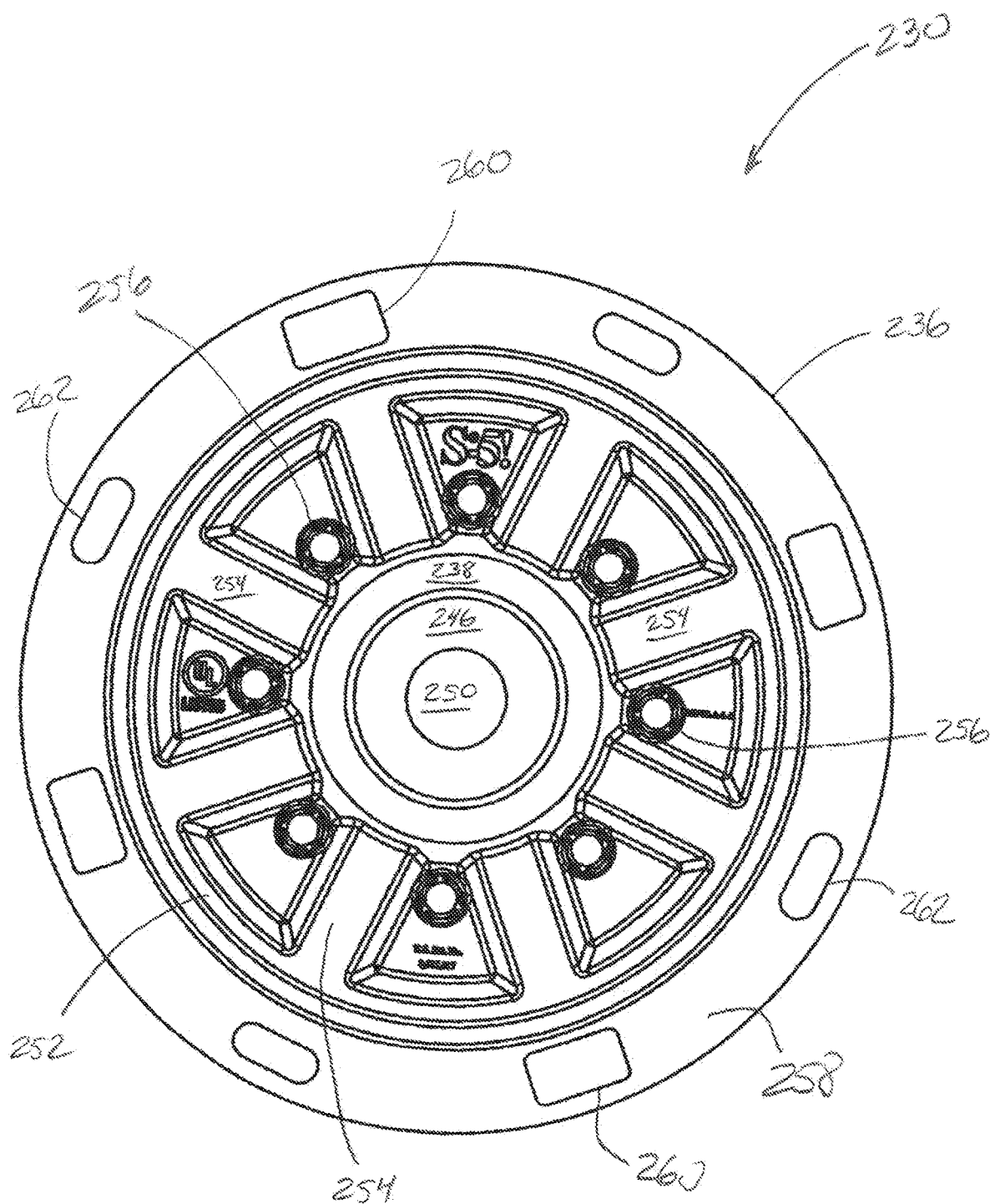
FIG. 12B is a top view of the mounting plate of FIG. 12A.
Figure 12C:
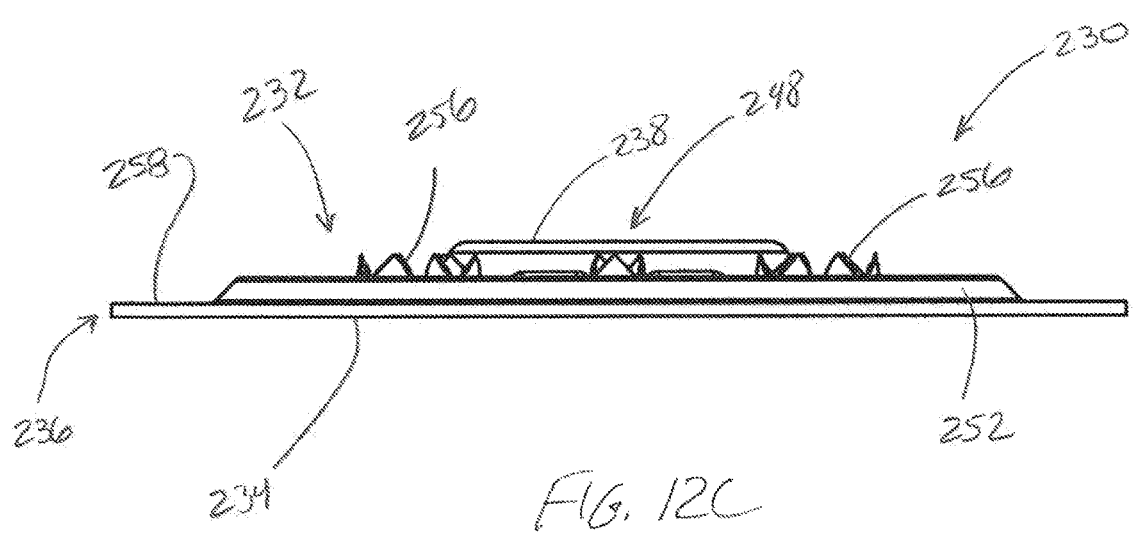
FIG. 12C is a side view of the mounting plate of FIG. 12A.
Figure 12D:
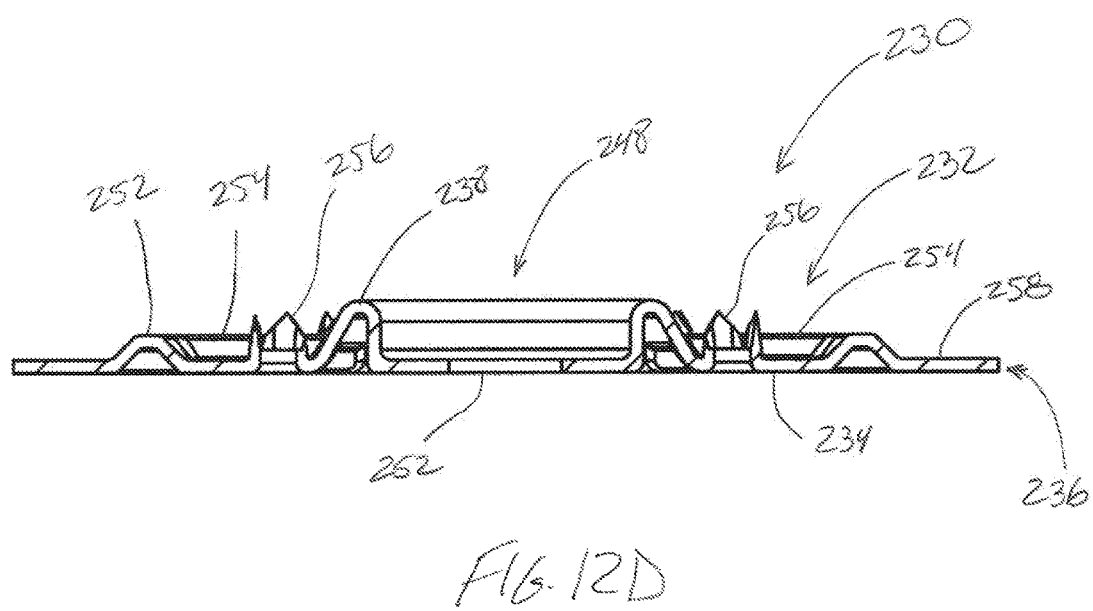
FIG. 12D as a cross-sectional view of the mounting plate of FIG. 12A.

One embodiment of a mounting assembly (e.g., for photovoltaic modules) is illustrated in FIG. 11 and is identified by reference numeral 200. The mounting assembly 200 generally includes a mounting device 210, a mounting plate or disk/disc 230, a fastening assembly 270, and a clamp or clamping member 320. The mounting assembly 200, more specifically the clamp 320, is adapted to engage a single photovoltaic module of a photovoltaic module array (e.g., photovoltaic module array 54 shown in FIG. 2) of any appropriate size and/or configuration, where rows of photovoltaic modules are typically disposed perpendicular to the pitch of a sloped roofing surface and where columns of photovoltaic modules are typically disposed along the pitch of such a sloped roofing surface. Typically the clamp 320 of the mounting assembly 200 will engage a single photovoltaic module that is disposed along an edge of the photovoltaic module array, and thus the clamp 320 may also be referred to as an "edge grab" or configured for an edge grab application.

The mounting device 210 is attachable to a building surface of any appropriate type, and as such the mounting device 210 may be of any appropriate configuration for a particular application/building surface configuration. The illustrated mounting device 210 is adapted for installation on a standing seam defined by a pair of interconnected panels that are part of such a building surface. As such, the mounting device 210 is least generally in accordance with the mounting device 74 discussed above in relation to FIG. 5.

Figure 19A:
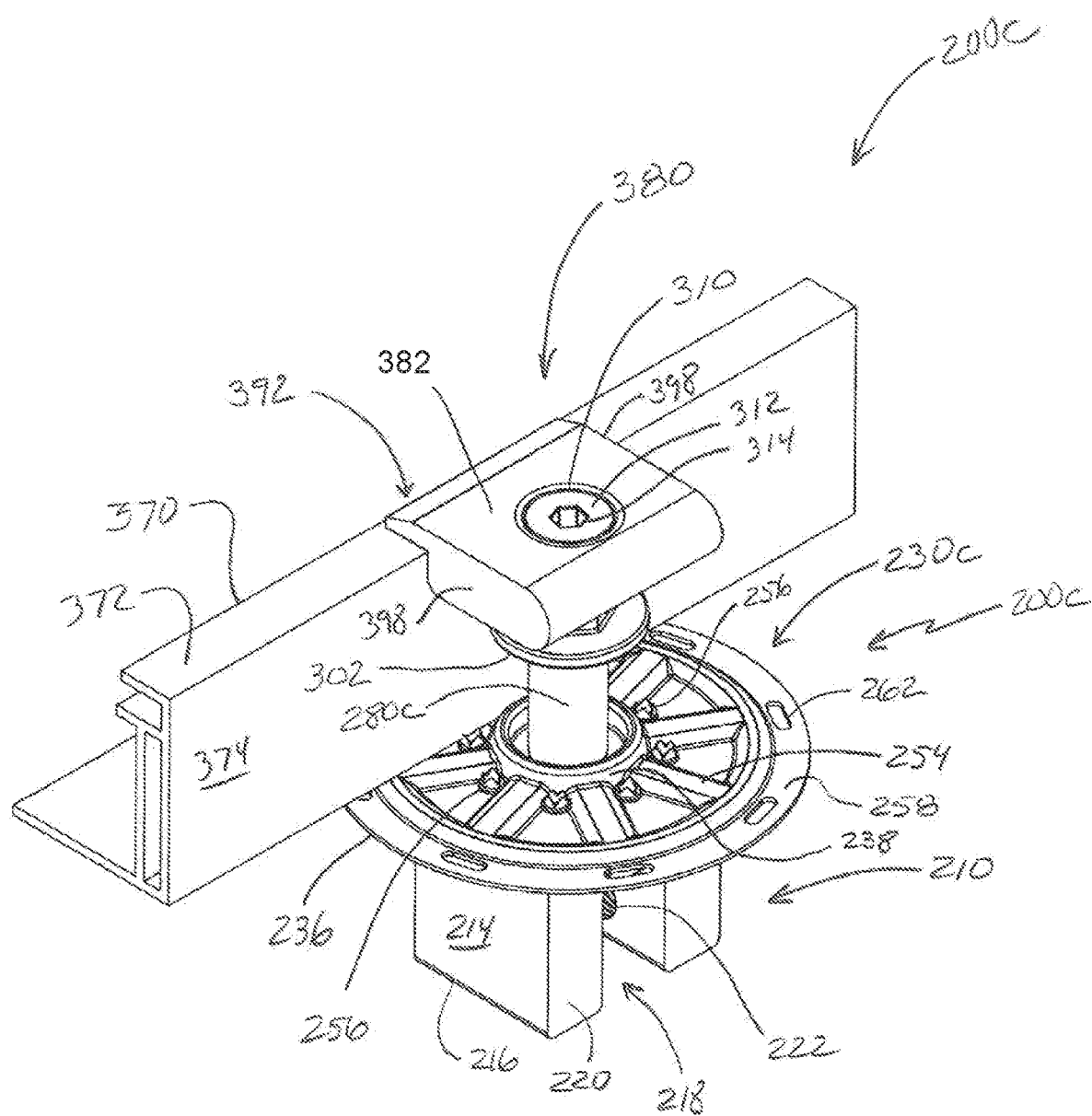
FIG. 19A is a perspective view of another embodiment of a mounting assembly for a single photovoltaic module.
Figure 19B:
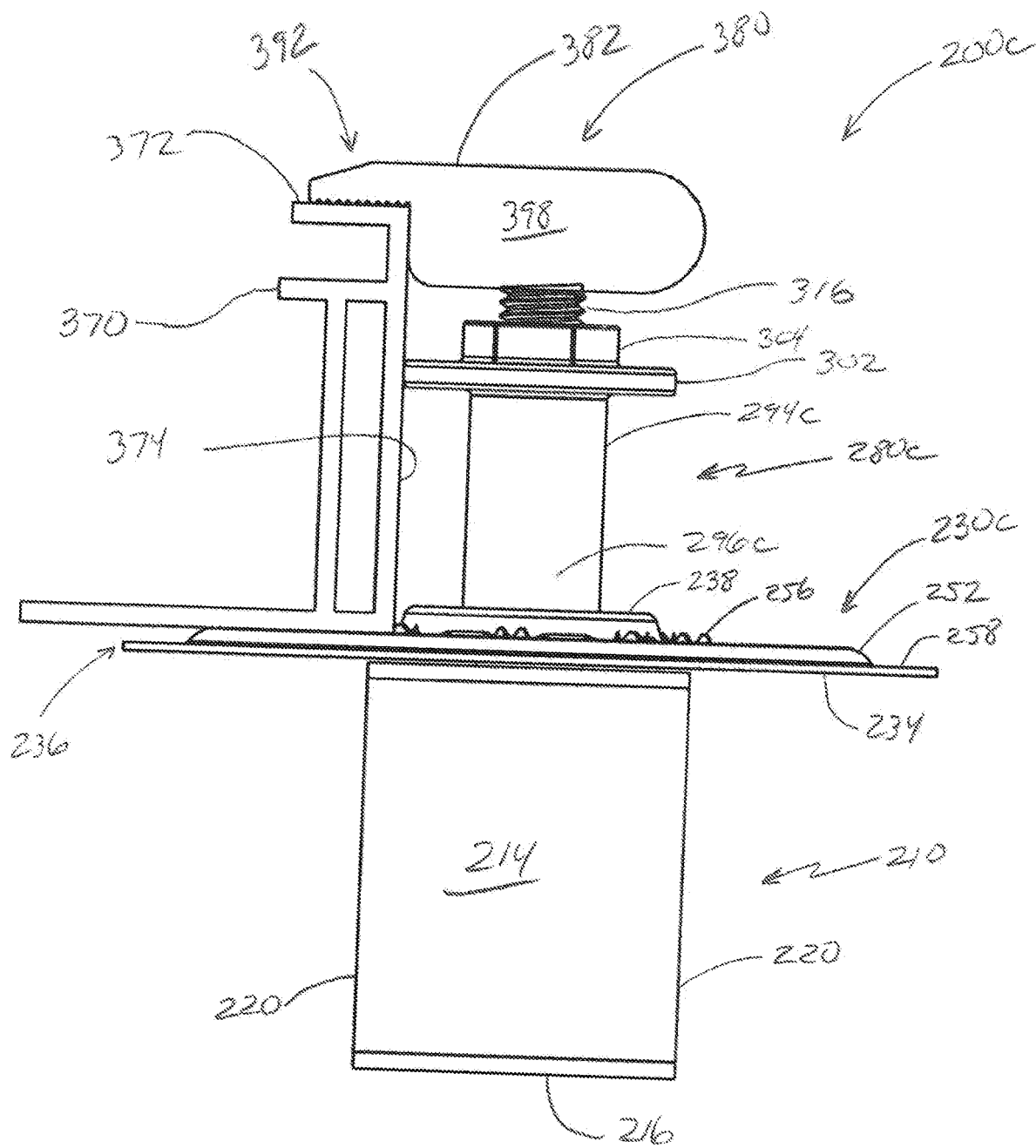
FIG. 19B is an end view of the mounting assembly and photovoltaic module frame section shown in FIG. 19A.
Figure 19C:
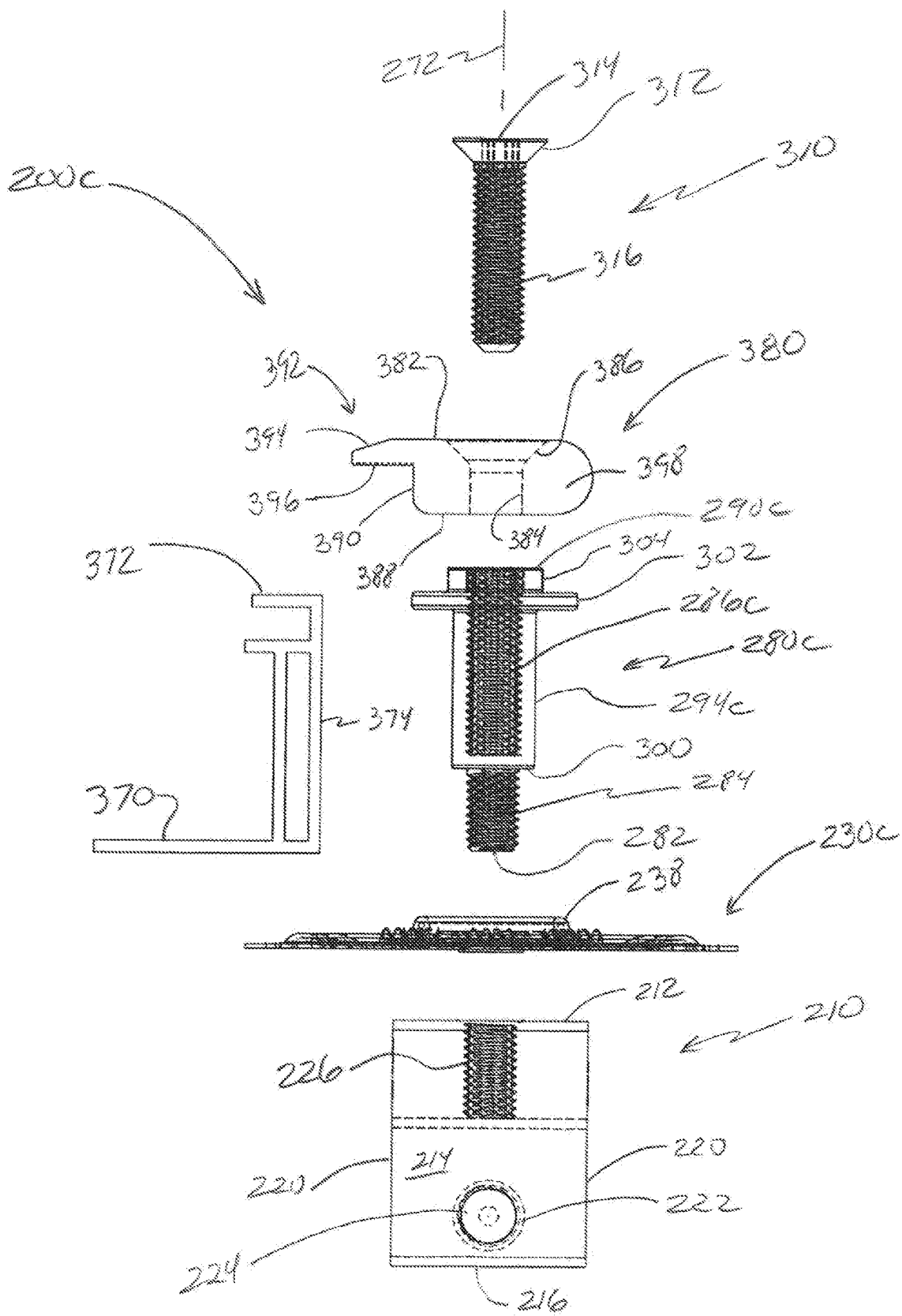
FIG. 19C is an exploded, end view of the mounting assembly and photovoltaic module frame section shown in FIG. 19A.

The mounting device 210 includes an upper surface 212, an oppositely disposed bottom surface 216, a pair of laterally spaced side surfaces 214, and a pair of ends 220. The ends 220 for the mounting device 210 will be spaced along a standing seam when the mounting device 210 is in an installed configuration. One or more threaded holes 222 will extend between one or more of the side surfaces 214 and a slot 218 that is incorporated by the bottom surface 216 and that extends between the two ends 220 of the mounting device 210 (e.g., FIG. 16A). A separate seam fastener 224 may be threadably engaged with the mounting device 210 (e.g., FIG. 19C), via a corresponding threaded hole 222, to secure a standing seam within the slot 218 (e.g., FIG. 16A; see also FIG. 5). The upper surface 212 of the mounting device 210 also may include a threaded hole 226 (e.g., FIG. 19C; see also FIG. 5) for detachably connecting the mounting device 210 with the fastening assembly 270 (more specifically a threaded shaft 284 of a stanchion 280).

Details of the mounting plate 230 are illustrated in FIGS. 11 and 12A-D. The mounting plate 230 includes an upper surface 232 and an oppositely disposed lower surface 234. Part of the lower surface 234 of the mounting plate 230 is disposed on the upper surface 212 of the mounting device 210. An outer perimeter 236 for the mounting plate 230 extends beyond a perimeter of the upper surface 212 of the mounting device 210. Stated another way, the surface area defined by the outer perimeter 236 of the mounting plate 230 is larger than a surface area of the upper surface 212 of the mounting device 210 on which the mounting plate 230 is positioned. A portion of a photovoltaic module being engaged by the mounting assembly 200 will thereby be positioned on a portion of the mounting plate 230 that is not directly supported by an underlying portion of the mounting device 210. Although the outer perimeter 236 is circular for the illustrated embodiment, other configurations may be appropriate.

The upper surface 232 of the mounting plate 230 includes a first or inner annular projection 238 and a second or outer annular projection 252. A circular configuration is used for each of the inner annular projection 238 and the outer annular projection 252, although other configurations may be appropriate. A plurality of ribs 254 extend from the inner annular projection 238 to the outer annular projection 252. These ribs 254 are radially spaced about a hole 250 that extends through the mounting plate 230 (e.g., the ribs 254 are in a spoked or spoke-like configuration on the upper surface 232; each rib 254 may be characterized as extending along a separate radius relative to a center of the mounting plate 230). Any appropriate number of ribs 254 may be utilized. Although the ribs 254 are shown as being equally spaced in the radial dimension (e.g., about the hole 250), other configurations may be appropriate. The ribs beneficially stiffen the mounting plate 230.

The hole 250 (e.g., defining a center of the mounting plate 230 relative to its outer perimeter 236), the inner annular projection 238, and the outer annular projection 252 are concentrically disposed relative to each other in the illustrated embodiment, with the inner annular projection 238 being disposed radially outwardly of the hole 250, and with the outer annular projection 252 being disposed radially outwardly of the inner annular projection 238. The inner annular projection 238 protrudes further than the outer annular projection 252 (e.g., an upper surface of the inner annular projection 238 is disposed at a higher elevation than an upper surface of the outer annular projection 252 when the mounting plate 230 is horizontally disposed and with its upper surface 232 projecting upwardly), while an upper surface of the ribs 254 and an upper surface of the outer annular projection 252 are disposed at a common elevation.

A receptacle base 246 is disposed radially inwardly of the inner annular projection 238 and is recessed relative to an upper surface of the inner annular projection 238 (e.g., an upper surface of the inner annular projection 238 is disposed at a higher elevation than the receptacle base 246 when the mounting plate 230 is horizontally disposed and with its upper surface 232 projecting upwardly). The recessed receptacle base 246 allows the stanchion 280 to be received therein, such that the threaded shaft 284 of the stanchion 280 can be shorter than would otherwise be required, resulting in material savings. The hole 250 extends through this receptacle base 246 and is not threaded. A receptacle 248 (for a portion of a standoff or stanchion 280 of the fastening assembly 270 (discussed in more detail below)) is collectively defined by inner annular projection 238 and the receptacle base 246.

A plurality of electrical contacts, bonding spikes, or bonding projections 256 are incorporated by the upper surface 232 of the mounting plate 230. One bonding spike 256 is disposed between each adjacent pair of ribs 254 and each bonding spike 256 protrudes further than its corresponding pair of ribs 254 (e.g., an uppermost portion of each bonding spike 256 is disposed at a higher elevation than an uppermost surface of its corresponding adjacent pair of ribs 254 when the mounting plate 230 is horizontally disposed and with its upper surface 232 projecting upwardly). When a photovoltaic module is positioned on the upper surface 232 of the mounting plate 230, at least one of the bonding spikes 256 should engage such a photovoltaic module so as to be electrically connected therewith. The mounting plate 230 accommodates having two photovoltaic modules positioned thereon and in opposing relation to one another, with each such photovoltaic module being engaged by at least one bonding spike 256 and with the inner annular projection 238 of the mounting plate 230 being disposed between these two photovoltaic modules.

The bonding spikes 256 facilitate establishing an electrical connection with a photovoltaic module when positioned on the upper surface 232 of the mounting plate 230 (e.g., by engaging a frame or frame section of such a photovoltaic module, and which may require that one or more bonding spikes 256 pierce or penetrate a surface or surface coating of this frame/frame section). Each bonding spike 256 utilizes a plurality of upwardly projecting teeth for engaging a corresponding/overlying photovoltaic module. Other configurations may be appropriate for the bonding spikes 256. Use of more substantial bonding spikes 256 (e.g. with a larger cross-section, greater height, and/or multiple points per spike) beneficially increases the ability of the bonding spikes 256 to continue to function for their intended purpose during a plurality of photovoltaic module installation cycles. In other words, if a photovoltaic module is installed on a mounting plate 230, then removed, the bonding spikes 256 will still function for their intended purpose upon reinstallation of the photovoltaic module or installation of another photovoltaic module thereon.

Figure 26A:
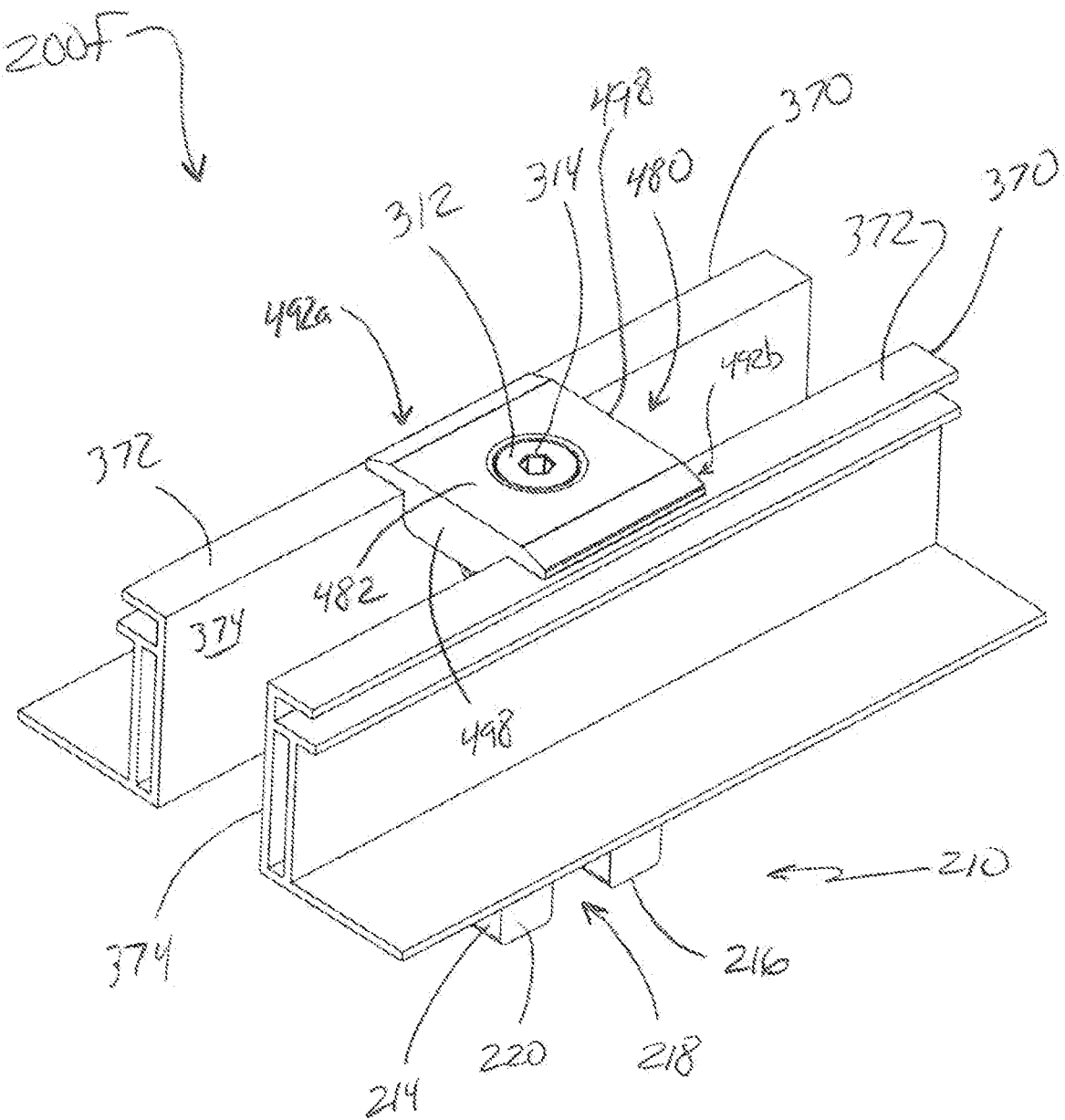
FIG. 26A is a perspective view of another embodiment of a mounting assembly that accommodates engaging a pair of photovoltaic modules.
Figure 26B:
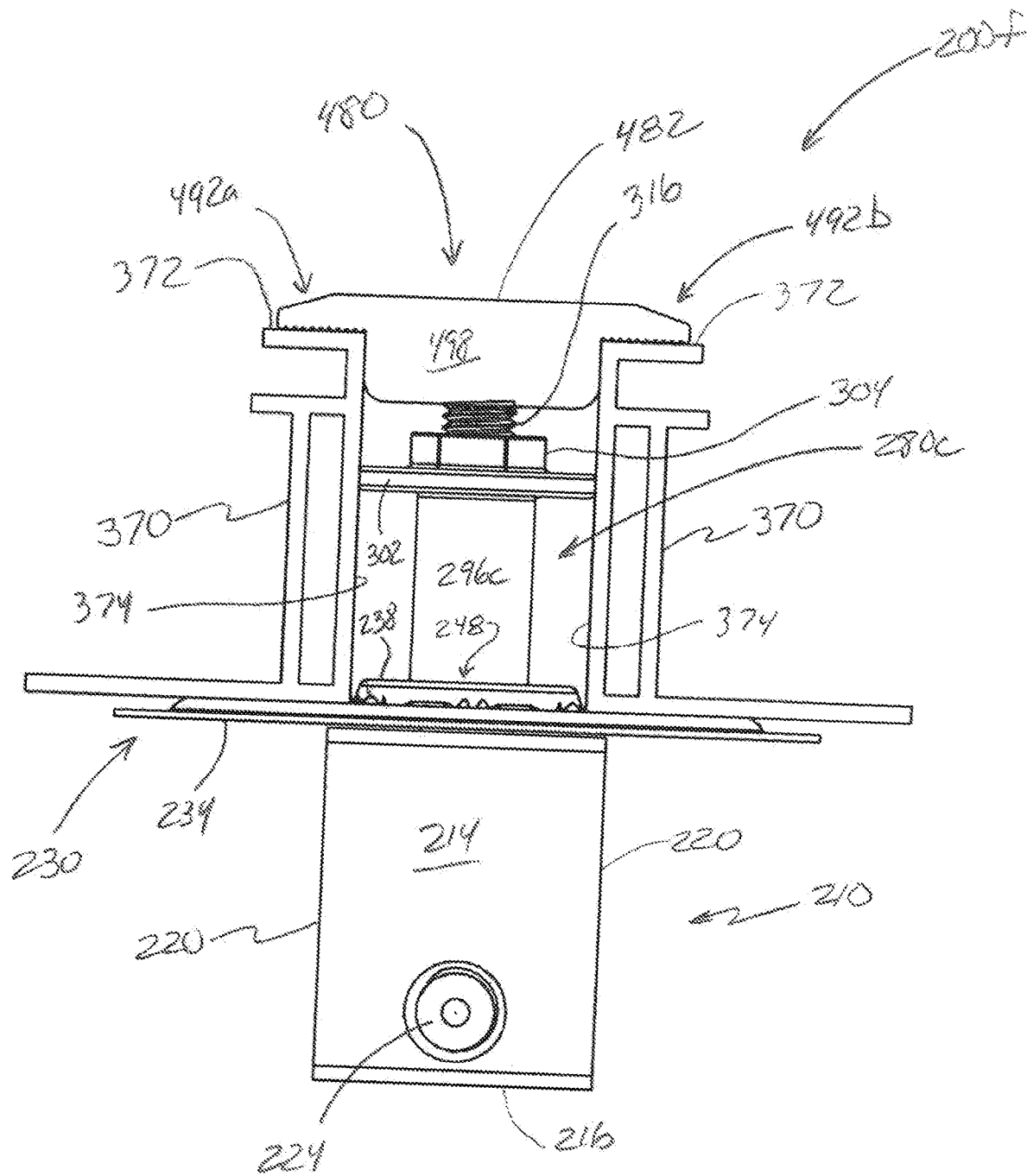
FIG. 26B is an end view of the mounting assembly and photovoltaic module frame sections shown in FIG. 26A.
Figure 26C:
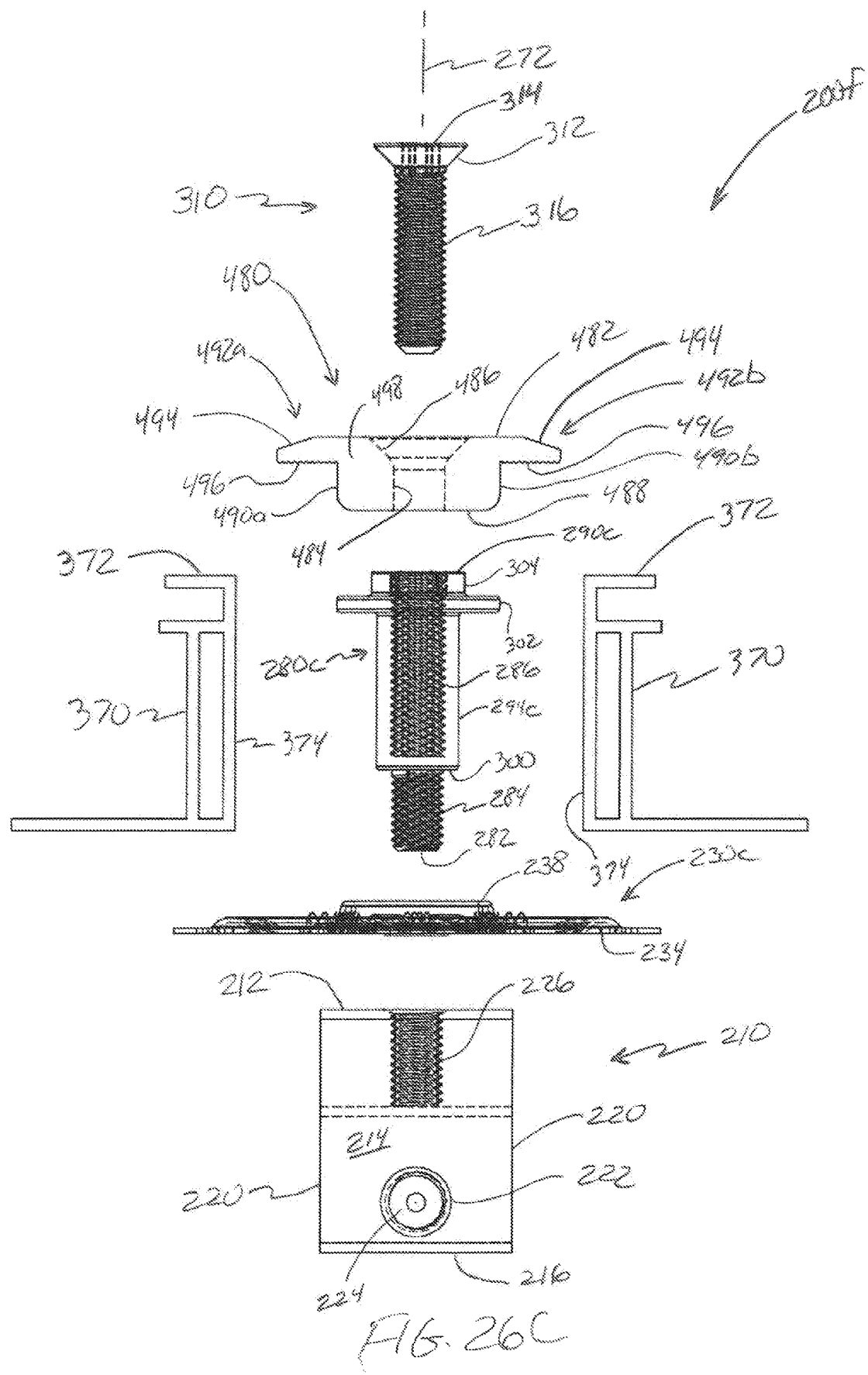
FIG. 26C is an exploded, end view of the mounting assembly and photovoltaic module frame sections shown in FIG. 26A.

The bonding spikes 256 may be used to provide a grounding function for a photovoltaic module array. A plurality of photovoltaic modules may be arranged to define an array. In the case of a pitched building surface that incorporates a PV module array, a column of a plurality of photovoltaic modules will typically be installed such that the column runs with/parallel to the pitch of the building surface. Each such photovoltaic module in a given column will thereby have an upper edge and an oppositely disposed lower edge on its perimeter (the upper edge being at a higher elevation than its corresponding lower edge), with both the upper edge and lower edge for each photovoltaic module in a given column extending orthogonal/transversely to the pitch of the building surface. Adjacent pairs of photovoltaic modules in a given column may be secured to the underlying pitched building surface using one of more of the mounting assemblies 200d (FIGS. 21-24B), using one or more of the mounting assemblies 200e (FIGS. 25A-25D), or using one or more of the mounting assemblies 200f (FIGS. 26A-26C), namely by such a mounting assembly engaging both the lower edge of one photovoltaic module and the upper edge of the adjacent photovoltaic module in the same column. The lower edge of the last photovoltaic module in a given column—the photovoltaic module that is at the lowest elevation in relation to the entire column—may be secured to the underlying pitched building surface using one or more of the mounting assemblies 200 (FIGS. 11-17B), using one or more of the mounting assemblies 200b (FIGS. 18A-18D), using one or more of the mounting assemblies 200c (FIGS. 19A-20B), using one of more of the mounting assemblies 200d (FIGS. 21-24B), using one or more of the mounting assemblies 200e (FIGS. 25A-25D), or using one or more of the mounting assemblies 200f (FIGS. 26A-26C). Each of these mounting assemblies uses a mounting plate 230/230c with the bonding spikes 256. Each photovoltaic module in a given column is thereby at the same electrical potential via the described mounting assemblies. In the case where a pair of photovoltaic modules are positioned on a mounting plate 230 (e.g., the mounting assembly 200d of FIGS. 21-24B; the mounting assembly 200e of FIGS. 25A-25D; the mounting assembly 200f of FIGS. 26A-26C), the corresponding mounting plate 230 provides an electrical path between these two photovoltaic modules by one or more of the bonding spikes 256 engaging one of the photovoltaic modules and by a different one or more of the bonding spikes 256 engaging the other of the photovoltaic modules. This may be referred to as "bonding" or "electrically bonding" an adjacent pair of photovoltaic modules utilizing the mounting plate 230 and its plurality of bonding spikes 256. As such, the mounting assemblies 200d (FIGS. 21-24B), the mounting assemblies 200e (FIGS. 25A-25D), and mounting assemblies 200f (FIGS. 26A-26C) may be used to electrically bond an entire column of a PV module array. Adjacent columns in a given PV module array may be disposed at the same electrical potential by running one more grounding wires between each of the columns (e.g., between a photovoltaic module (e.g., a frame section thereof) or a mounting assembly (e.g., mounting plate 230) in one column, and a photovoltaic module (e.g., a frame section thereof) or a mounting assembly (e.g., mounting plate 230) in another column). With the entire PV module array being at the same electrical potential, a wire can run from the array to ground.

An outer annulus 258 of the mounting plate 230 is recessed relative to an upper surface of the inner annular projection 238, an upper surface of the ribs 254, and an upper surface of the outer annular projection 252. An upper surface of the inner annular projection 238, an upper surface of the ribs 254, and an upper surface of the outer annular projection 252 are all disposed at a higher elevation than the outer annulus 258 when the mounting plate 230 is horizontally disposed and with its upper surface 232 projecting upwardly. The outer annulus 258 includes a plurality of first cutouts 260 and a plurality of second cutouts 262. Any appropriate number of first cutouts 260 and any appropriate number of second cutouts 262 may be utilized, and the various cutouts 260, 262 may be disposed in any appropriate arrangement about the outer annulus 258 of the mounting plate 230. In the illustrated embodiment, a cutout 262 is disposed between each adjacent pair of cutouts 260 in the radial dimension. Each cutout 260 provides a space for a wire management device to pass through or connect to the mounting plate 230, while each cutout 262 provides a smaller space for a wire management device (e.g., a zip tie) to pass through or connect to the mounting plate 230. Having different sizes for the cutouts 260 compared to the cutouts 262 provides the benefit of and/or allows wire management devices of different sizes and geometries to pass through or connect to the mounting plate 230.

The fastening assembly 270 for the mounting assembly 200 includes a stanchion or standoff 280 and a clamping fastener 310. Generally, the stanchion 280 is detachably connected with the mounting device 210. The clamping fastener 310 engages the clamp 320 and is detachably connected with the stanchion 282 in order to move the clamp 320 relative to the stanchion 280 to clamp a photovoltaic module between the clamp 320 and the mounting plate 230.

Referring to FIG. 11 and FIGS. 13A-13C, the stanchion 280 includes body 294 and a threaded shaft 284 that extends from an end 300 of this body 294. A free end of the threaded shaft 284 defines a first end 282 of the stanchion 280. A threaded hole 286 is on a second end 290 of the stanchion 280 (which also coincides with a second end of the body 294). The spacing between the ends 282, 290 of the stanchion 280 define its length dimension. An upper annulus 292 is rounded and/or beveled proximate the second end 290 of the stanchion 280. The body 294 includes a cylindrical sidewall 296. The body 294 also includes at least one pair of flats 298 that are preferably disposed in opposing relation to one another, and in any case that may be utilized to rotate the stanchion 280 relative to the mounting device 210 in at least certain instances.

The threaded shaft 284 of the stanchion 280 is directed into the stanchion receptacle 248 on the upper surface 232 of the mounting plate 230 and then is directed through the hole 250 within the stanchion receptacle 248 for engagement with the threaded hole 226 on the upper surface 212 of the mounting device 210 (e.g., FIG. 26C; see also FIG. 5). When the stanchion 280 is appropriately secured to the mounting device 210, typically a lower portion of the body 294 of the stanchion 280 will be disposed within the stanchion receptacle 248 of the mounting plate 230 and the end 300 of the body 294 of the stanchion 280 will be engaged with the receptacle base 246 within the stanchion receptacle 248 of the mounting plate 230. Preferably, the threaded shaft 284 of the stanchion 280 will not extend into the slot 218 on the bottom surface 216 of the mounting device 210 in the installed configuration of the mounting assembly 200.

Figure 14B:
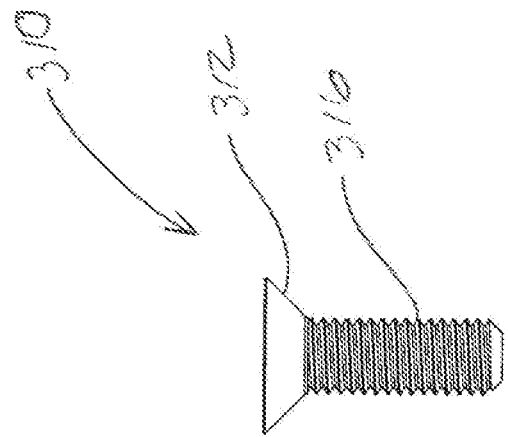
FIG. 14B is a side view of the clamping fastener of FIG. 14A.
Figure 14A:
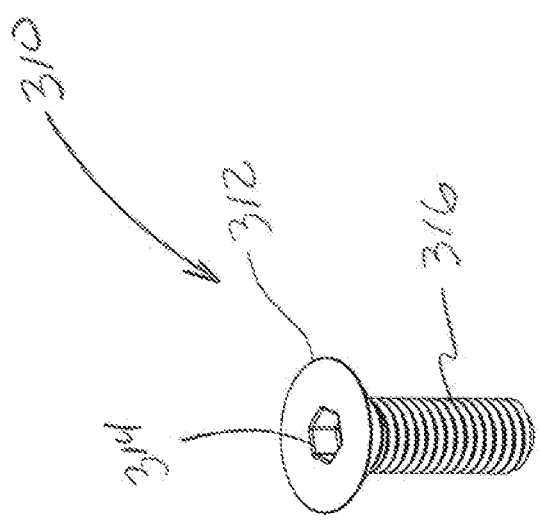
FIG. 14A is a perspective view of a clamping fastener used by the mounting assembly of FIG. 11.

Referring now to FIGS. 11, 14A, and 14B, the clamping fastener 310 includes a head 312 and a threaded shaft 316 that extends from this head 312. The head 312 incorporates a drive socket 314 (e.g., a hexagonal aperture or receptacle) for rotating the clamping fastener 310 (e.g., relative to at least the clamp 320). The drive socket 314 for the clamping fastener 310 may be of the same configuration as a drive socket that is used by the seam fastener(s) 224 (e.g., FIG. 19C) that is used to secure the mounting device 210 to a building surface.

Figure 15A:
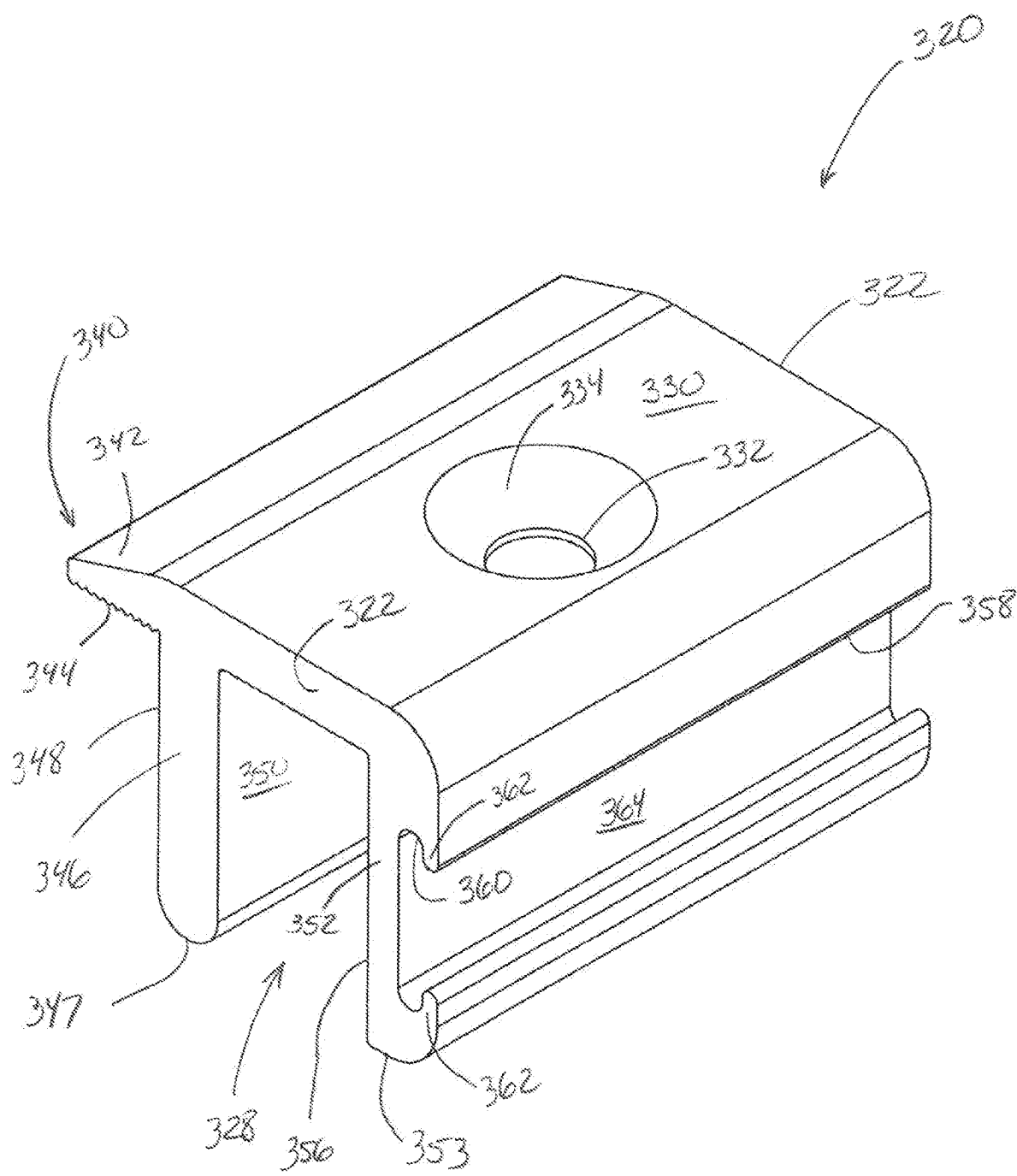
FIG. 15A is a perspective view of a clamp used by the mounting assembly of FIG. 11.
Figure 15B:
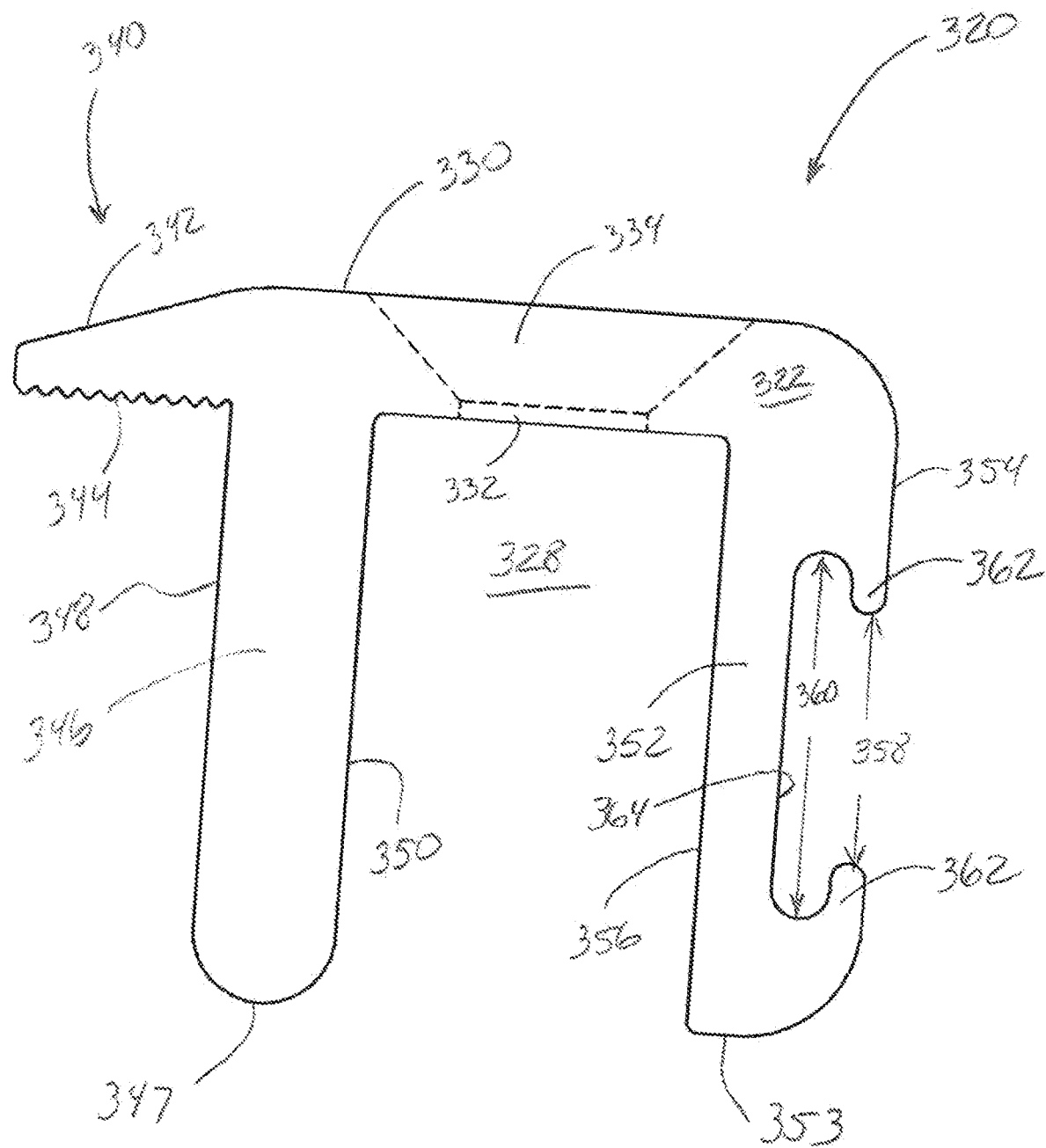
FIG. 15B is an end view of the clamp of FIG. 15A.

Details of the clamp 320 are illustrated in FIGS. 11, 15A, and 15B, where the clamp 320 is shown as including an upper wall 330, a single clamping section 340, a first leg, sidewall, or wall 346, and a second leg, sidewall, or wall 352 that each extend between a pair of ends 322. A countersink 334 and a fastener aperture 332 collectively extend through the upper wall 330 to accommodate the threaded shaft 316 of the clamping fastener 310. Preferably the fastener aperture 332 of the clamp 320 is un-threaded such that the clamping fastener 310 is not threadably engaged with the clamp 320 (e.g., rotation of the clamping fastener 310 about a rotational axis 272 for the fastening assembly 270 (the rotational axis 272 being for both the clamping fastener 310 and stanchion 280) should not rotate the clamp 320; the clamp 320 may remain in a stationary position while the clamping fastener 310 is rotated relative to the clamp 320 and about the rotational axis 272).

The first wall 346 and the second wall 352 of the clamp 320 both cantilever from the upper wall 330 (more specifically an underside thereof), with the first wall 346 having a free end 347 and the second wall 352 having a free end 353. The first wall 346 includes an outer surface or outer perimeter 348 and an inner surface 350, while the second wall 352 includes an outer surface or outer perimeter 354 and an inner surface 356. The inner surface 350 of the first wall 346 is flat or planar, as is the inner surface 356 of the second wall 352. The inner surface 350 of the first wall 346 is spaced from and is parallel to the inner surface 356 of the second wall 352 to collectively define a stanchion receptacle 328.

The clamping section 340 may be characterized as a portion of the upper wall 330 that extends beyond the first wall 346 (more specifically its outer surface 348). In any case, the clamping section 340 includes an upper surface 342 and an oppositely disposed lower surface 344, with the lower surface 344 including serrations or the like for engaging a photovoltaic module and with the lower surface 344 being disposed at least generally orthogonal or perpendicular to the outer surface 348 of the first wall 346. The upper surface 342 of the clamping section 340 is sloped, converging at least generally in the direction of the lower surface 344 in proceeding toward a free side portion of the clamping section 340.

The outer perimeter 354 of the second wall 352 for the clamp 320 includes a slot 358 that leads to a channel 360. Both the slot 358 and the channel 360 extend between the two ends 322 of the clamp 320. The channel 360 is defined by a channel base 364 and a pair of lips 362 that are spaced from this channel base 364. The slot 358 provides access to the channel 360 in at least certain instances. The channel 360 may be used for any appropriate purpose, such as wire management, attachment of equipment shields and/or snow retention devices, module cantilever support, and the like.

The clamping fastener 310, the clamp 320, and the stanchion 280 may be assembled prior to securing the stanchion 280 to the mounting device 210. The threaded shaft 316 of the clamping fastener 310 is directed through the upper wall 330 of the clamp 320 (via the countersink 334 and the fastener aperture 332) and at least an upper section of the stanchion 280 is positioned within the stanchion receptacle 328 of the clamp 320 such that the shaft 316 of the clamping fastener 310 may be threaded into the hole 286 on the second end 290 of the stanchion 280 (e.g., by directing the stanchion 280 through the space between the walls 346, 352 at either of the ends 322 of the clamp 320; by directing the stanchion 280 through the space between the walls 346, 352 at their respective fee ends 347, 353). In one embodiment, the clamping fastener 310 is temporarily secured to the stanchion 280, such as by an appropriate bond (e.g., adhesive). For instance, an appropriate adhesive (e.g., Loctite®) may be applied to the shaft 316 of the clamping fastener 310 and/or within the threaded hole 286 of the stanchion 280 to bond the clamping fastener 310 to the stanchion 280. While the clamping fastener 310 and the stanchion 280 are in a bonded state, the clamping fastener 310 and the stanchion 280 may be collectively rotated (e.g., using the drive socket 314 of the clamping fastener 310; about the rotational axis 272) to thread the shaft 284 of the stanchion 280 into the hole 226 of the mounting device 210. At this time the clamp 320 should remain in a rotationally stationary state (i.e., both the stanchion 280 and the clamping fastener 310 should rotate, but not the clamp 320). Once the stanchion 280 has been appropriately tightened/secured to the mounting device 210, the bond between the clamping fastener 310 and the stanchion 280 should be eliminated (e.g., break; an un-bonded state) to thereafter allow the clamping fastener 310 to continue to rotate about the axis 272 and now relative to both the clamp 320 and the stanchion 280. Rotation of the clamping fastener 310 relative to the stanchion 280 will then advance the clamp 320 along the stanchion 280 and in the direction of the first end 282 of the stanchion 280. That is, the head 312 of the clamping fastener 310 will exert a force on the clamp 320 (the force vector being in a direction of an underlying portion of the mounting plate 230) to advance the clamp 320 relative to the stanchion 280, and which will thereby exert a compressive force on a photovoltaic module that is disposed between the clamp 320 and the mounting plate 230 so as to retain such a photovoltaic module within the mounting assembly 200.

At least a portion of the perimeter of a photovoltaic module is typically defined by one or more frame sections. The height or thickness of these PV module frame sections may vary. The mounting assembly 200 accommodates a range of PV module frame section heights or thicknesses, namely by accommodating for a plurality of positions of the clamp 320 along the stanchion 280 in a manner that will still allow for engagement of a photovoltaic module in the following manner.

Figure 16A:
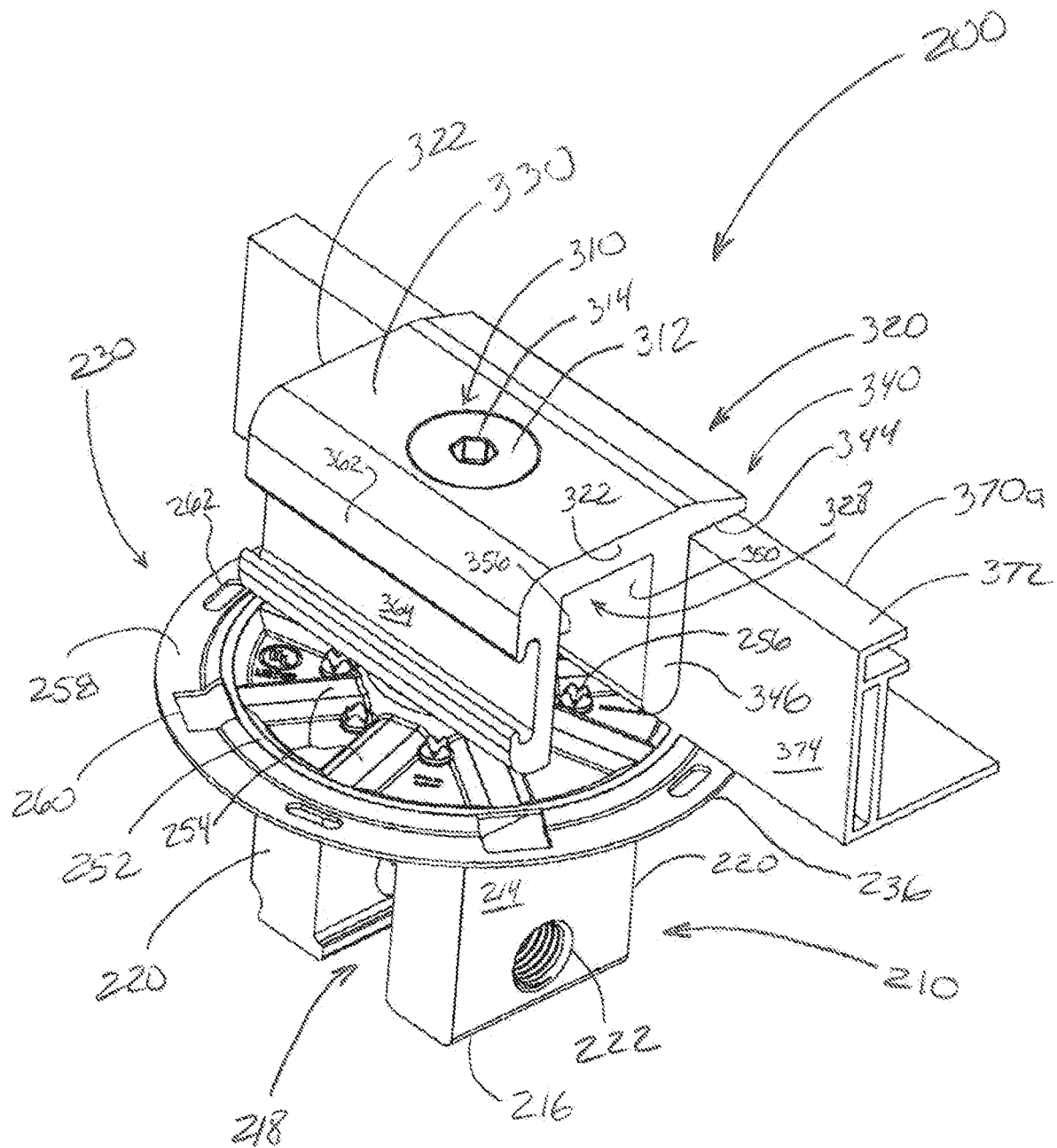
FIG. 16A is a perspective view showing the mounting assembly of FIG. 11 in use with a photovoltaic module frame section of a first size.
Figure 16B:
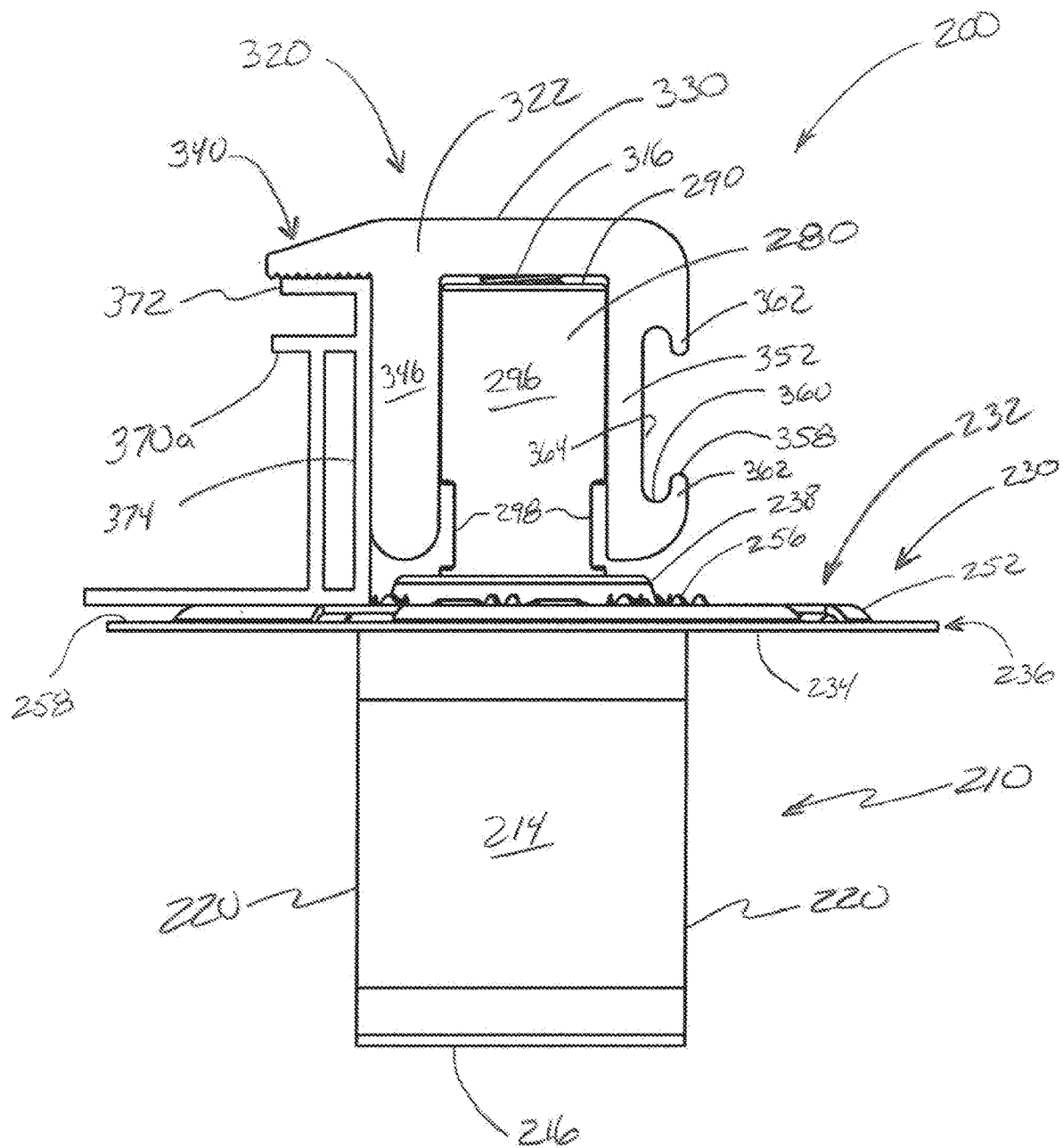
FIG. 16B is an end view of the mounting assembly and photovoltaic module frame section shown in FIG. 16A.

FIGS. 16A and 16B illustrate use of the mounting assembly 200 to secure a photovoltaic module having a first thickness for a frame section 370a thereof (e.g., 30 mm), where this photovoltaic module (e.g., its frame section 370a) is positioned on both the upper surface of one or more of the ribs 254 and the upper surface of part of the outer annular projection 252 on the upper surface 232 of the mounting plate 230 (the photovoltaic module is not positioned on an upper surface of the inner annular projection 238 of the mounting plate 230). Generally: 1) the stanchion 280 is appropriately secured to the mounting device 210 as described above; 2) the PV module frame section 370a is clamped between the clamp 320 and the mounting plate 230 by rotating the clamping fastener 310 to advance the clamp 320 toward the mounting plate 230 and relative to the stanchion 280; 3) the lower surface 344 of the clamping section 340 for the clamp 320 engages an upper wall 372 of the PV module frame section 370a; and 4) the outer surface 348 of the first wall 346 for the clamp 320 engages at least part of an end wall 374 of the PV module frame section 370a, and where this end wall 374 of the PV module frame section 370a is spaced from an adjacent-most portion of an outer perimeter of the inner annular projection 238 of the mounting plate 230 (although the clamp 320 could be configured such that the end wall 374 of the PV module frame section 370a would also engage an adjacent-most portion of the outer perimeter of the inner annular projection 238). Small spacing exists between the underside of the upper wall 330 and the second end 290 of the stanchion 280. In addition, opposing portions of the sidewall 296 of the stanchion 280 engage the inner surface 350 of the first wall 346 of the clamp 320 and the inner surface 356 of the second wall 352 of the clamp 320, and that is facilitated by having the sidewall 296 being a cylindrical surface. There is contact (e.g., along a line) between the sidewall 296 of the stanchion 280 and the inner surface 350 of the first wall 346 of the clamp 320. There is also opposing contact (e.g., along a line) between the sidewall 296 of the stanchion 280 and the inner surface 356 of the second wall 352 of the clamp 320. This provides support for the corresponding PV module. The engagement between the stanchion 280 and the clamp 320 should reduce the chance of the corresponding PV module "tilting" relative to the underlying building surface when compressing the PV module frame section 370a between the clamp 320 and the mounting plate 230 as described.

Figure 17A:
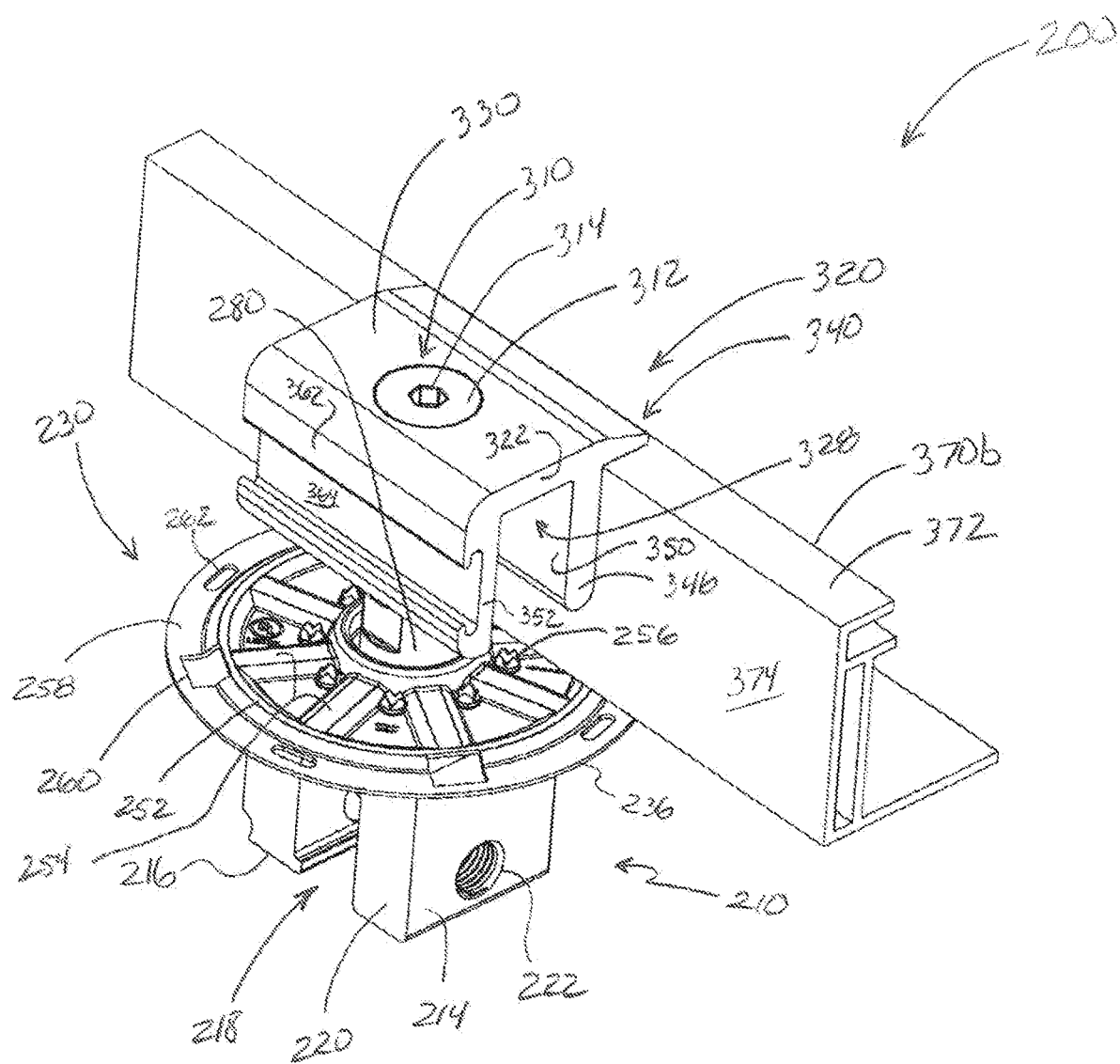
FIG. 17A is a perspective view showing the mounting assembly of FIG. 11 in use with a photovoltaic module frame section of a second size.
Figure 17B:
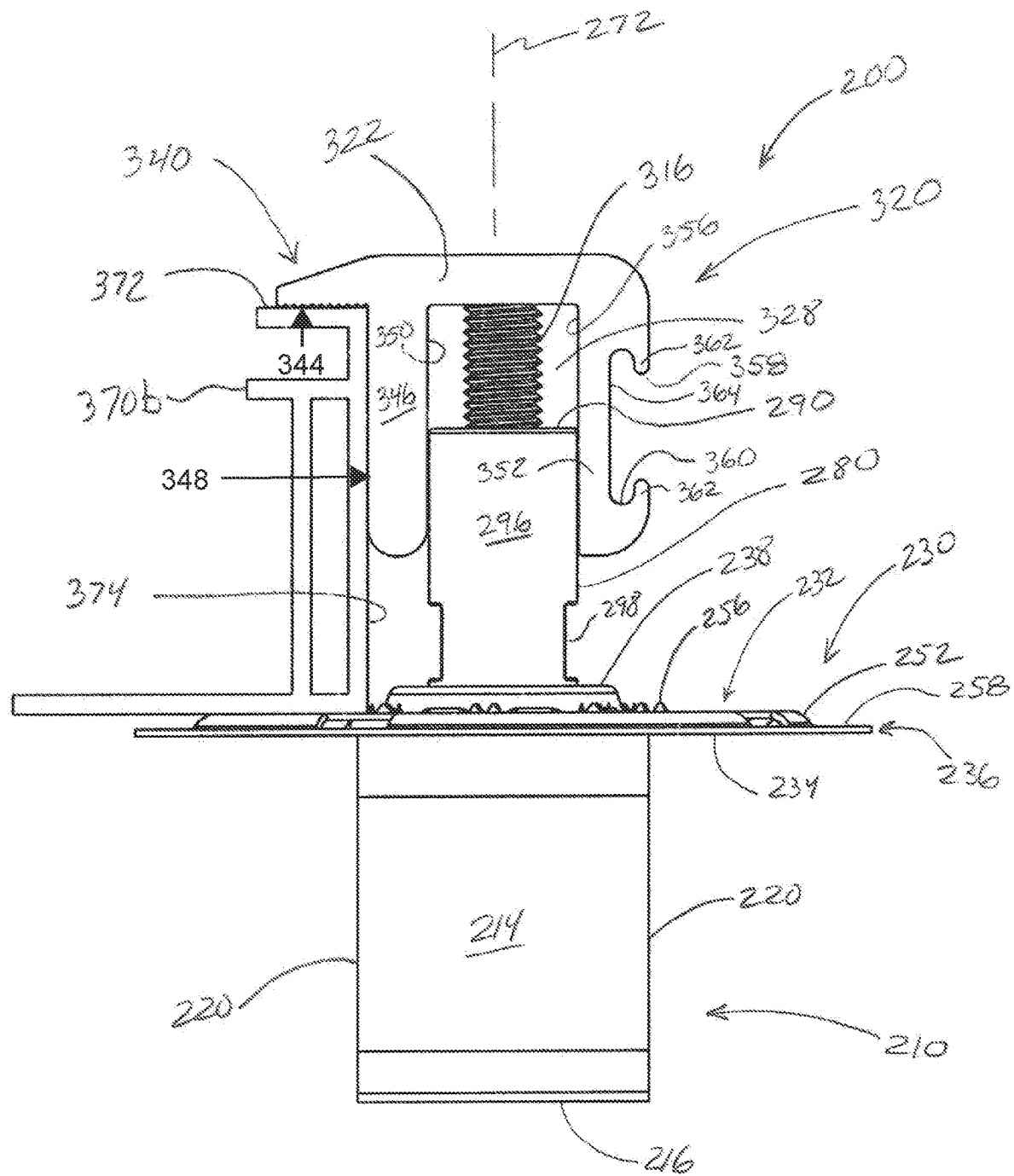
FIG. 17B is an end view of the mounting assembly and photovoltaic module frame section shown in FIG. 17A.
Figure 18A:
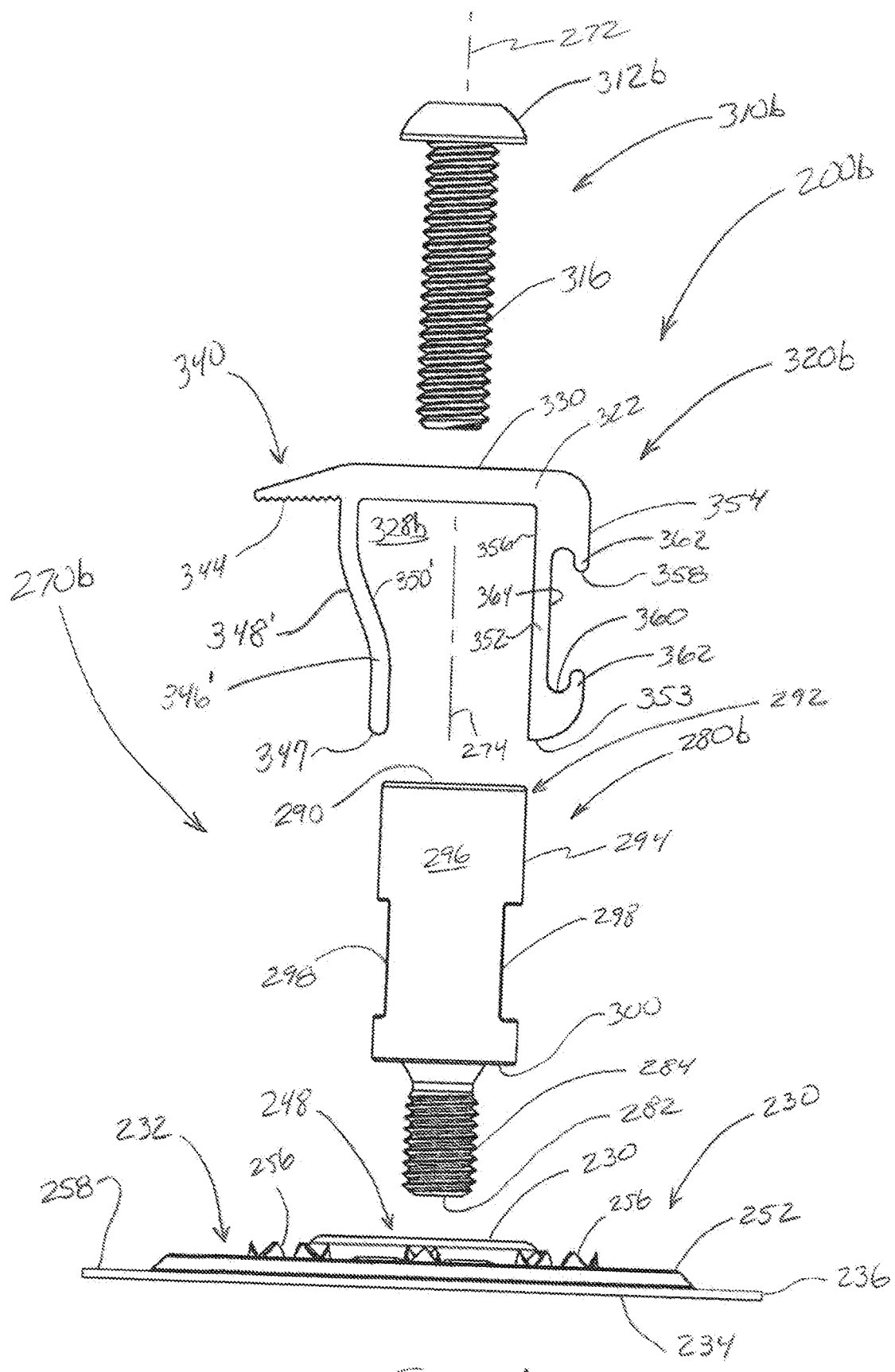
FIG. 18A is an exploded, end view of another embodiment of a mounting assembly for a single photovoltaic module.
Figure 18B:
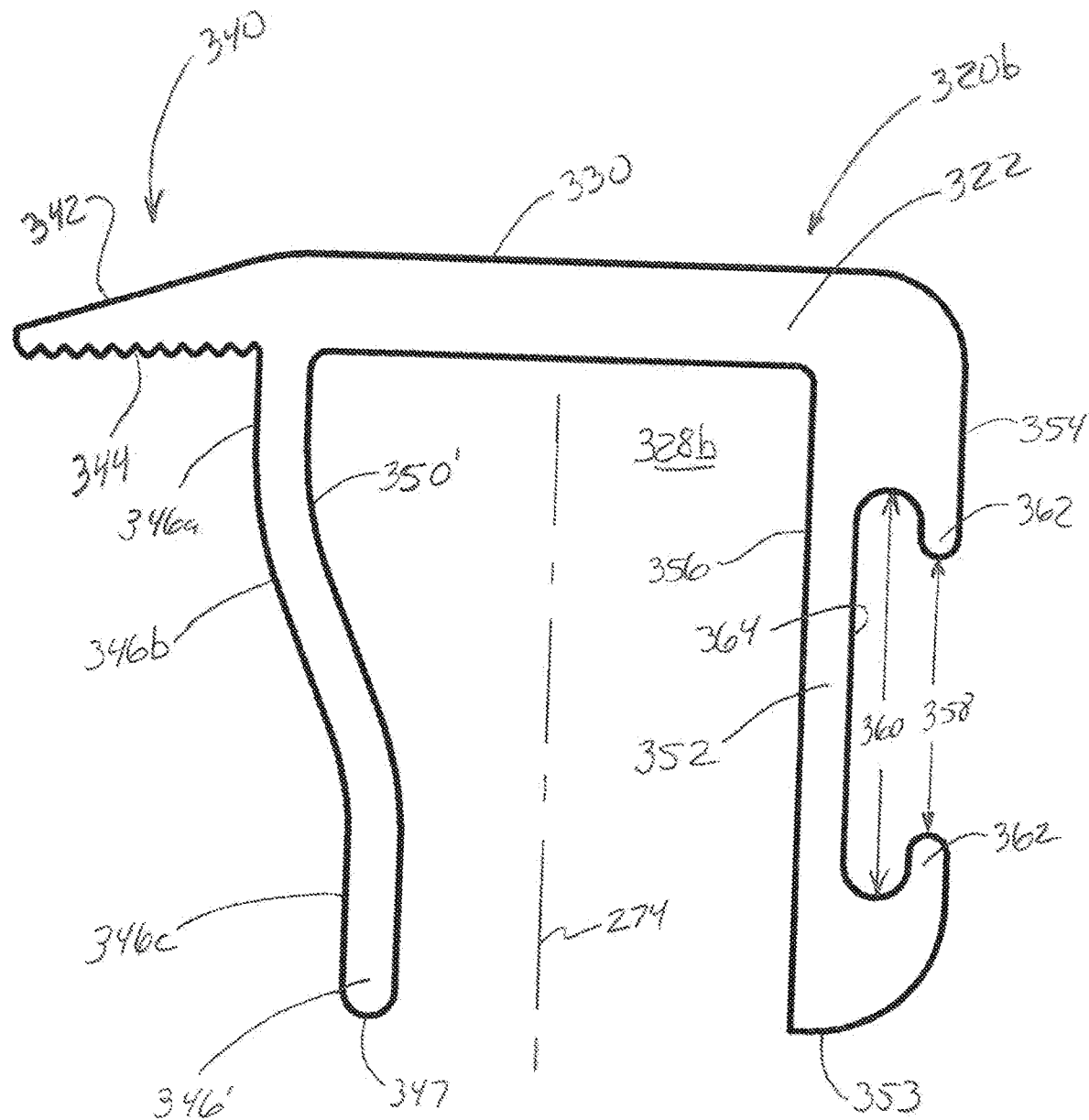
FIG. 18B is an end view of a clamp used by the mounting assembly of FIG. 18A.
Figure 18C:
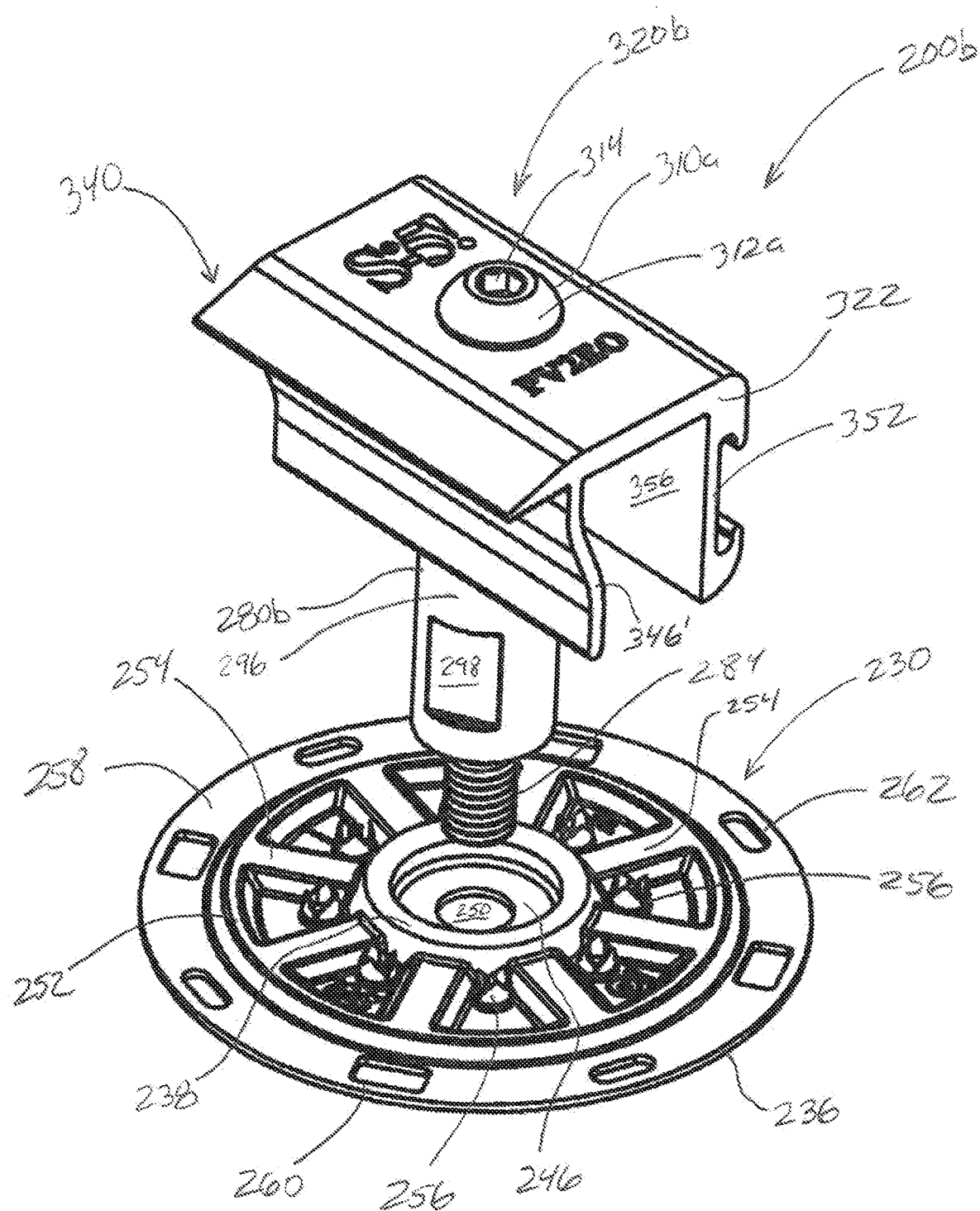
FIG. 18C is a perspective view of the mounting assembly shown in FIG. 18A.
Figure 18D:
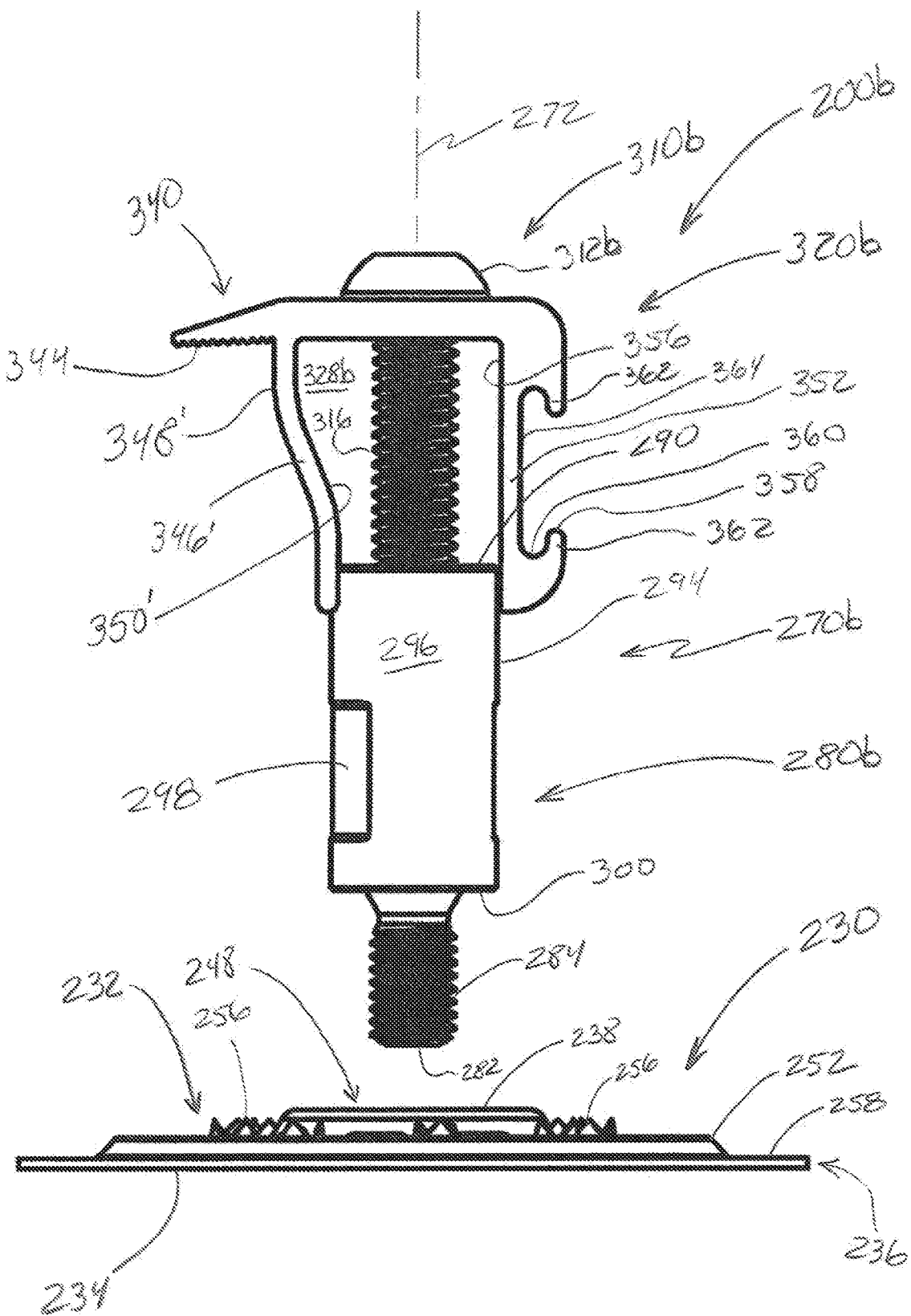
FIG. 18D is an end view of the mounting assembly of FIG. 18A, with a clamping fastener, clamp, and stanchion being in an assembled condition.

FIGS. 17A and 17B illustrate use of the mounting assembly 200 to secure a photovoltaic module having a frame section 370b with a second thickness (e.g., 42 mm), with the PV module frame section 370b being thicker than the PV module frame section 370a of FIGS. 16A and 16B, and where this photovoltaic module (e.g., its frame section 370b) is positioned on both the upper surface of one or more of the ribs 254 and the upper surface of part of the outer annular projection 252 on the upper surface 232 of the mounting plate 230 (the photovoltaic module is not positioned on an upper surface of the inner annular projection 238 of the mounting plate 230). Generally: 1) the stanchion 280 is appropriately secured to the mounting device 210 as described above; 2) the PV module frame section 370b is clamped between the clamp 320 and the mounting plate 230 by rotating the clamping fastener 310 to advance the clamp 320 toward the mounting plate 230 and relative to the stanchion 280; 3) the lower surface 344 of the clamping section 340 for the clamp 320 engages an upper wall 372 of the PV module frame section 370b; and 4) the outer surface 348 of the first wall 346 for the clamp 320 engages at least part of an end wall 374 of the PV module frame section 370b, where this end wall 374 of the PV module frame section 370b is spaced from an adjacent-most portion of the outer perimeter of the inner annular projection 238 of the mounting plate 230 (although the clamp 320 could be configured such that the end wall 374 of the PV module frame section 370b would also engage an adjacent-most portion of the outer perimeter of the inner annular projection 238). Larger spacing exists between the underside of the upper wall 330 and the second end 290 of the stanchion 280 (i.e., larger spacing than in the embodiment shown in FIG. 16B). In addition, opposing portions of the sidewall 296 of the stanchion 280 engage the inner surface 350 of the first wall 346 of the clamp 320 and the inner surface 356 of the second wall 352 of the clamp 320, facilitated by having the sidewall 296 being a cylindrical surface. There is contact (e.g., along a line) between the sidewall 296 of the stanchion 280 and the inner surface 350 of the first wall 346 of the clamp 320. There is also opposing contact (e.g., along a line) between the sidewall 296 of the stanchion 280 and the inner surface 356 of the second wall 352 of the clamp 320. This provides support for the corresponding PV module. The engagement between the stanchion 280 and the clamp 320 should reduce the chance of the corresponding PV module "tilting" relative to the underlying building surface when compressing the PV module frame section 370b between the clamp 320 and the mounting plate 230 as described.

A variation of the mounting assembly 200 of FIGS. 11-17B is illustrated in FIGS. 18A-18D and is identified by reference numeral 200b. Corresponding components between the embodiment of FIGS. 11-17B and the embodiment of FIGS. 18A-18D are identified by the same reference numerals, and the corresponding discussion presented above remains equally applicable unless otherwise noted to the contrary. Those components from the embodiment of FIGS. 18A-18D that differ in at least some respect from a corresponding component of the embodiment of FIGS. 11-17B use the same reference numeral in combination with a further identifier. Notwithstanding the discussion of differences that may exist between a component of the embodiment of FIGS. 18A-18D and its corresponding component in the embodiment of FIGS. 11-17B, the remainder of the discussion of this corresponding component from the embodiment of FIGS. 11-17B will remain equally applicable to the embodiment of FIGS. 18A-18D unless otherwise noted to the contrary.

The stanchion 280b for the mounting assembly 200b of FIGS. 18A-18D includes a different configuration for the transition between its body 294 and the threaded shaft 284 compared to the embodiment of FIGS. 11-17B. More specifically, the beveled transition between the body 294 (and more specifically from the end 300) and the threaded shaft 284 beneficially ensures that the mounting plate 230 is centered on the threaded shaft 294. Stated differently, the bevel between the threaded shaft 284 and the end 300 prevents the mounting plate 230 from shifting relative to the threaded shaft 284 once the threaded shaft 284 has been tightened onto a mounting device 210. However, the mounting assembly 200b of FIGS. 18A-18D could also use the stanchion 280 from the mounting assembly 200. The clamping fastener 310b for the mounting assembly 200b of FIGS. 18A-18D includes a different shape for its head 312b. Moreover, the head 312b for the clamping fastener 310b is positioned on the upper wall 330 of the clamp 320b. However, the mounting assembly 200b of FIGS. 18A-18D could also use clamping fastener 310 from the mounting assembly 200 and the clamp 320b could also include a countersink 334 for receiving the head of a clamping fastener in accordance with the mounting assembly 200. In any case, a hole extends completely through the clamp 320b to accommodate the passage of the threaded shaft 316 through the upper wall 330 of the clamp 320b. In some embodiments, there is no threaded engagement between the clamping fastener 310b and the clamp 320b (e.g., such that rotation of the clamping fastener 310b does not rotate the clamp 320b).

The primary distinction between the mounting assembly 200b of FIGS. 18A-18D and the mounting assembly 200 of FIGS. 11-17B is the configuration of the clamp 320b, namely with regard to the configuration of its first wall 346'. As the configuration of the first wall 346' has changed, its outer surface is identified by reference numeral 348', its inner surface is identified by reference numeral 350', and the stanchion receptacle is identified by reference numeral 328b. There are three sections that collectively define the first wall 346' for the clamp 320b—an upper section 346a, an intermediate section 346b, and a lower section 346c—and these sections 346a, 346b, and 346c are of a common wall thickness. The first wall 346' has a free end 347. The upper section 346a and the lower section 346c may be characterized as being disposed in parallel relation to one another, with the intermediate section 346b being disposed in a different orientation (relative to both the upper section 346a and the lower section 346c) and extending from the upper section 346a to the lower section 346c at least generally in the direction of a reference plane 274. This reference plane 274 is disposed in the stanchion receptacle 328b for the clamp 320b and is thereby located between the walls 346', 352. The reference plane 274 may be characterized as being oriented so as to be parallel to both at least part of the inner surface 350' of the first wall 346' (e.g., the portion corresponding with the upper section 346a and the lower section 346c) and at least part of the inner surface 356 of the second wall 352 (or the entirety thereof, for the illustrated embodiment). The reference plane 274 may also bisect the hole 250 through the mounting plate 230.

The inner surface 350' of both the upper section 346a and the lower section 346c are parallel to the inner surface 356 of the second wall 352, as well as the reference plane 274. However, a first spacing exists between the inner surface 350' of the upper section 346a and the reference plane 274, and a second spacing exists between the inner surface 350' of the lower section 346c and the reference plane 274, with the first spacing being larger than the second spacing. Stated another way, the inner surface 350' of the upper section 346a is further from the reference plane 274 (and from the inner surface 356 of the second wall 352) than the inner surface 350' of the lower section 346c. Stated yet another way, the inner surface 350' of the lower section 346c is closer to the reference plane 274 (and to the inner surface 356 of the second wall 352) than the inner surface 350' of the upper section 346a.

A third spacing exists between the outer surface 348' of the upper section 346a and the reference plane 274, and a fourth spacing exists between the outer surface 348' of the lower section 346c and the reference plane 274, with the third spacing being larger than the fourth spacing. Stated another way, the outer surface 348' of the upper section 346a is further from the reference plane 274 (and from the inner surface 356 of the second wall 352) than the outer surface 346' of the lower section 346c. Stated yet another way, the outer surface 346' of the lower section 346c is closer to the reference plane 274 (and to the inner surface 356 of the second wall 352) than the outer surface 348' of the upper section 346a.

The outer surface 348' of the upper section 346a of the first leg 346' and the outer perimeter of the inner annular projection 238 on the upper surface 232 of the mounting plate 230 are disposed the same distance from the reference plane 274. When a PV module frame section is engaged by the mounting assembly 200b, and where this photovoltaic module (e.g., its frame section 370) is positioned on both the upper surface of one or more of the ribs 254 and the upper surface of part of the outer annular projection 252 on the upper surface 232 of the mounting plate 230 (the photovoltaic module again is not positioned on an upper surface of the inner annular projection 238 of the mounting plate 230): 1) the lower surface 344 of the clamping section 340 will engage the upper wall of this PV module frame section (e.g., upper wall 372); 2) the outer surface 348' of the upper section 346a for the first wall 346' will engage an upper part of the end wall of this PV module frame section (e.g. end wall 374); 3) a lower part of the end wall of this PV module frame section (e.g. end wall 374) will engage an adjacent-most portion of the outer perimeter of the inner annular projection 238 for the mounting plate 230; 4) the PV module frame section will be clamped between the upper surface 232 of the mounting plate 230 and the clamping section 340 of the clamp 320b by rotation of the clamping fastener 310b to advance the clamp 320b toward the mounting plate 230 and relative to the stanchion 280b; and 5) the inner surface 350' of at least part of the lower section 346c of the first wall 346' and the inner surface 356 of at least part of the second wall 352 will engage the sidewall 296 of the stanchion 280a. The sidewall 296 being a cylindrical surface facilitates having opposing portions of the sidewall 296 of the stanchion 280b engage the inner surface 350' of the first wall 346' of the clamp 320b (namely at least part of the lower section 346c) and at least part of the inner surface 356 of the second wall 352 of the clamp 320. There is contact (e.g., along a line) between the sidewall 296 of the stanchion 280 and the inner surface 350' of the lower section 346c of the first wall 346' for the clamp 320b. There is also opposing contact (e.g., along a line) between the sidewall 296 of the stanchion 280 and the inner surface 356 of the second wall 352 of the clamp 320b. This provides support for the corresponding PV module. The engagement between the stanchion 280 and the clamp 320b should reduce the chance of the corresponding PV module "tilting" relative to the underlying building surface when compressing the PV module frame section (e.g., frame section 370) between the clamp 320b and the mounting plate 230 as described.

The clamping fastener 310b, the clamp 320b, and the stanchion 280b may be assembled prior to securing the stanchion 280b to the mounting device 210 (not shown in FIGS. 18A-18D, but a part of the mounting assembly 200b; e.g., using a temporary bond between the clamping fastener 310b and the stanchion 280b so that rotation of the clamping fastener 310b results in rotation of the stanchion 280b, such that the stanchion 280b threadably engages the mounting device 210) and thereafter clamping a PV module frame section between the clamp 320b and the mounting plate 230 in the same general manner as the embodiment of FIGS. 11-17B. The mounting assembly 200b also accommodates a range of PV module frame section heights or thicknesses based upon varying the position of the clamp 320b along/relative to the stanchion 280b and where the inner surface 350' of at least part of the lower section 346c of the first wall 346' and at least part of the inner surface 356 of the second wall 352 will remain engaged with opposing portions of at least part of the sidewall 296 of the stanchion 280 in each of these different positions.

A variation of the mounting assembly 200 of FIGS. 11-17B is illustrated in FIGS. 19A-20B and is identified by reference numeral 200c. Corresponding components between the embodiment of FIGS. 11-17B and the embodiment of FIGS. 19A-20B are identified by the same reference numerals, and the corresponding discussion presented above remains equally applicable unless otherwise noted to the contrary. Those components from the embodiment of FIGS. 19A-20B that differ in at least some respect from a corresponding component of the embodiment of FIGS. 11-17B use the same reference numeral in combination with a further identifier. Notwithstanding the discussion of differences that may exist between a component of the embodiment of FIGS. 19A-20B and its corresponding component in the embodiment of FIGS. 11-17B, the remainder of the discussion of this corresponding component from the embodiment of FIGS. 11-17B will remain equally applicable to the embodiment of FIGS. 19A-20B unless otherwise noted to the contrary.

The mounting assembly 200c of FIGS. 19A-20B uses the above-discussed clamping fastener 310 and mounting device 210. The mounting plate 230c for the mounting assembly 200c does not use any of the first cutouts 260 from the mounting plate 230 of FIGS. 11-17B. However, the mounting assembly 200c could utilize the mounting plate 230 in place of the mounting plate 230c. The mounting assembly 200c also uses a different clamp 380 and a modified stanchion 280c compared to the mounting assembly 200.

The clamp 380 includes an upper wall 382 and an oppositely disposed bottom wall 388 that each extend between a pair of ends 398 for the clamp 380. The upper wall 382 includes a countersink 386, with this countersink 386 and a fastener aperture 384 collectively extending between the upper wall 382 and the bottom wall 388. Preferably the fastener aperture 384 of the clamp 380 is un-threaded such that the clamping fastener 310 is not threadably engaged with the clamp 380 (e.g., rotation of the clamping fastener 310 about the rotational axis 272 should not rotate the clamp 380; in other words, the clamp 380 may remain in a stationary position while the clamping fastener 310 is rotated relative to the clamp 380 and about the rotational axis 272).

Other components of the clamp 380 include a rail wall 390 and a clamping section 392 that each extend between the ends 398 for the clamp 380. The clamping section 392 may be characterized as a portion of the upper wall 382 that extends beyond the rail wall 390. In any case, the clamping section 392 includes an upper surface 394 and a lower surface 396, with the lower surface 396 including serrations or the like for engaging a photovoltaic module and with the lower surface 396 being disposed at least generally orthogonal or perpendicular to the rail wall 390. The upper surface 394 of the clamping section 392 is sloped, converging at least generally in the direction of the lower surface 396 in proceeding toward a free side portion of the clamping section 392.

The stanchion 280c includes a body 294c having a cylindrical sidewall 296c. The body 294c does not include any flats 298. Instead, the stanchion 280c includes a fixed nut 304 that defines a second end 290c for the stanchion 280c, and with the threaded hole 286c also extending through this fixed nut 304. A rail flange 302 extends from the body 294c of the stanchion 280c. An outer perimeter of this rail flange 302 and the rail wall 390 are disposed at a common location from the rotational axis 272 associated with the clamping fastener 310 and the stanchion 280c. As such, when the lower surface 396 of the clamping section 392 engages the upper wall 372 of the PV module frame section 370, the rail wall 390 of the clamp 380 should engage one portion of the end wall 374 of the PV module frame section 370 and the outer perimeter of the rail flange 302 of the stanchion 280c should engage a different, spaced portion of the end wall 374 of the PV module frame section 370. The engagement between the rail flange 302 of the stanchion 280c and the rail wall 390 of the clamp 380 should reduce the chance of the corresponding PV module "tilting" relative to the underlying building surface when compressing the PV module frame section 370 between the clamp 380 and the mounting plate 230c as described.

The clamping fastener 310, the clamp 380, and the stanchion 280c may be assembled prior to securing the stanchion 280c to the mounting device 210 (e.g., using a temporary bond between the clamping fastener 310 and the stanchion 280c such that rotation of the clamping fastener 310 causes the stanchion 280c to rotate and thus threadably engage the mounting device 210) and thereafter clamping a PV module frame section between the clamp 380 and the mounting plate 230c as described above. The mounting assembly 200c also accommodates a range of PV module frame section heights or thicknesses based upon varying the position of the clamp 380 relative to the stanchion 280c. With reference still to FIGS. 19A-20B, but focusing on FIG. 20A, the mounting assembly 200c may be used to secure a photovoltaic module frame section 370c of a minimum thickness for the mounting assembly 200c, where this photovoltaic module (e.g., its frame section 370c) is positioned on both the upper surface of one or more of the ribs 254 and the upper surface of part of the outer annular projection 252 on the upper surface 232 of the mounting plate 230c (the photovoltaic module is not positioned on an upper surface of the inner annular projection 238 of the mounting plate 230c). Generally: 1) the stanchion 280c is appropriately secured to the mounting device 210 as described above; 2) the PV module frame section 370c is clamped between the clamp 380 and the mounting plate 230c as described above by the rotating clamping fastener 310 advancing the clamp 380 toward the mounting plate 230c and relative to the stanchion 280c; 3) the lower surface 396 of the clamping section 392 for the clamp 380 engages the upper wall 372 of the PV module frame section 370c; 4) the rail wall 390 of the clamp 380 engages one part of the end wall 374 for the PV module frame section 370c; 5) the outer perimeter of the rail flange 302 of the stanchion 280c engages a part of the end wall 374 for the PV module frame section 370c that is different and spaced from the part of the end wall 374 engaged by the rail wall 390 of the clamp 380; and 6) the end wall 374 of the PV module frame section 370c is spaced from an adjacent-most portion of the outer perimeter of the inner annular projection 238 of the mounting plate 230c (although the clamp 380 and stanchion 280c could be configured such that end wall 374 of the PV module frame section 370a would also engage an adjacent-most portion of the outer perimeter of the inner annular projection 238).

Figure 20A:
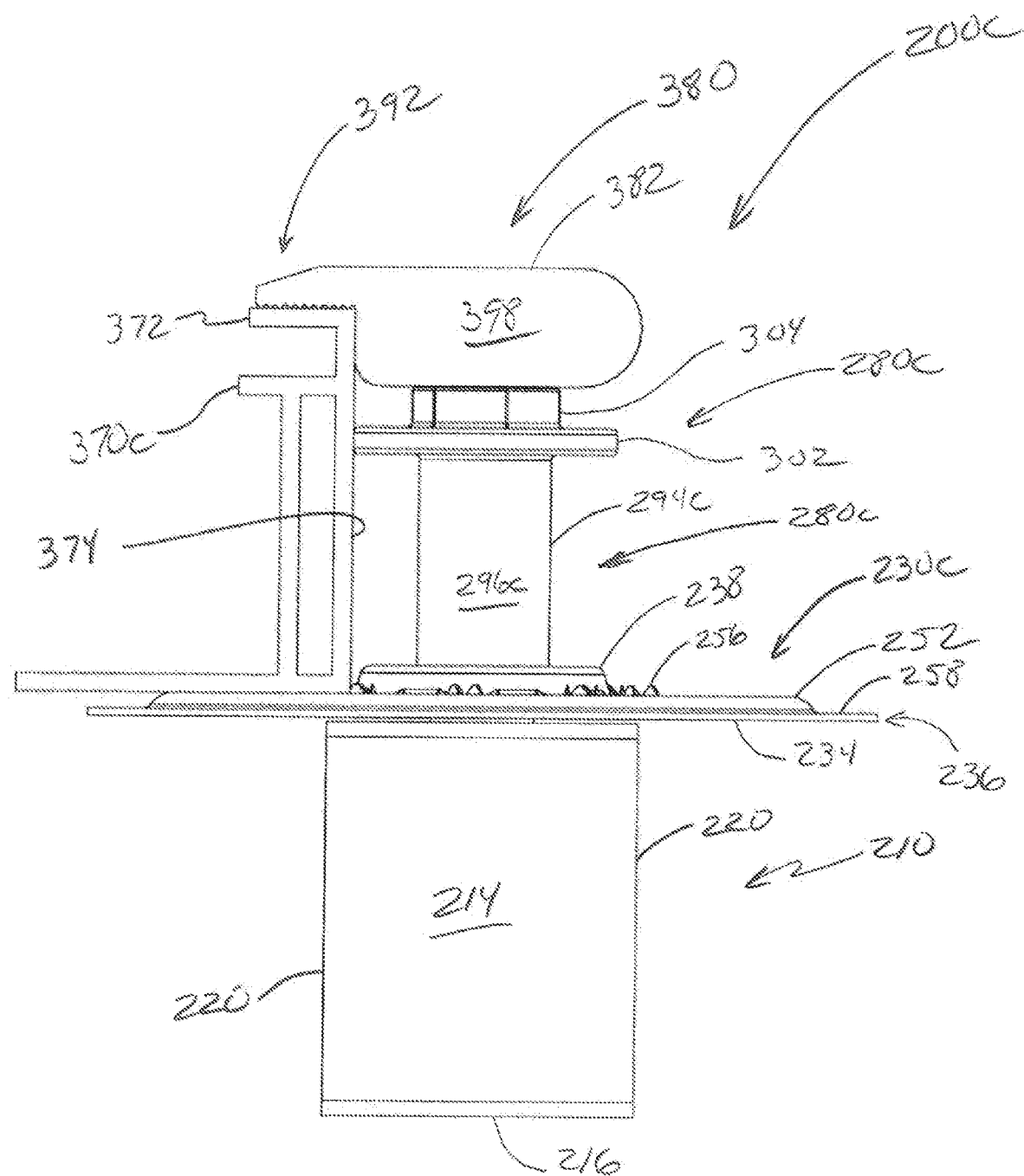
FIG. 20A is an end view of the mounting assembly of FIG. 19A in a minimum height configuration for a photovoltaic module engagement.
Figure 20B:
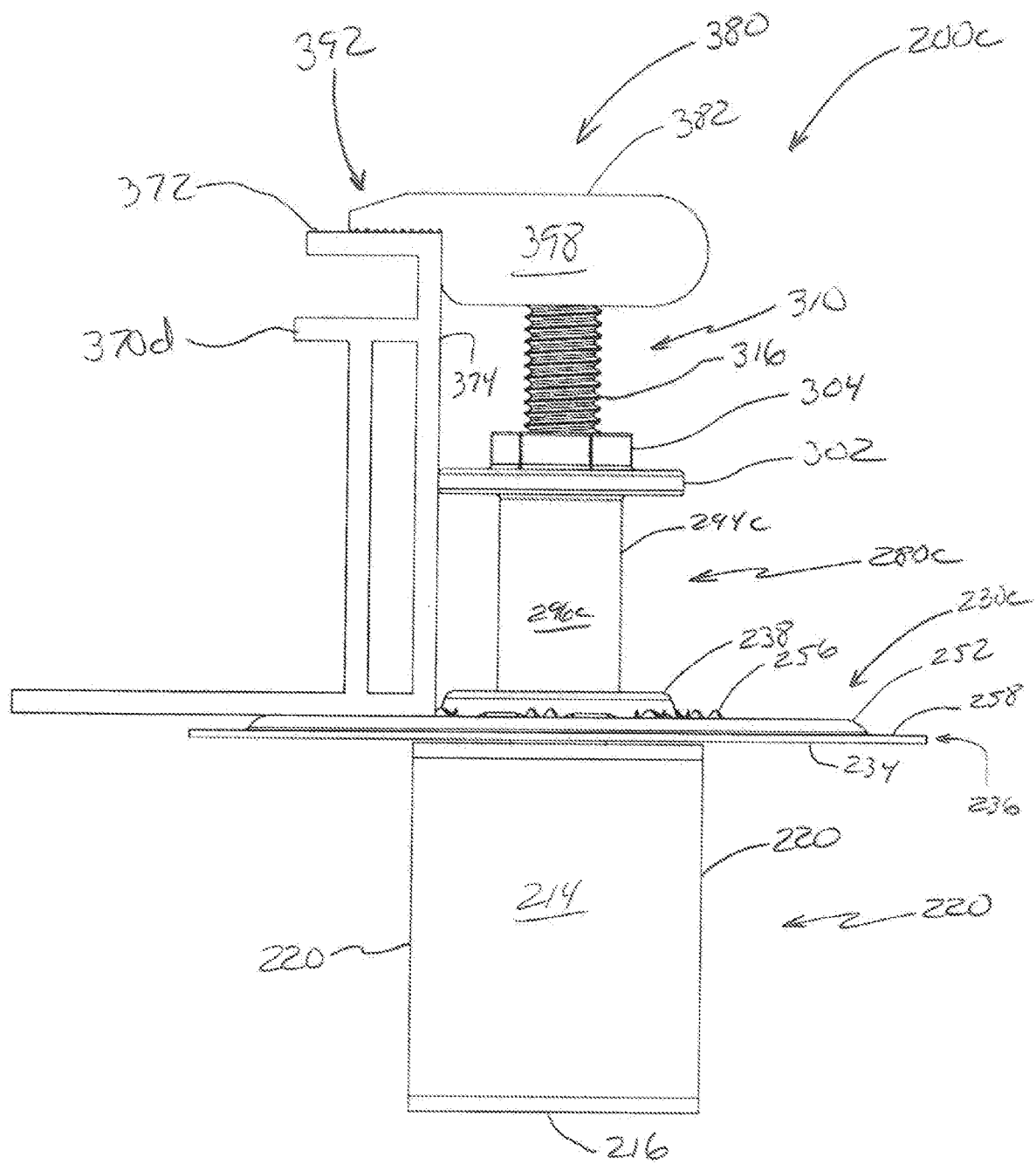
FIG. 20B is an end view of the mounting assembly of FIG. 19A in a maximum height configuration for a photovoltaic module engagement.
Figure 21:
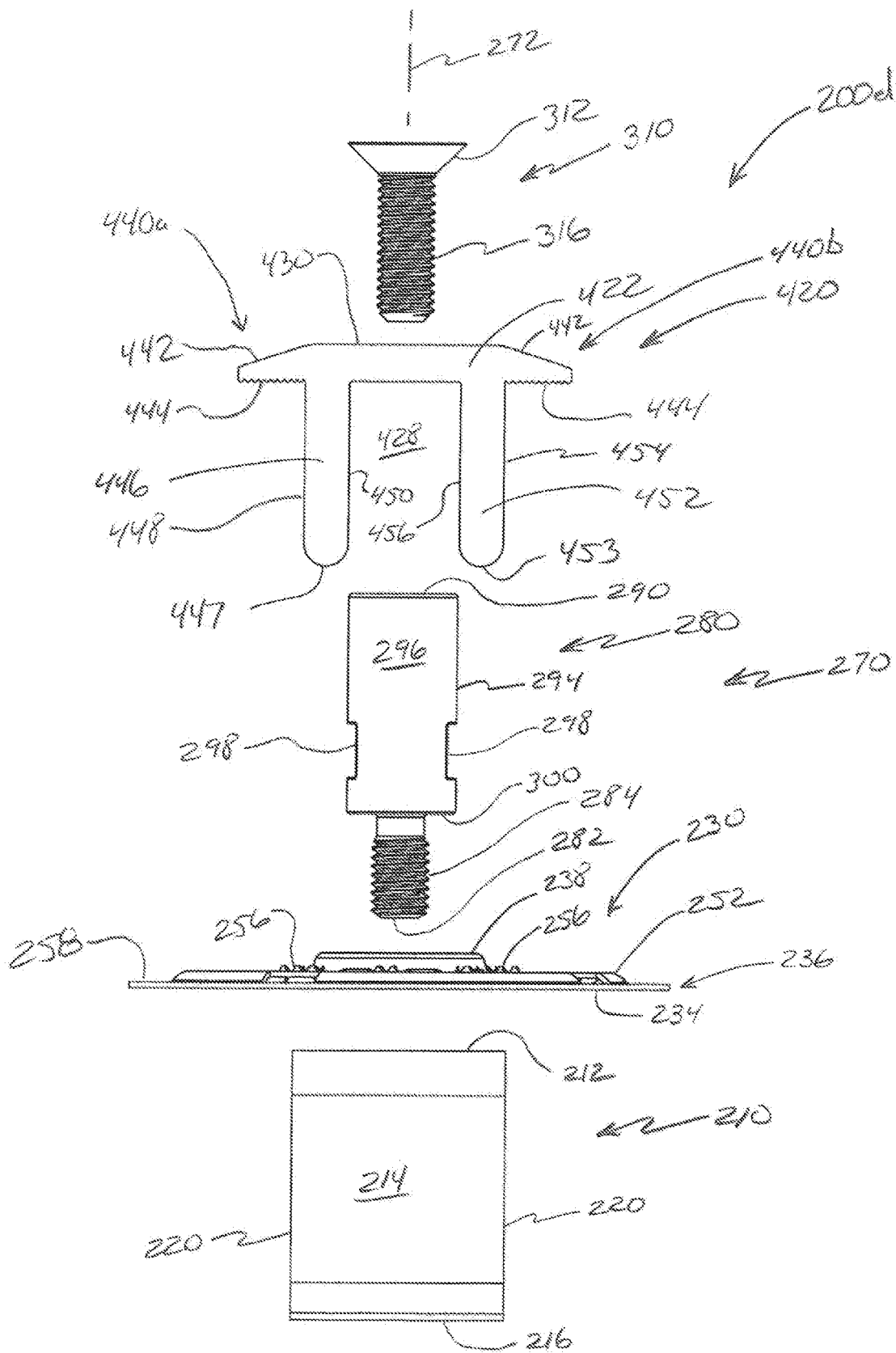
FIG. 21 is an exploded, end view of another embodiment of a mounting assembly that accommodates engaging a pair of photovoltaic modules.
Figure 22A:
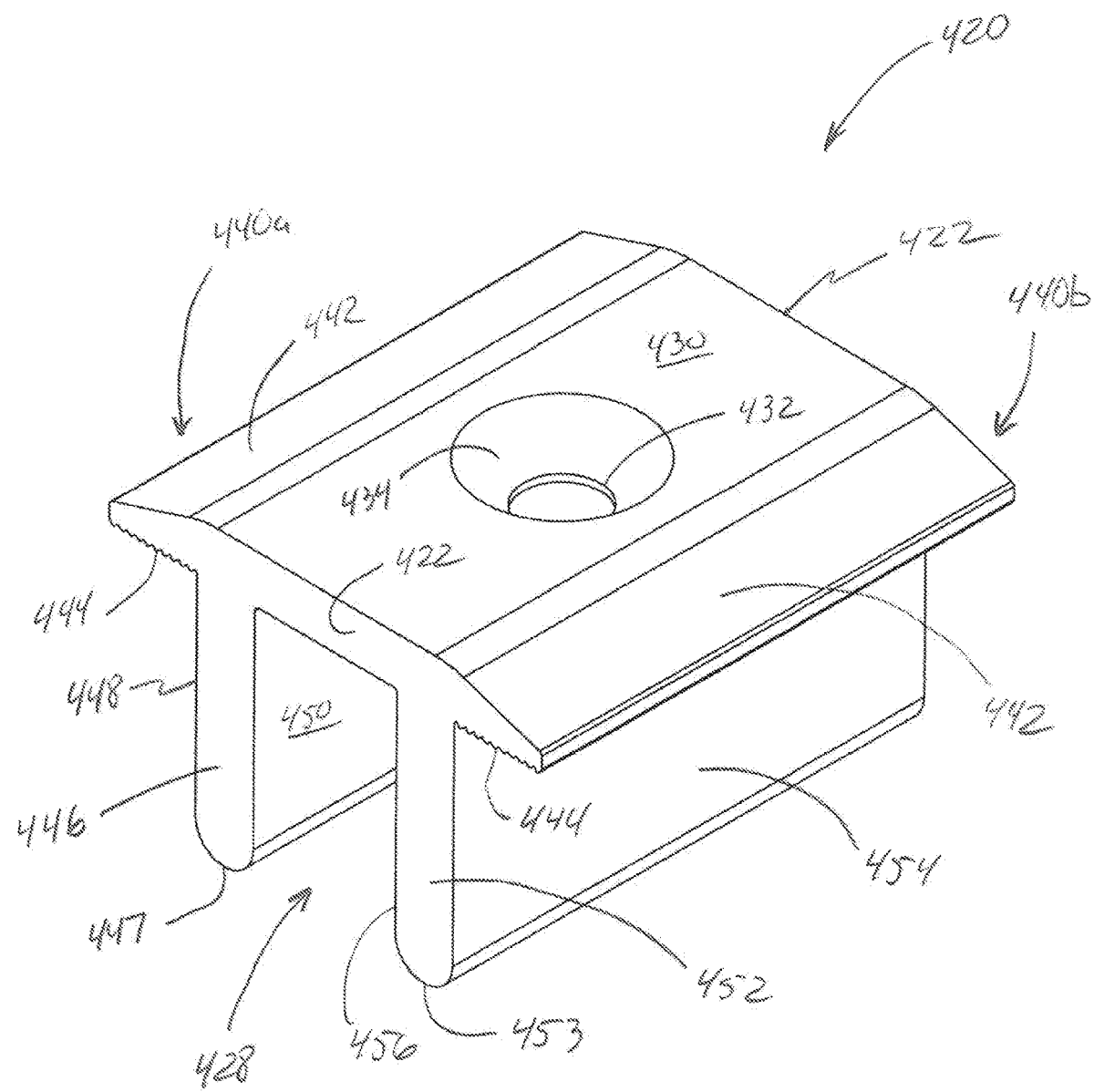
FIG. 22A is a perspective view of a clamp used by the mounting assembly of FIG. 21.
Figure 22B:
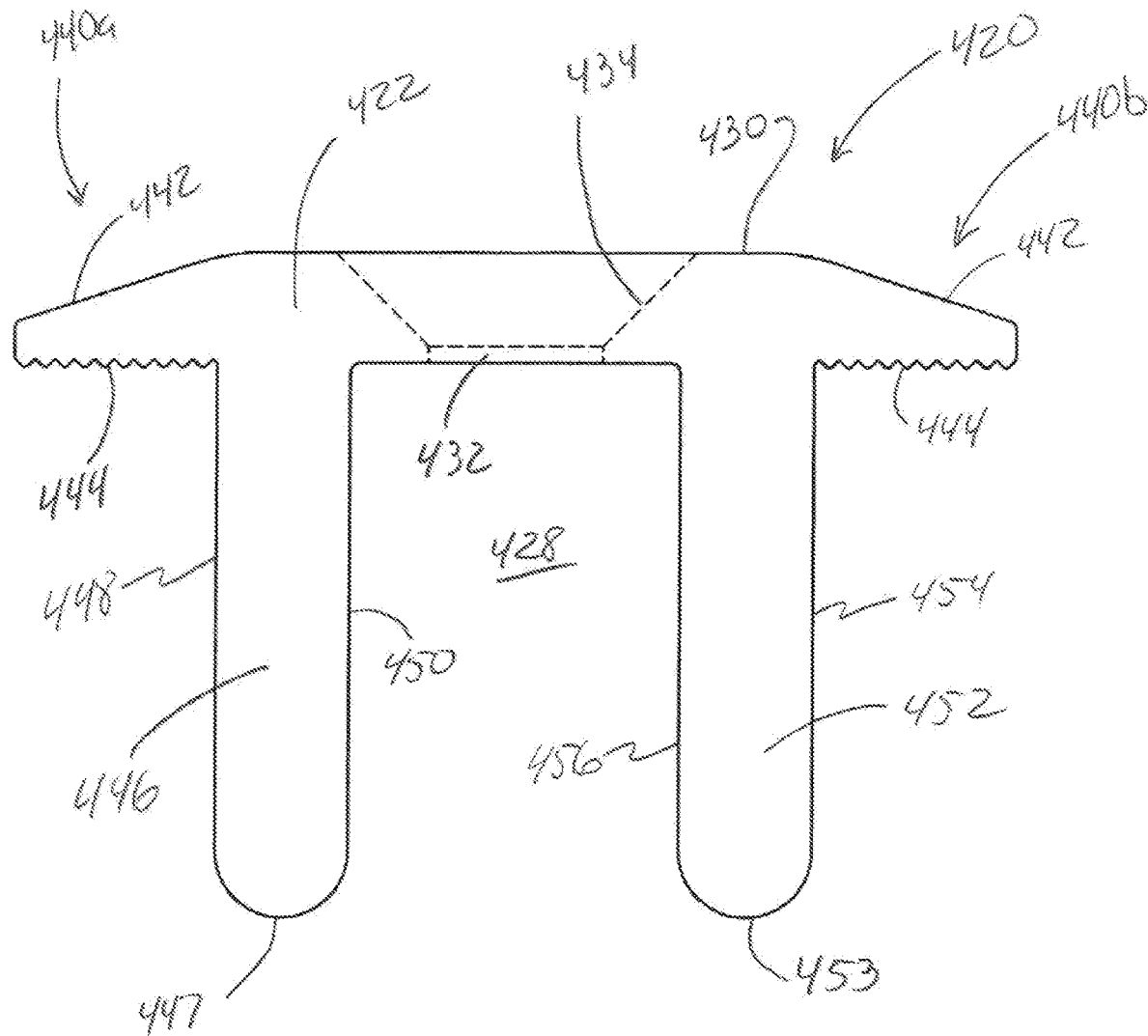
FIG. 22B is an end view of the clamp of FIG. 22A.

Still referring to FIGS. 19A-20B but focusing now on FIG. 20B, FIG. 20B illustrates use of the mounting assembly 200c to secure a photovoltaic module frame section 370d of a maximum thickness for the mounting assembly 200c, where this photovoltaic module (e.g., its frame section 370d) is positioned on both the upper surface of one or more of the ribs 254 and the upper surface of part of the outer annular projection 252 on the upper surface 232 of the mounting plate 230c (the photovoltaic module is not positioned on an upper surface of the inner annular projection 238 of the mounting plate 230c). Generally: 1) the stanchion 280c is appropriately secured to the mounting device 210 as described above; 2) the PV module frame section 370d is clamped between the clamp 380 and the mounting plate 230c as described above by rotating the clamping fastener 310 to advance the clamp 380 toward the mounting plate 230c and relative to the stanchion 280c; 3) the lower surface 396 of the clamping section 392 for the clamp 380 engages the upper wall 372 of the PV module frame section 370d; 4) the rail wall 390 of the clamp 380 engages one part of the end wall 374 for the PV module frame section 370d; 5) the outer perimeter of the rail flange 302 of the stanchion 280d engages a part of the end wall 374 for the PV module frame section 370d that is different than and spaced from the part of the end wall 374 engaged by the rail wall 390 of the clamp 380; and 6) the end wall 374 of the PV module frame section 370d is spaced from an adjacent-most portion of the outer perimeter of the inner annular projection 238 of the mounting plate 230c (although the clamp 380 and stanchion 280c could be configured such that end wall 374 of the PV module frame section 370d would also engage an adjacent-most portion of the outer perimeter of the inner annular projection 238).

Another embodiment of a mounting assembly is illustrated in FIGS. 21-24B and is identified by reference numeral 200d. Corresponding components between the embodiment of FIGS. 11-17B and the embodiment of FIGS. 21-24B are identified by the same reference numerals, and the corresponding discussion presented above remains equally applicable unless otherwise noted to the contrary. The mounting assembly 200d uses the above-discussed clamping fastener 310, stanchion 280, mounting plate 230, and mounting device 210 such that all related discussion remains equally applicable to the mounting assembly 200d. The primary difference between the mounting assembly 200d (FIGS. 21-24B) and the mounting assembly 200 (FIGS. 11-17B) is the replacement of the clamp 320 (FIGS. 11-17B) with a clamp 420 (FIGS. 21-24B). While the clamp 320 accommodates engaging only a single photovoltaic module, the clamp 420 accommodates simultaneously engaging a pair of adjacently disposed photovoltaic modules in a photovoltaic module array (e.g., photovoltaic module array 54 shown in FIG. 2) of any appropriate size and/or configuration, where rows of photovoltaic modules are typically disposed perpendicular to the pitch of a sloped roofing surface and where columns of photovoltaic modules are typically disposed along the pitch of such a sloped roofing surface. As such, the clamp 420 may be characterized as a "mid grab" (e.g., by being disposed between and/or engaging an adjacent pair of photovoltaic modules). However, the mounting assembly 200d could also be used to engage a single photovoltaic module. For instance, the configuration of the mounting assembly 200d allows the same to be used to engage a single photovoltaic module that is disposed along an edge of the photovoltaic module array (e.g., an "edge grab" application). Given the close fit between the clamp 420 and the stanchion 296, use of the clamp 420 in an "edge grab" application does not compromise the stability of the clamp 420 or of the mounting assembly 200d more generally. Consequently, if the clamp 420 is being used in a "mid-grab" application to hold two photovoltaic modules, and one of the photovoltaic modules being held by the clamp 420 is knocked loose for any reason (e.g., flying debris in a strong storm), the clamp 420 will continue to secure the other photovoltaic module (as if originally installed in an "edge-grab" application). The mounting assembly 200d thus represents an improvement over other mounting assemblies that are useful in a mid-grab application but not in an edge-grab application, and in the scenario presented above would fail altogether, potentially resulting in a "domino effect" or chain reaction of photovoltaic modules breaking free therefrom.

The clamp 420 includes an upper wall 430, two clamping sections 440a, 440b that are spaced from one another on opposite sides of the clamp 420, a first leg, sidewall, or wall 446, and a second leg, sidewall, or wall 452 that each extend between a pair of ends 422. A countersink 434 and a fastener aperture 432 collectively extend through the upper wall 430 to accommodate the threaded shaft 316 of the clamping fastener 310. In some embodiments, the fastener aperture 432 of the clamp 420 is un-threaded such that the clamping fastener 310 is not threadably engaged with the clamp 420 (e.g., rotation of the clamping fastener 310 about rotational axis 272 does not rotate the clamp 420, such that the clamp 420 may remain in a stationary position while the clamping fastener 310 is rotated relative to the clamp 420 and about rotational axis 272).

The first wall 446 and the second wall 452 both cantilever from the upper wall 430 (more specifically an underside thereof), with the first wall 446 having a free end 447 and the second wall 452 having a free end 453. The first wall 446 includes an outer surface 448 and an inner surface 450, while the second wall 452 includes an outer surface 454 and an inner surface 456. The inner surface 450 of the first wall 446 is flat or planar, as is the inner surface 456 of the second wall 452. The outer surface 448 of the first wall 446 is flat or planar, as is the outer surface 454 of the second wall 452. The surfaces 448, 450 of the first wall 446 and the surfaces 454, 456 of the second wall 452 are parallel to one another. The inner surface 450 of the first wall 446 is spaced from and is parallel to the inner surface 456 of the second wall 452 to collectively define a stanchion receptacle 428.

The clamping sections 440a, 440b each may be characterized as a portion of the upper wall 430 that extends beyond the first wall 446 and second wall 452, respectively. In any case, each of the clamping section 440a, 440b includes an upper surface 442 and a lower surface 444, with the lower surface 444 including serrations or the like for engaging a photovoltaic module, with the lower surface 444 of the clamping section 440a being disposed at least generally orthogonal or perpendicular to the outer surface 448 of the first wall 446, and with the lower surface 444 of the clamping section 440b being disposed at least generally orthogonal or perpendicular to the outer surface 454 of the second wall 452. The upper surface 442 of each clamping section 440a, 440b is sloped, converging at least generally in the direction of its corresponding lower surface 444 in proceeding toward a free side portion of its corresponding clamping section 440a, 440b.

The clamping fastener 310, the clamp 420, and the stanchion 280 may be assembled prior to securing the stanchion 280 to the mounting device 210 in the case of the mounting assembly 200d. The threaded shaft 316 of the clamping fastener 310 is directed through the upper wall 430 of the clamp 420 (via the countersink 434 and the fastener aperture 432) and at least an upper section of the stanchion 280 is positioned within the stanchion receptacle 428 of the clamp 420 such that the shaft 316 of the clamping fastener 310 may be threaded into the hole 286 on the second end 290 of the stanchion 280 (e.g., by directing the stanchion 280 through the space between the walls 446, 452 at either of the ends 422 of the clamp 420; by directing the stanchion 280 through the space between the walls 446, 452 at their respective free ends 447, 453). Again, the clamping fastener 310 may be temporarily secured to the stanchion 280, such as by an appropriate bond (e.g., adhesive). When the clamping fastener 310 and the stanchion 280 are in a bonded state, the clamping fastener 310 and the stanchion 280 may be collectively rotated (e.g., using the drive socket 314 of the clamping fastener 310) about the rotational axis 272 to thread the shaft 284 of the stanchion 280 into the hole 226 of the mounting device 210. At this time the clamp 420 should remain in a rotationally stationary state (i.e., both the stanchion end 280 and the clamping fastener 310 should rotate, but not the clamp 420). Once the stanchion 280 has been appropriately tightened/secured to the mounting device 210, the bond between the clamping fastener 310 and the stanchion 280 should be broken or otherwise eliminated to return the clamping fastener 310 and the stanchion 280 to an un-bonded state, to thereafter allow the clamping fastener 310 to continue to rotate about this axis 272 and relative to the stanchion 280. Rotation of the clamping fastener 310 relative to the stanchion 280 will advance the clamp 420 along the stanchion 280 and in the direction of the first end 282 of the stanchion 280.

The mounting assembly 200d also accommodates a range of PV module frame section heights or thicknesses based upon varying the position of the clamp 420 along/relative to the stanchion 280 and where the inner surface 450 of at least part of the first wall 446 and where the inner surface 456 of at least part of the second wall 452 will remain engaged with opposing portions of the sidewall 296 of the stanchion 280 in each of these different positions. Referring still to FIGS. 21-24B but focusing on FIGS. 23A-23B, these figures illustrate use of the mounting assembly 200d to simultaneously secure an adjacent pair of photovoltaic modules each having a first thickness for a frame section 370a thereof (e.g., 30 mm), where each photovoltaic module of the pair (e.g., its frame section 370a) is positioned on both the upper surface of one or more of the ribs 254 and the upper surface of part of the outer annular projection 252 on the upper surface 232 of the mounting plate 230 (each photovoltaic module of the pair is not positioned on an upper surface of the inner annular projection 238 of the mounting plate 230). Generally: 1) the stanchion 280 is appropriately secured to the mounting device 210 in the above-noted manner; 2) the left PV module frame section 370a in the view of FIG. 23B is clamped between the clamping section 440a of the clamp 420 and the mounting plate 230, while the right PV module frame section 370a in the view of FIG. 23B is clamped between the clamping section 440b of the clamp 420 and the mounting plate 230, all by the rotating clamping fastener 310 advancing the clamp 420 toward the mounting plate 230 and relative to the stanchion 280; 3) the lower surface 444 of the clamping section 440a for the clamp 420 engages the upper wall 372 of the left PV module frame section 370a in the view of FIG. 23B, while the lower surface 444 of the clamping section 440b for the clamp 420 engages the upper wall 372 of the right PV module frame section 370a in the view of FIG. 23B; 4) the outer surface 448 of the first wall 446 for the clamp 420 engages at least part of end wall 374 of the left PV module frame section 370a in the view of FIG. 23B, while the outer surface 454 of the second wall 452 for the clamp 420 engages at least part of end wall 374 of the right PV module frame section 370a in the view of FIG. 23B; and 5) the end wall 374 of the left PV module frame section 370a in the view of FIG. 23B is spaced from an adjacent-most portion of the outer perimeter of the inner annular projection 238 of the mounting plate 230 (although the clamp 420 could be configured such that end wall 374 of the left PV module frame section 370a in the view of FIG. 23B would also engage an adjacent-most portion of the outer perimeter of the inner annular projection 238), while the end wall 374 of the right PV module frame section 370a in the view of FIG. 23B is spaced from an adjacent-most portion of the outer perimeter of the inner annular projection 238 of the mounting plate 230 (although the clamp 420 could be configured such that end wall 374 of the right PV module frame section 370a in the view of FIG. 23B would also engage an adjacent-most portion of the outer perimeter of the inner annular projection 238). Small spacing exists between the underside of the upper wall 430 and the second end 290 of the stanchion 280. In addition, opposing portions of the sidewall 296 of the stanchion 280 engage the inner surface 450 of the first wall 446 of the clamp 420 and the inner surface 456 of the second wall 452 of the clamp 420, facilitated by having the sidewall 296 be a cylindrical surface. There is contact (e.g., along a line) between the sidewall 296 of the stanchion 280 and the inner surface 450 of the first wall 446 of the clamp 420. There is also opposing contact (e.g., along a line) between the sidewall 296 of the stanchion 280 and the inner surface 456 of the second wall 452 of the clamp 420. This provides support for the corresponding PV module(s). The engagement between the stanchion 280 and the clamp 420 should reduce the chance of the corresponding PV modules "tilting" relative to the underlying building surface when compressing the pair of PV module frame sections 370a between the clamp 420 and the mounting plate 230 as described. The engagement between the stanchion 280 and the clamp 420 should also reduce the chance of a PV module "tilting" relative to the underlying building surface when only a single PV module frame section 370a is disposed on the upper surface 232 of the mounting plate 230 and when compressing this single PV module frame section 370a between the clamp 420 (either the clamping section 440a or the clamping section 440b) and the mounting plate 230 as described.

Figure 23A:
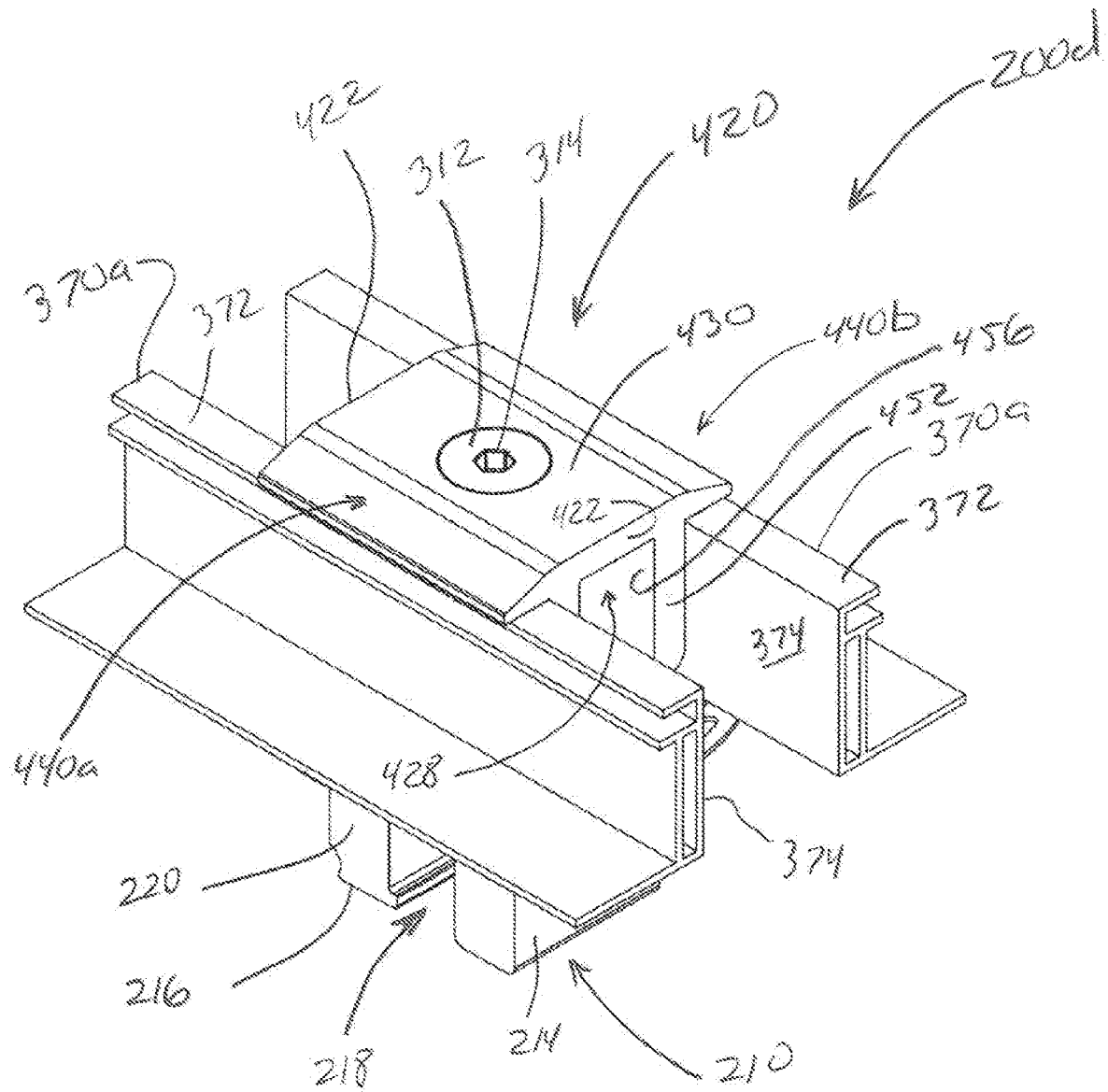
FIG. 23A is a perspective view showing the mounting assembly of FIG. 21 in with a photovoltaic module frame section of a first size.
Figure 23B:
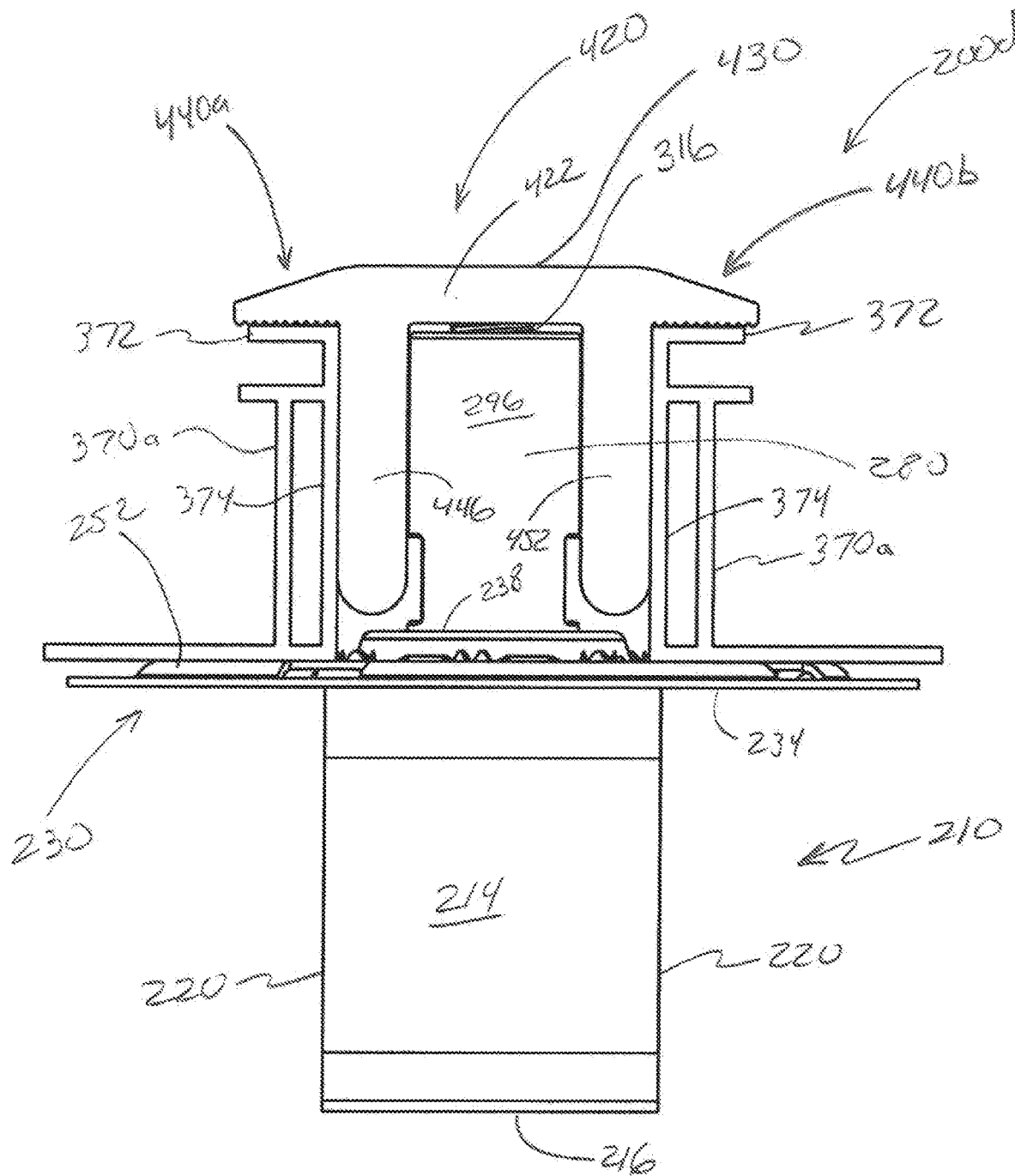
FIG. 23B is an end view of the mounting assembly and photovoltaic module frame section shown in FIG. 23A.
Figure 24A:
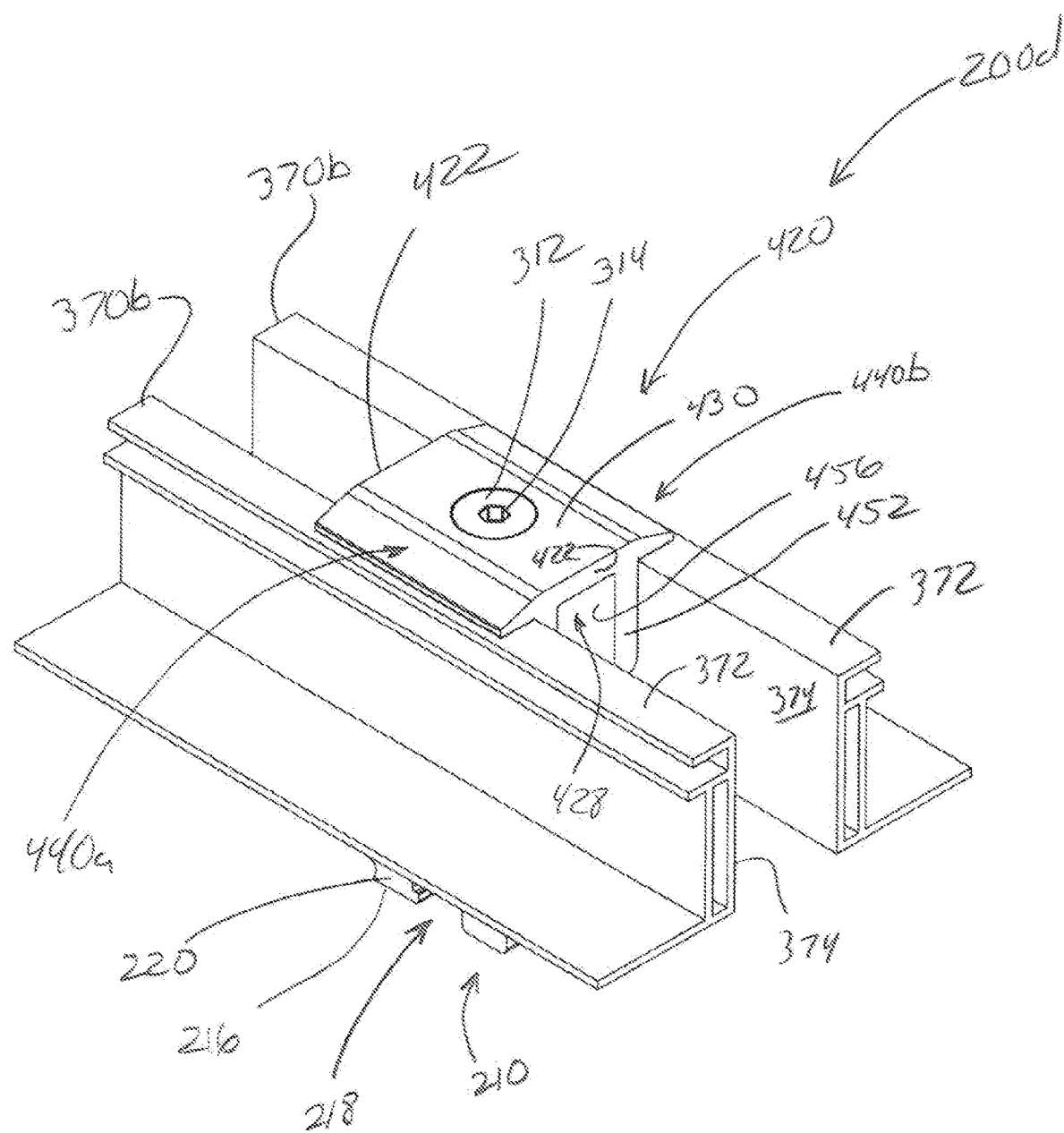
FIG. 24A is a perspective view of using the mounting assembly of FIG. 21 for a photovoltaic module frame section of a second size.
Figure 24B:
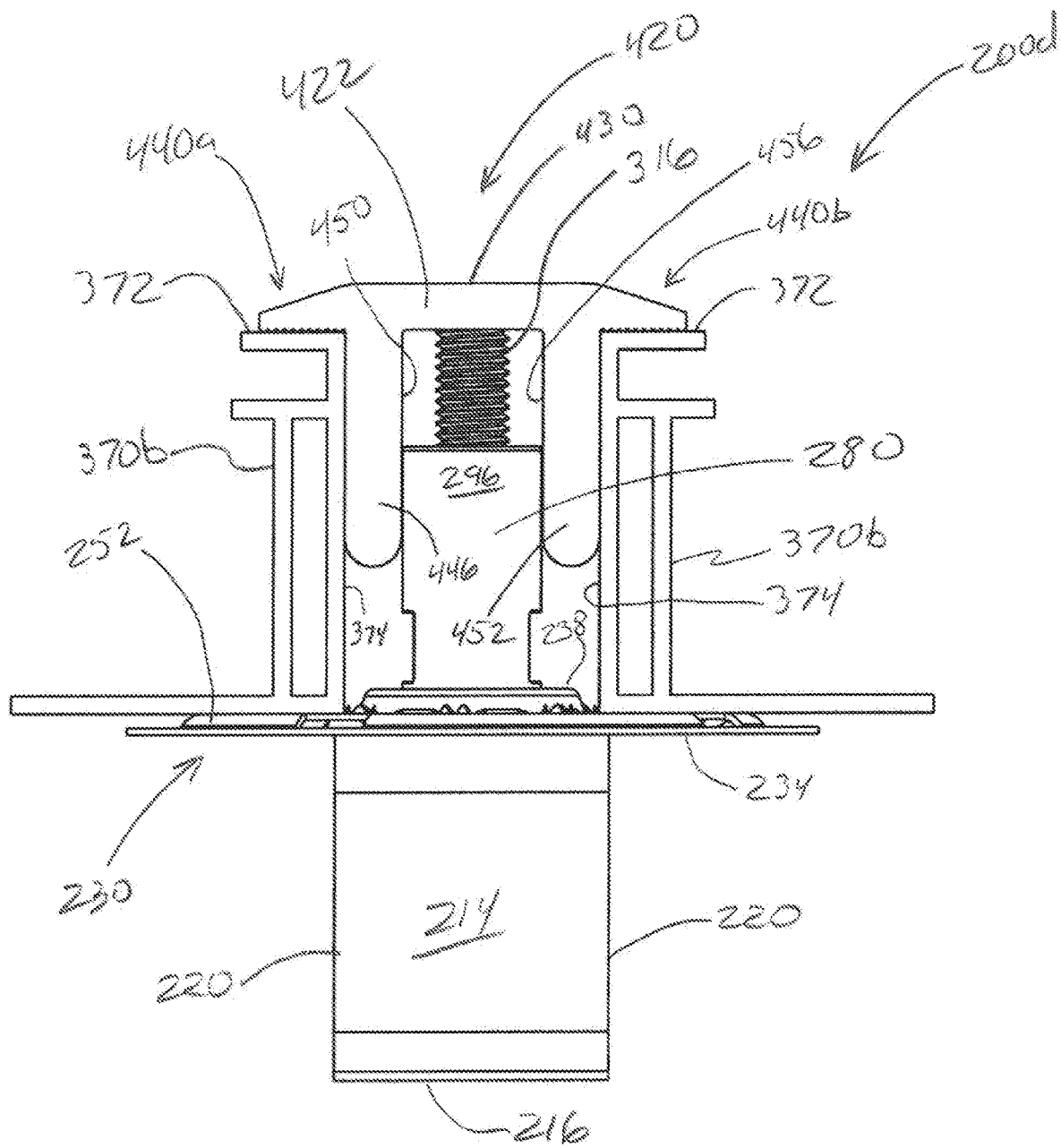
FIG. 24B is an end view of the mounting assembly and photovoltaic module frame section shown in FIG. 24A.
Figure 25C:
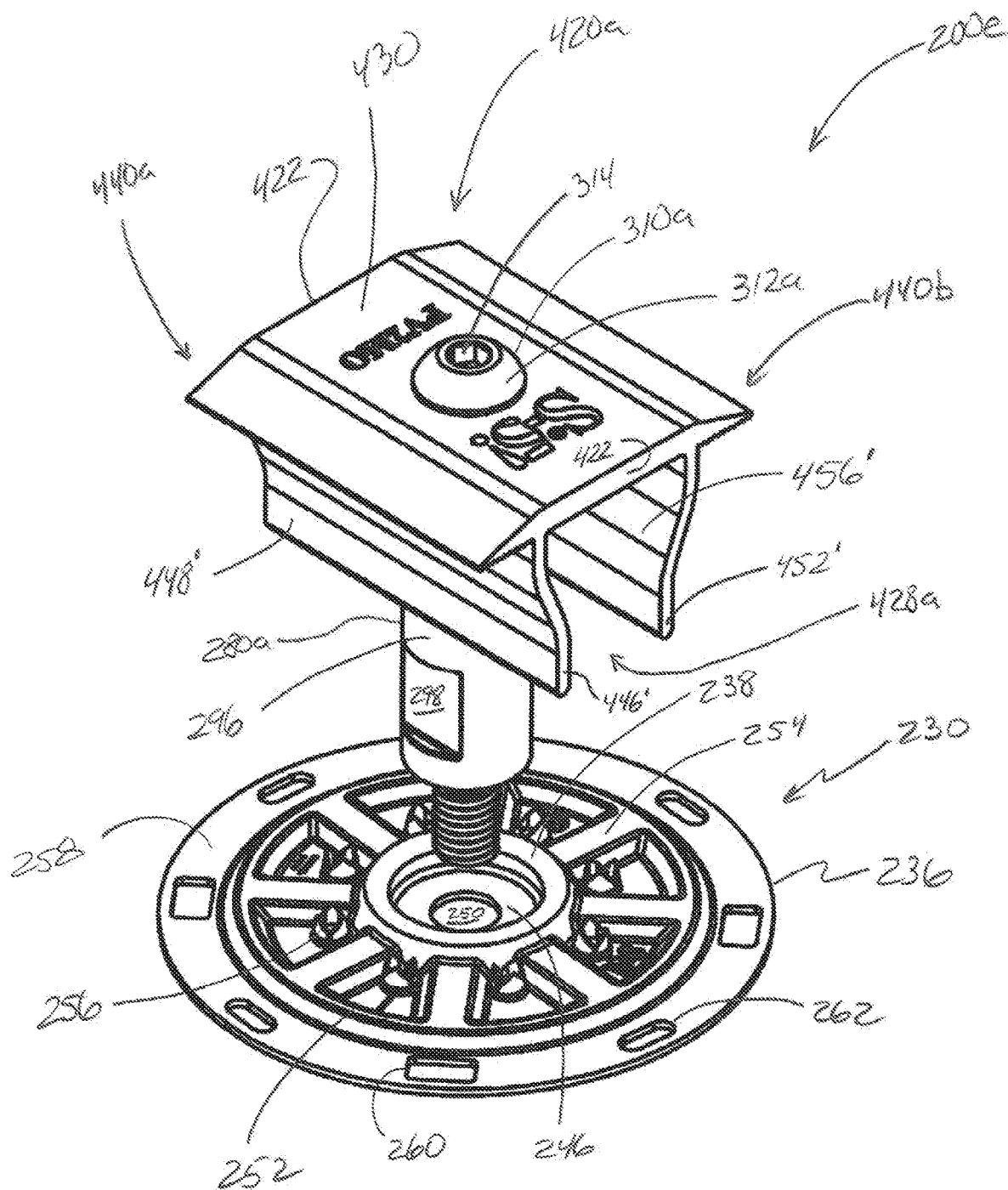
FIG. 25C is a perspective view of the mounting assembly shown in FIG. 25A.
Figure 25D:
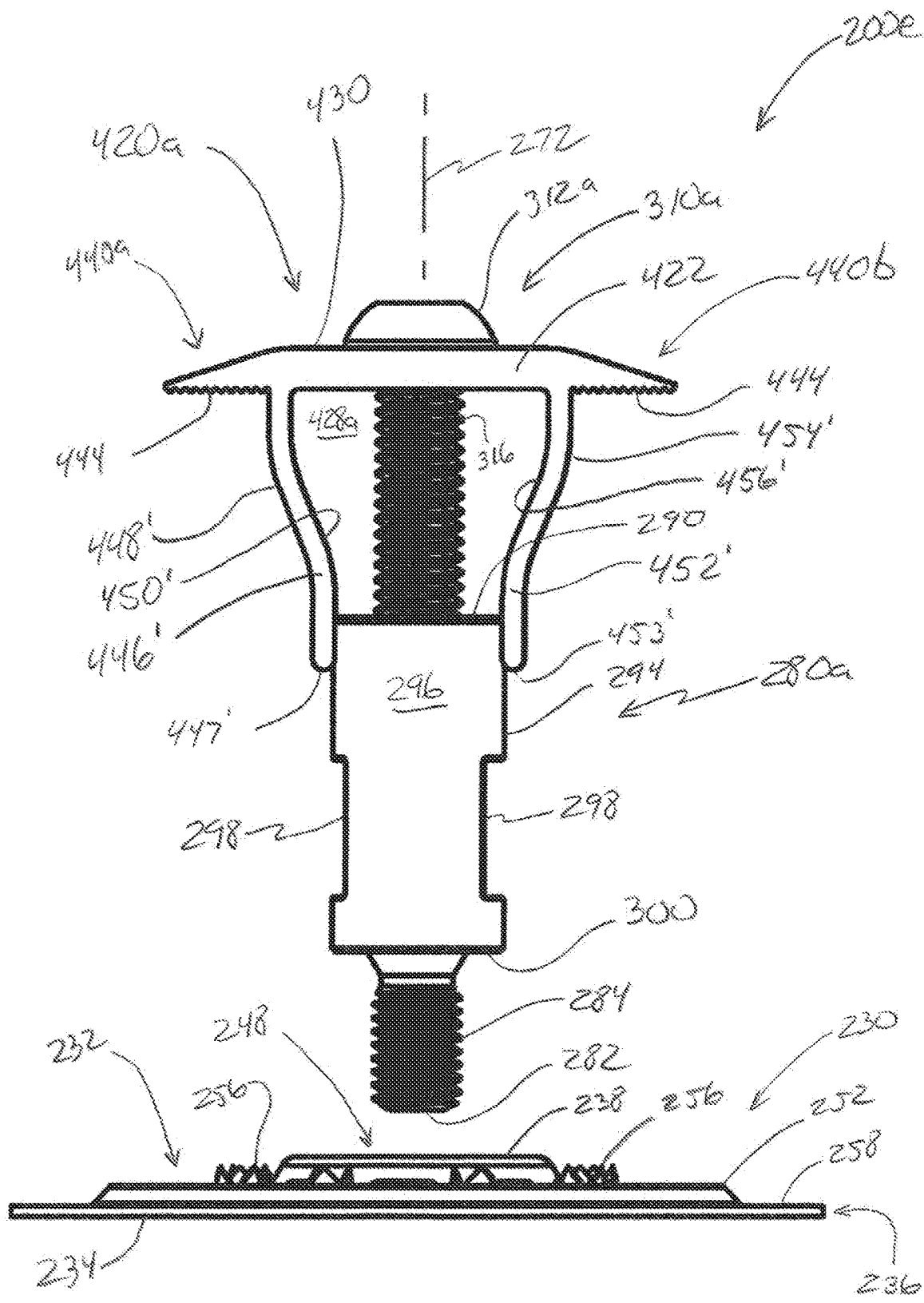
FIG. 25D is an end view of the mounting assembly of FIG. 25A, with a clamping fastener, clamp, and stanchion being in an assembled condition.

Referring still to FIGS. 21-24B but focusing on FIGS. 24A and 24B, these figures illustrate use of the mounting assembly 200d to simultaneously secure an adjacent pair of photovoltaic modules each having a second thickness for a frame section 370b thereof (e.g., 42 mm), with the PV module frame section 370b being thicker than the PV module frame section 370a of FIGS. 23A and 23B, and where each photovoltaic module of the pair (e.g., its frame section 370b) is positioned on both the upper surface of one or more of the ribs 254 and the upper surface of part of the outer annular projection 252 on the upper surface 232 of the mounting plate 230 (each photovoltaic module of the pair is not positioned on an upper surface of the inner annular projection 238 of the mounting plate 230). Generally: 1) the stanchion 280 is appropriately secured to the mounting device 210 in the above-described manner; 2) the left PV module frame section 370b in the view of FIG. 24B is clamped between the clamping section 440a of the clamp 420 and the mounting plate 230, while the right PV module frame section 370b in the view of FIG. 24B is clamped between the clamping section 440b of the clamp 420 and the mounting plate 230, all by the rotating clamping fastener 310 advancing the clamp 420 toward the mounting plate 230 and relative to the stanchion 280; 3) the lower surface 444 of the clamping section 440a for the clamp 420 engages an upper wall 372 of the left PV module frame section 370b in the view of FIG. 24B, while the lower surface 444 of the clamping section 440b for the clamp 420 engages an upper wall 372 of the right PV module frame section 370b in the view of FIG. 24B; 4) the outer surface 448 of the first wall 446 for the clamp 420 engages at least part of end wall 374 of the left PV module frame section 370b in the view of FIG. 24B, while the outer surface 454 of the second wall 452 for the clamp 420 engages at least part of end wall 374 of the right PV module frame section 370b in the view of FIG. 24B; and 5) the end wall 374 of the left PV module frame section 370b in the view of FIG. 24B is spaced from an adjacent-most portion of the outer perimeter of the inner annular projection 238 of the mounting plate 230 (although the clamp 420 could be configured such that end wall 374 of the left PV module frame section 370b in the view of FIG. 24B would also engage an adjacent-most portion of the outer perimeter of the inner annular projection 238), while the end wall 374 of the right PV module frame section 370b in the view of FIG. 24B is spaced from an adjacent-most portion of the outer perimeter of the inner annular projection 238 of the mounting plate 230 (although the clamp 420 could be configured such that end wall 374 of the right PV module frame section 370b in the view of FIG. 24B would also engage an adjacent-most portion of the outer perimeter of the inner annular projection 238). Larger spacing exists between the underside of the upper wall 430 and the second end 290 of the stanchion 280 (i.e., compare FIG. 24B with FIG. 23B). In addition, opposing portions of the sidewall 296 of the stanchion 280 engage the inner surface 450 of the first wall 446 of the clamp 420 and the inner surface 456 of the second wall 452 of the clamp 420, facilitated by having the sidewall 296 being a cylindrical surface. There is contact (e.g., along a line) between the sidewall 296 of the stanchion 280 and the inner surface 450 of the first wall 446 of the clamp 420. There is also opposing contact (e.g., along a line) between the sidewall 296 of the stanchion 280 and the inner surface 456 of the second wall 452 of the clamp 420. This provides support for the corresponding PV module(s). The engagement between the stanchion 280 and the clamp 420 should reduce the chance of the corresponding PV modules "tilting" relative to the underlying building surface when compressing the pair of PV module frame sections 370b between the clamp 420 and the mounting plate 230 as described. The engagement between the stanchion 280 and the clamp 420 should also reduce the chance of a PV module "tilting" relative to the underlying building surface when only a single PV module frame section 370b is disposed on the upper surface 232 of the mounting plate 230 and when compressing this single PV module frame section 370b between the clamp 420 (either the clamping section 440a or the clamping section 440b) and the mounting plate 230 as described.

A variation of the mounting assembly 200d of FIGS. 21-24B is illustrated in FIGS. 25A-25D and is identified by reference numeral 200e. Corresponding components between the embodiment of FIGS. 21-24B and the embodiment of FIGS. 25A-25D are identified by the same reference numerals, and the corresponding discussion presented above remains equally applicable unless otherwise noted to the contrary. Those components from the embodiment of FIGS. 25A-25D that differ in at least some respect from a corresponding component of the embodiment of FIGS. 21-24B use the same reference numeral in combination with a further identifier. Notwithstanding the discussion of differences that may exist between a component of the embodiment of FIGS. 25A-25D and its corresponding component in the embodiment of FIGS. 21-24B, the remainder of the discussion of this corresponding component from the embodiment of FIGS. 21-24B will remain equally applicable to the embodiment of FIGS. 25A-25D unless otherwise noted to the contrary.

The mounting assembly 200e of FIGS. 25A-25D utilizes the stanchion 280b (e.g., FIGS. 18A-18D), although the mounting assembly 200e of FIGS. 25A-25D could instead use the stanchion 280 (e.g., FIGS. 11-17B; FIGS. 21-24B). The mounting assembly 200e of FIGS. 25A-25D also utilizes the clamping fastener 310b (e.g., FIGS. 18A-18D), although the mounting assembly 200e of FIGS. 25A-25D could instead use the clamping fastener 310 (e.g., FIGS. 11-17B FIGS. 21-24B) in which case the clamp 420a could also utilize a countersink 434 for receiving the head 312 of such a clamping fastener 310. In any case, a hole extends completely through the clamp 420a to accommodate the passage of the threaded shaft 316 through the upper wall 430 of the clamp 420a and preferably without there being a threaded engagement between the clamping fastener 310b and the clamp 420a.

The primary distinction between the mounting assembly 200e of FIGS. 25A-25D and the mounting assembly 200d of FIGS. 21-24B is the configuration of the clamp 420a. However, the clamp 420a for the mounting assembly 200e still accommodates simultaneously engaging a pair of adjacently disposed photovoltaic modules in a photovoltaic module array (e.g., photovoltaic module array 54 shown in FIG. 2) of any appropriate size and/or configuration, where rows of photovoltaic modules are typically disposed perpendicular to the pitch of a sloped roofing surface and where columns of photovoltaic modules are typically disposed along the pitch of such a sloped roofing surface. As such, the clamp 420a may be characterized as a "mid grab" (e.g., by being disposed between and/or engaging an adjacent pair of photovoltaic modules). However, the mounting assembly 200e could also be used to engage a single photovoltaic module. For instance, the configuration of the mounting assembly 200e allows the same to be used to engage a single photovoltaic module that is disposed along an edge of the photovoltaic module array (e.g., an "edge grab" application).

The clamp 420a for the mounting assembly 200e of FIGS. 25A-25D includes a first wall 446' and a second wall 452' that are each of a different configuration compared to the clamp 420 of the mounting assembly 200d. As the configuration of the first wall 446' has changed, its outer surface is identified by reference numeral 448' and its inner surface is identified by reference numeral 450'. As the configuration of the second wall 452' has changed, its outer surface is identified by reference numeral 454' and its inner surface is identified by reference numeral 456'. With the configurations of the first wall 446' and the second wall 452' being different for the mounting assembly 200e compared to the mounting assembly 200d, the stanchion receptacle is identified by reference numeral 428a for the case of the mounting assembly 200e. A reference plane 274 is disposed in the stanchion receptacle 428a and is located between the walls 446', 452'. The reference plane 274 may be characterized as being oriented so as to be parallel to both at least part of the inner surface 450' of the first wall 446' and at least part of the inner surface 456' of the second wall 452'. The reference plane 274 may also bisect the hole 250 through the mounting plate 230.

There are three sections that collectively define the first wall 446' for the mounting assembly 200e—an upper section 446a, an intermediate section 446b, and a lower section 446c—and these sections 446a, 446b, and 446c are of a common wall thickness and with the first wall 446' having a free end 447'. The upper section 446a and the lower section 446c may be characterized as being disposed in parallel relation to one another and to the reference plane 274, with the intermediate section 446b being disposed in a different orientation (relative to both the upper section 446a and the lower section 446c) and extending from the upper section 446a to the lower section 446c at least generally in the direction of the reference plane 274.

There are three sections that collectively define the second wall 452' for the mounting assembly 200e—an upper section 452a, an intermediate section 452b, and a lower section 452c—and these sections 452a, 452b, and 452c are of a common wall thickness and with the second wall 452' having a free end 453'. The upper section 452a and the lower section 452c may be characterized as being disposed in parallel relation to one another and to the reference plane 274, with the intermediate section 452b being disposed in a different orientation (relative to both the upper section 452a and the lower section 452c) and extending from the upper section 452a to the lower section 452c at least generally in the direction of the reference plane 274.

A first spacing exists between the inner surface 450' of the upper section 446a and the reference plane 274 and a second spacing exists between the inner surface 450' of the lower section 446c and the reference plane 274, with the first spacing being larger than the second spacing. Stated another way, the inner surface 450' of the upper section 446a is further from the reference plane 274 (and from the inner surface 456' of the second wall 452') than the inner surface 450' of the lower section 446c. Stated yet another way, the inner surface 450' of the lower section 446c is closer to the reference plane 274 (and to the inner surface 456' of the second wall 452') than the inner surface 450' of the upper section 446a.

A third spacing exists between the outer surface 448' of the upper section 446a and the reference plane 274 and a fourth spacing exists between the outer surface 448' of the lower section 446c and the reference plane 274, with the third spacing being larger than the fourth spacing. Stated another way, the outer surface 448' of the upper section 446a is further from the reference plane 274 (and from the inner surface 456' of the second wall 452') than the outer surface 448' of the lower section 446c. Stated yet another way, the outer surface 448' of the lower section 446c is closer to the reference plane 274 (and to the inner surface 456' of the second wall 452') than the outer surface 448' of the upper section 446a.

A fifth spacing exists between the inner surface 456' of the upper section 452a and the reference plane 274 and a sixth spacing exists between the inner surface 456' of the lower section 452c and the reference plane 274, with the fifth spacing being larger than the sixth spacing. Stated another way, the inner surface 456' of the upper section 452a is further from the reference plane 274 (and from the inner surface 450' of the first wall 446') than the inner surface 456' of the lower section 452c. Stated yet another way, the inner surface 456' of the lower section 452c is closer to the reference plane 274 (and to the inner surface 450' of the first wall 446') than the inner surface 456' of the upper section 452a.

A seventh spacing exists between the outer surface 454' of the upper section 452a and the reference plane 274 and an eighth spacing exists between the outer surface 454' of the lower section 452c and the reference plane 274, with the seventh spacing being larger than the eighth spacing. Stated another way, the outer surface 454' of the upper section 452a is further from the reference plane 274 (and from the inner surface 450' of the first wall 446') than the outer surface 454' of the lower section 452c. Stated yet another way, the outer surface 454' of the lower section 452c is closer to the reference plane 274 (and to the inner surface 450' of the first wall 446') than the outer surface 454' of the upper section 452a.

The first wall 446' and the second wall 452' are the mirror image of each other in the case of the mounting assembly 200e. As such: 1) the first spacing between the inner surface 450' of the upper section 446a and the reference plane 274 may be of the same magnitude as the fifth spacing between the inner surface 456' of the upper section 452a and the reference plane 274; 2) the second spacing between the inner surface 450' of the lower section 446c and the reference plane 274 may be of the same magnitude as the sixth spacing between the inner surface 456' of the lower section 452c and the reference plane 274; 3) the third spacing between the outer surface 448' of the upper section 446a and the reference plane 274 may be of the same magnitude as the seventh spacing between the outer surface 454' of the upper section 452a and the reference plane 274; and 4) the fourth spacing between the outer surface 448' of the lower section 446c and the reference plane 274 may be of the same magnitude as the eighth spacing between the outer surface 454' of the lower section 452c and the reference plane 274.

The outer surface 448' of the upper section 446a of the first wall 446' and the outer perimeter of the inner annular projection 238 on the upper surface 232 of the mounting plate 230 are disposed the same distance from the reference plane 274. Similarly, the outer surface 454' of the upper section 452a of the second wall 452' and the outer perimeter of the inner annular projection 238 on the upper surface 232 of the mounting plate 230 are disposed the same distance from the reference plane 274. As such and when a PV module frame section is engaged by the clamping section 440a of the mounting assembly 200e (where this photovoltaic module (e.g., its frame section) is positioned on both the upper surface of one or more of the ribs 254 and the upper surface of part of the outer annular projection 252 on the upper surface 232 of the mounting plate 230 (the photovoltaic module is not positioned on an upper surface of the inner annular projection 238 of the mounting plate 230)): 1) the lower surface 444 of the clamping section 440a will engage the upper wall of this PV module frame section (e.g., upper wall 372); 2) the outer surface 448' of the upper section 446a for the first wall 446' will engage an upper part of an end wall of this same PV module frame section (e.g., end wall 374); 3) a lower part of the end wall of this PV module frame section (e.g., end wall 374) will engage the adjacent-most portion of the outer perimeter of the inner annular projection 238 for the mounting plate 230; 4) this PV module frame section will be clamped between the upper surface 232 of the mounting plate 230 and the clamping section 440a of the clamp 420a by rotating the clamping fastener 310b to advance the clamp 420a toward the mounting plate 230 and relative to the stanchion 280b; and 5) the inner surface 450' of at least part of the lower section 446c of the first wall 446' and the inner surface 456' of at least part of the lower section 452c of the second wall 452' will engage opposing portions of the sidewall 296 of the stanchion 280b.

When a PV module frame section is engaged by the clamping section 440b of the mounting assembly 200e (where this photovoltaic module (e.g., its frame section) is positioned on both the upper surface of one or more of the ribs 254 and the upper surface of part of the outer annular projection 252 on the upper surface 232 of the mounting plate 230 (the photovoltaic module is not positioned on an upper surface of the inner annular projection 238 of the mounting plate 230): 1) the lower surface 444 of the clamping section 440b will engage the upper wall of this PV module frame section (e.g., upper wall 372); 2) the outer surface 454' of the upper section 452a for the second wall 452' will engage an upper part of an end wall of this PV module frame section (e.g., end wall 374); 3) a lower part of the end wall of this PV module frame section (e.g., end wall 374) will engage the adjacent-most portion of the outer perimeter of the inner annular projection 238 for the mounting plate 230; 4) the PV module frame section will be clamped between the upper surface 232 of the mounting plate 230 and the clamping section 440b of the clamp 420a by the rotating clamping fastener 310b advancing the clamp 420a toward the mounting plate 230 and relative to the stanchion 280b; and 5) the inner surface 450' of at least part of the lower section 446c of the first wall 446' and the inner surface 456' of at least part of the lower section 452c of the second wall 452' will engage opposing portions of the sidewall 296 of the stanchion 280b.

The clamping fastener 310b, the clamp 420a, and the stanchion 280b may be assembled prior to securing the stanchion 280b to the mounting device 210 (not shown in FIGS. 25A-25D, but a part of the mounting assembly 200e). A temporary bond may be used to secure the clamping fastener 310b to the stanchion 280b so that rotation of the clamping fastener 310b causes rotation of the stanchion 280b, thus causing the stanchion 280b to threadably engage the mounting device 210. Thereafter one or two PV module frame sections may be clamped between the clamp 420a and the mounting plate 230 in the same general manner as the embodiment of FIGS. 21-24B. The mounting assembly 200e also accommodates a range of PV module frame section heights or thicknesses based upon varying the position of the clamp 420a along/relative to the stanchion 280b and where at least part of the lower section 446c of the first wall 446' and where at least part of the lower section 452c of the second wall 452' will remain engaged with opposing portions of the sidewall 296 of the stanchion 280b in each of these different positions.

A variation of the mounting assembly 200d of FIGS. 21-24B is illustrated in FIGS. 26A-26C and is identified by reference numeral 200f. Corresponding components between the embodiment of FIGS. 21-24B and the embodiment of FIGS. 26A-26C are identified by the same reference numerals, and the corresponding discussion presented above remains equally applicable unless otherwise noted to the contrary. Those components from the embodiment of FIGS. 26A-26C that differ in at least some respect from a corresponding component of the embodiment of FIGS. 21-24B use the same reference numeral in combination with a further identifier. Notwithstanding the discussion of differences that may exist between a component of the embodiment of FIGS. 26A-26C and its corresponding component in the embodiment of FIGS. 21-24B, the remainder of the discussion of this corresponding component from the embodiment of FIGS. 21-24B will remain equally applicable to the embodiment of FIGS. 26A-26C unless otherwise noted to the contrary.

The mounting assembly 200e of FIGS. 26A-26C uses the clamping fastener 310, mounting plate 230, and mounting device 210 at least from the mounting assembly 200d of FIGS. 21-24B, as well as the stanchion 280c from the mounting assembly 200c of FIGS. 19A-20B. The mounting assembly 200f uses a different clamp 480 compared to the mounting assembly 200d (FIGS. 21-24B). This clamp 480 for the mounting assembly 200f may be viewed as a variation of the clamp 380 for the mounting assembly 200c (FIGS. 19A-20B). In any case, the clamp 480 accommodates simultaneously engaging a pair of adjacently disposed photovoltaic modules in a photovoltaic module array (e.g., photovoltaic module array 54 shown in FIG. 2) of any appropriate size and/or configuration, where rows of photovoltaic modules are typically disposed perpendicular to the pitch of a sloped roofing surface and where columns of photovoltaic modules are typically disposed along the pitch of such a sloped roofing surface. As such, the clamp 480 may be characterized as a "mid grab" (e.g., by being disposed between and/or engaging an adjacent pair of photovoltaic modules). However, the mounting assembly 200f could also be used to engage a single photovoltaic module. For instance, the configuration of the mounting assembly 200f allows the same to be used to engage a single photovoltaic module that is disposed along an edge of the photovoltaic module array (e.g., an "edge grab" application).

The clamp 480 includes an upper wall 482 and an oppositely disposed bottom wall 488 that each extend between a pair of ends 498 for the clamp 480. The upper wall 482 includes a countersink 486, with this countersink 486 and a fastener aperture 484 collectively extending between the upper wall 482 and the bottom wall 488. Preferably the fastener aperture 484 of the clamp 480 is un-threaded such that the clamping fastener 310 is not threadably engaged with the clamp 480 (e.g., rotation of the clamping fastener 310 about rotational axis 272 should not rotate the clamp 480; the clamp 480 may remain in a stationary position while the clamping fastener 310 is rotated relative to the clamp 480 about the rotational axis 272).

Other components of the clamp 480 include a pair of rail walls 490a, 490b and a corresponding pair of clamping sections 492a, 492b that are spaced from one another on opposite sides of the clamp 480 and that each extend between the ends 498. The clamping sections 492a, 492b each may be characterized as a portion of the upper wall 482 that extends beyond the corresponding rail wall 490a, 490b. In any case, each of the clamping sections 492a, 492b includes an upper surface 494 and a lower surface 496, with the lower surface 496 including serrations or the like for engaging a photovoltaic module and with the lower surface 496 being disposed at least generally orthogonal or perpendicular to the corresponding rail wall 490a, 490b. The upper surface 494 of each clamping section 492a, 492b is sloped, converging at least generally in the direction of the corresponding lower surface 496 in proceeding toward a free side portion of the corresponding clamping section 492a, 492b.

The clamping fastener 310, the clamp 480, and the stanchion 280c may be assembled prior to securing the stanchion 280c to the mounting device 210 (e.g., using a temporary bond between the clamping fastener 310 and the stanchion 280c) and thereafter clamping a PV module frame section between the clamp 480 and the mounting plate 230c as described. The mounting assembly 200c also accommodates a range of PV module frame section heights or thicknesses through varying the position of the clamp 480 relative to the stanchion 280c. FIG. 26B illustrates use of the mounting assembly 200f to secure a pair of photovoltaic module frame sections 370. Generally: 1) the stanchion 280c is appropriately secured to the mounting device 210 as described; 2) the two PV module frame sections 370 are clamped between the clamp 480 and the mounting plate 230 by rotating the clamping fastener 310 to advance the clamp 480 toward the mounting plate 230c and relative to the stanchion 280c; 3) the lower surface 496 of the clamping section 492a for the clamp 480 engages the upper wall 372 of the left PV module frame section 370 in the view of FIG. 26B; 4) the rail wall 490a of the clamp 480 engages one part of the end wall 374 for the left PV module frame section 370 in the view of FIG. 26B; 5) the outer perimeter of the rail flange 302 of the stanchion 280c engages a different part of the end wall 374 for the left PV module frame section 370 in the view of FIG. 26B and that is spaced from where the rail wall 490a of the clamp 480 engages this same end wall 374; 6) the lower surface 496 of the clamping section 492b for the clamp 480 engages the upper wall 372 of the right PV module frame section 370 in the view of FIG. 26B; 4) the rail wall 490b of the clamp 480 engages one part of the end wall 374 for right PV module frame section 370 in the view of FIG. 26B; 7) the outer perimeter of the rail flange 302 of the stanchion 280c engages a different part of the end wall 374 for the right PV module frame section 370 in the view of FIG. 26B and that is spaced from where the rail wall 490b of the clamp 480 engages this same end wall 374; and 8) the end wall 374 of the left PV module frame section 370 in the view of FIG. 26B is disposed adjacent to/engages an adjacent-most portion of an outer perimeter of the inner annular projection 238 of the mounting plate 230, while the end wall 374 of the right PV module frame section 370 in the view of FIG. 26B is disposed adjacent to/engages an adjacent-most portion of an outer perimeter of the inner annular projection 238 of the mounting plate 230.

Embodiments of the present disclosure include a mounting assembly, comprising: a mounting device attachable to a building surface; a stanchion removably attached to the mounting device; a clamp comprising at least one clamping section and a stanchion receptacle, wherein the clamp is removably positioned on the stanchion with the stanchion extending into the stanchion receptacle, and wherein the at least one clamping section is adapted to engage a perimeter portion of a photovoltaic module; and a clamping fastener that extends through the clamp and into detachable engagement with the stanchion.

Aspects of the foregoing embodiment include: wherein the mounting device comprises a slot configured to receive a protrusion of the building surface in an installed configuration; wherein the mounting device is detachably engaged with the building surface in an installed configuration; wherein the stanchion comprises a first threaded shaft and the mounting device comprises a first threaded aperture, wherein the first threaded shaft of the stanchion extends within and is engaged with the first threaded aperture of the mounting device; and wherein a free end of the first threaded shaft defines a first end of the stanchion, wherein the stanchion comprises a second end oppositely disposed from the first end along a length dimension of the stanchion, and wherein the clamping fastener is detachably engaged with the second end of the stanchion; wherein the second end of the stanchion comprises a second threaded aperture, and wherein the clamping fastener comprises a second threaded shaft that extends into and is engaged with the second threaded aperture of the stanchion; wherein the second threaded shaft of the clamping fastener is bonded to the stanchion.

Aspects of the foregoing embodiment also include: wherein the clamping fastener and the stanchion collectively define a first assembly that is disposable in each of first and second configurations, the first configuration comprising the clamping fastener and the stanchion being in a bonded state such that the clamping fastener and the stanchion collectively rotate to removably attach the stanchion to the mounting device, the second configuration comprising the clamping fastener and the stanchion being in an un-bonded state such that the clamping fastener rotates relative to the stanchion to advance the clamp along the stanchion; wherein an entirety of an outer perimeter wall of the stanchion that is disposed within the stanchion receptacle of the clamp is un-threaded; wherein the clamp comprises an upper wall and a pair of clamp walls that cantilever from the upper wall, that are spaced from one another in a first dimension, and that define at least a portion of the stanchion receptacle, and wherein the stanchion comprises a first stanchion section that extends into a space between the pair of clamp walls and that engages each clamp wall of the pair clamp walls within the stanchion receptacle.

Aspects of the foregoing embodiment also include: wherein each the clamp wall of the pair extends from the upper wall in a direction that the mounting device is spaced from the clamp; wherein the first stanchion section comprises a cylindrical sidewall that defines an outer perimeter of the first stanchion section; wherein the stanchion comprises a second stanchion section having first and second flat surfaces disposed in opposing relation on a perimeter of the second stanchion section; wherein the second stanchion section is located between the first stanchion section and the mounting device; wherein the first stanchion section comprises a plurality of flat, intersecting surfaces that collectively define an outer perimeter of the first stanchion section; wherein an exterior of the first stanchion section is un-threaded; wherein a portion of the upper wall that extends beyond an adjacent the clamp wall in the first dimension comprises the at least one clamping section; wherein the clamp further comprises an upper wall and first and second walls that cantilever from the upper wall, that are spaced from one another in a first dimension, and that define at least a portion of the stanchion receptacle, wherein the stanchion comprises an upper end section that extends into a space between the first and second walls and engages each of the first and second walls within the stanchion receptacle; wherein each of the first and second walls extends from the upper wall in a direction that the mounting device is spaced from the clamp; wherein a portion of the upper wall that extends away from an outer surface of the first wall in the first dimension comprises the at least one clamping section; and wherein an entirety of an inner surface of the first wall that faces the second wall is flat, and wherein an entirety of an inner surface of the second wall that faces the inner surface of the first wall is also flat.

Aspects of the foregoing embodiment also include: wherein the inner surface of the first wall and the inner surface of the second wall face and are disposed parallel to one another; wherein the at least one clamping section comprises a single clamping section, wherein the single clamping section extends from the first wall within the first dimension in a direction that is away from the second wall; wherein an outer surface of the second wall comprises a channel; wherein the at least one clamping section comprises a first and second clamping sections, wherein the first clamping section extends from the first wall within the first dimension in a direction that is away from the second wall, and wherein the second clamping section extends from the second wall within the first dimension in a direction that is away from the first wall; wherein an inner surface of a lower section of the first wall is flat and is located opposite of and parallel to a flat portion of an inner surface of the second wall.

Aspects of the foregoing embodiment also include: wherein an inner surface of an upper section of the first wall is spaced further from a corresponding portion of the inner surface of the second wall compared to the lower section of the first wall and its corresponding portion of the inner surface of the second wall; and wherein an entirety of the inner surface of the second wall that faces the first wall is flat; wherein the first wall comprises an upper section and a lower section, wherein the first wall comprises a first inner surface, wherein the second wall comprises a second inner surface, wherein the first and second inner surfaces face each other, wherein a reference plane is disposed between the first and second walls and is parallel to at least part of the first inner surface and at least part of the second inner surface, wherein a spacing of the first inner surface of the upper section of the first wall from the reference plane is greater than a spacing of the first inner surface of the lower section of the first wall from the reference plane.

Aspects of the foregoing embodiment also include: wherein the first inner surface of the upper section of the first wall is parallel to the first inner surface of the lower section of the first wall; wherein an entirety of the second inner surface of the second wall is flat; wherein the at least one clamping section comprises a single clamping section that protrudes from a first outer surface of the first wall; wherein the second wall comprises a second outer surface, which in turn comprises a channel; wherein the second wall comprises an upper section and a lower section, wherein a spacing of the second inner surface of the upper section of the second wall from the reference plane is greater than a spacing of the second inner surface of the lower section of the second wall from the reference plane; wherein the first inner surface of the upper section of the first wall is parallel to the first inner surface of the lower section of the first wall, and wherein the second inner surface of the upper section of the second wall is parallel to the second inner surface of the lower section of the second wall; and wherein the first inner surface of the upper section of the first wall, the first inner surface of the lower section of the first wall, and the second inner surface of the upper section of the second wall, and the second inner surface of the lower section of the second wall are all parallel to one another.

Aspects of the foregoing embodiment also include: wherein the first inner surface of the upper section of the first wall and the second inner surface of the upper section of the second wall are disposed in opposing relation, and the first inner surface of the lower section of the first wall and the second inner surface of the lower section of the second wall are disposed in opposing relation; wherein the first and second walls are the mirror image of one another; wherein the at least one clamping section comprises first and second clamping sections, wherein the first clamping section comprises a first portion of the upper wall that extends away from an outer surface of the first wall in the first dimension, and wherein the second clamping section comprises a second portion of the upper wall that extends away from an outer surface of the second wall in the first dimension; and wherein the at least one clamping section comprises a single clamping section that protrudes from a first side of the clamp; wherein an outer surface of a second side of the clamp comprises a channel.

Aspects of the foregoing embodiment also include: a building surface and a plurality of photovoltaic modules, wherein the mounting device is attached to the building surface, wherein the clamp engages only a single photovoltaic module in the form of a first photovoltaic module, wherein the single clamping section exerts a force on the first photovoltaic module in a direction of an underlying portion of the building surface, wherein the first photovoltaic module is on an edge of an array defined by the plurality of photovoltaic modules; wherein the at least one clamping section comprises first and second clamping sections that protrude from first and second sides, respectively, of the clamp.

Aspects of the foregoing embodiment also include: a building surface and a plurality of photovoltaic modules, wherein the mounting device is attached to the building surface, wherein the clamp engages only a single photovoltaic module in the form of a first photovoltaic module, wherein the first clamping section exerts a force on the first photovoltaic module in a direction of an underlying portion of the building surface, wherein the first photovoltaic module is on an edge of an array defined by the plurality of photovoltaic modules, and wherein the second clamping section fails to engage any photovoltaic module.

Aspects of the foregoing embodiment also include: a building surface and an array comprising first and second photovoltaic modules, wherein the mounting device is attached to the building surface, wherein the first clamping section engages and exerts a force on the first photovoltaic module in a direction of an underlying portion of the building surface, wherein the second clamping section engages and exerts a force on the second photovoltaic module in a direction of an underlying portion of the building surface, and wherein the stanchion is located between the first and second photovoltaic modules.

Aspects of the foregoing embodiment also include: further comprising a disk positioned on the mounting device, wherein the stanchion extends through the disk and is removably attached to the mounting device; wherein a perimeter of the disk is larger than a perimeter of a surface of the mounting device on which the disk is positioned; wherein an upper surface of the disk comprises a first raised section having an effective inner diameter and an effective outer diameter, wherein the upper surface further comprises a base within the effective inner diameter of the first raised section, wherein the base is recessed relative to an uppermost portion of the raised section, and wherein an end portion the stanchion extends through the base and engages the mounting device; wherein the end portion of the stanchion is threaded and engages the mounting device; wherein the first raised section is annular; wherein the first raised section comprises a closed perimeter that extends completely about the wall; wherein the upper surface of the disk comprises a second raised section having an effective inner diameter, wherein the second raised section is positioned radially outward of the first raised section, wherein the upper surface of the disk further comprises a plurality of ribs that are spaced from one another and that each extend between the first raised section and the second raised section.

Aspects of the foregoing embodiment also include: wherein the second raised section is annular; wherein the second raised section comprises a closed perimeter that extends completely about the first raised section; and wherein the upper surface further comprises a plurality of electrical bonding projections, wherein each the electrical bonding projection is disposed between an adjacent pair of ribs of the plurality of ribs, and wherein each the electrical bonding projection protrudes beyond an uppermost portion of each rib of its corresponding the adjacent pair of ribs.

Embodiments of the present disclosure also include a mounting assembly, comprising: a mounting device attachable to a building surface and comprising an upper surface, wherein the upper surface comprises a first threaded hole; a standoff comprising first and second ends that are spaced from one another along a length dimension of the standoff, the second end comprising a second threaded hole, the standoff further comprising a body and a first threaded shaft that extends from the body to the first end of the standoff, wherein the first threaded shaft of the standoff interfaces with the first threaded hole of the mounting device such that the second end of the standoff and the upper surface of the mounting device are spaced from one another; a clamp that is spaced above the mounting device and that comprises at least one clamping section, wherein the at least one clamping section is adapted to engage a perimeter portion of a photovoltaic module; and a clamping fastener comprising a head and a second threaded shaft, wherein the clamp is disposed between the head and the standoff, and wherein the second threaded shaft extends through the clamp to threadably interface with the second threaded hole on the second end of the standoff.

Aspects of the foregoing embodiment include: wherein the mounting device comprises a slot configured to receive a protrusion of the building surface in an installed configuration; wherein the mounting device is detachably engaged with the building surface in an installed configuration; wherein the clamping fastener is not threadably engaged with the clamp such that the clamping fastener is able to rotate relative to the clamp; wherein an entirety of the clamp is positioned above the second end of the standoff at all times; wherein the clamp comprises a first rail wall, wherein the at least one clamping section comprises a first clamping section, wherein the first clamping section comprises a lower surface that extends from and is perpendicular to the first rail wall, wherein the standoff further comprises a rail flange, wherein the first rail wall and a perimeter of the rail flange are spaced a common distance from a rotational axis of the clamping fastener.

Aspects of the foregoing embodiment also include: a building surface and a plurality of photovoltaic modules, wherein the mounting device is attached to the building surface, wherein the clamp engages only a single one of the plurality of photovoltaic modules in the form of a first photovoltaic module, wherein the first clamping section exerts a force on the first photovoltaic module in a direction of an underlying portion of the building surface, and wherein the first photovoltaic module is on an edge of an array defined by the plurality of photovoltaic modules; wherein the first photovoltaic module comprises a PV module frame section that in turn comprises an upper wall and an end wall, wherein the lower surface of the first clamping section engages the upper wall of the PV module frame section, wherein the first rail wall engages the end wall of the PV module frame section at a first location, and wherein a first portion on the perimeter of the first rail flange engages the end wall of the PV module frame section at a second location that is spaced from the first location in a dimension corresponding with a spacing between the clamp and the mounting device; wherein the clamp comprises first and second rail walls on first and second sides, respectively, of the clamp, wherein the at least one clamping section comprises a first and second clamping sections on the first and second sides, respectively, of the clamp, wherein the first clamping section comprises a lower surface that extends from and is perpendicular to the first rail wall, wherein the second clamping section comprises a lower surface that extends from and is perpendicular to the second rail wall, wherein the standoff further comprises a rail flange, wherein the first rail wall, the second rail wall, and a perimeter of the rail flange are spaced a common distance from a rotational axis of the clamping fastener; and wherein the first and second rail walls are oppositely disposed and parallel to one another.

Aspects of the foregoing embodiment also include: a building surface and first and second photovoltaic modules, wherein the mounting device is attached to the building surface, wherein the standoff is positioned between the first photovoltaic module and the second photovoltaic module, wherein the first clamping section exerts a force on the first photovoltaic module in a direction of an underlying portion of the building surface, and wherein the second clamping section exerts a force on the second photovoltaic module in a direction of an underlying portion of the building surface; wherein the first photovoltaic module comprises a first PV module frame section that in turn comprises a first upper wall and a first end wall, wherein the second photovoltaic module comprises a second PV module frame section that in turn comprises a second upper wall and a second end wall, wherein the lower surface of the first clamping section engages the first upper wall of the first PV module frame section, wherein the first rail wall engages the first end wall of the first PV module frame section at a first location, wherein a first portion on the perimeter of the first rail flange engages the first end wall of the first PV module frame section at a second location that is spaced from the first location in a first dimension corresponding with a spacing between the clamp and the mounting device, wherein the lower surface of the second clamping section engages the second upper wall of the second PV module frame section, wherein the second rail wall engages the second end wall of the first PV module frame section at a third location, and wherein a second portion on the perimeter of the first rail flange engages the second end wall of the second PV module frame section at a fourth location that is spaced from the third location in the first dimension.

Aspects of the foregoing embodiment also include: wherein the clamp further comprises a standoff receptacle, wherein the clamp is removably positioned on the standoff with the standoff extending into the standoff receptacle;

wherein the second threaded shaft of the clamping fastener is bonded to the standoff; wherein the clamping fastener and the standoff collectively define a first assembly that is disposable in each of first and second configurations, the first configuration comprising the clamping fastener and the standoff being in a bonded state such that the clamping fastener and the stanchion collectively rotate to engage the first threaded shaft of the standoff to first threaded hole of the mounting device, the second configuration comprising the clamping fastener and the standoff being in an un-bonded state such that the clamping fastener rotates relative to the standoff to advance the clamp along the standoff.

Aspects of the foregoing embodiment also include: wherein the clamp comprises an upper wall and a pair of clamp walls that cantilever from the upper wall, that are spaced from one another in a first dimension, and that define at least a portion of the standoff receptacle, wherein the standoff comprises a first standoff section that extends into a space between the pair of clamp walls and that engages each clamp wall of the pair clamp walls within the standoff receptacle; wherein each the clamp wall of the pair extends from the upper wall in a direction that the mounting device is spaced from the clamp; wherein the first standoff section comprises a cylindrical sidewall that defines an outer perimeter of the first standoff section; wherein the standoff comprises a second standoff section having first and second flat surfaces disposed in opposing relation on a perimeter of the second standoff section; wherein the second standoff section is located between the first standoff section and the mounting device; wherein the first standoff section comprises a plurality of flat, intersecting surfaces that collectively define an outer perimeter of the first standoff section; wherein an exterior of the first standoff section is un-threaded; wherein a portion of the upper wall that extends beyond an adjacent the clamp wall in the first dimension comprises the at least one clamping section; wherein the clamp further comprises an upper wall and first and second walls that cantilever from the upper wall, that are spaced from one another in a first dimension, and that define at least a portion of the standoff receptacle, wherein the standoff comprises an upper end section that extends into a space between the first and second walls and engages each of the first and second walls within the standoff receptacle.

Aspects of the foregoing embodiment also include: wherein each of the first and second walls extends from the upper wall in a direction that the mounting device is spaced from the clamp; wherein a portion of the upper wall that extends away from an outer surface of the first wall in the first dimension comprises the at least one clamping section; wherein an entirety of an inner surface of the first wall that faces the second wall is flat, and wherein an entirety of an inner surface of the second wall that faces the inner surface of the first wall is also flat; wherein the inner surface of the first wall and the inner surface of the second wall face and are disposed parallel to one another; wherein the at least one clamping section comprises a single clamping section, wherein the single clamping section extends from the first wall within the first dimension in a direction that is away from the second wall; wherein an outer surface of the second wall comprises a channel; wherein the at least one clamping section comprises a first and second clamping sections, wherein the first clamping section extends from the first wall within the first dimension in a direction that is away from the second wall, and wherein the second clamping section extends from the second wall within the first dimension in a direction that is away from the first wall.

Aspects of the foregoing embodiment also include: wherein the first wall comprises an upper section and a lower section, wherein the first wall comprises a first inner surface, wherein the second wall comprises a second inner surface, wherein the first and second inner surfaces face each other, wherein a reference plane is disposed between the first and second walls and is parallel to at least part of the first inner surface and at least part of the second inner surface, wherein a spacing of the first inner surface of the upper section of the first wall from the reference plane is greater than a spacing of the first inner surface of the lower section of the first wall from the reference plane; wherein the first inner surface of the upper section of the first wall is parallel to the first inner surface of the lower section of the first wall; wherein an entirety of the second inner surface of the second wall is flat; wherein the at least one clamping section comprises a single clamping section that protrudes from a first outer surface of the first wall; wherein the second wall comprises a second outer surface, which in turn comprises a channel; wherein the second wall comprises an upper section and a lower section, wherein a spacing of the second inner surface of the upper section of the second wall from the reference plane is greater than a spacing of the second inner surface of the lower section of the second wall from the reference plane.

Aspects of the foregoing embodiment also include: wherein the first inner surface of the upper section of the first wall is parallel to the first inner surface of the lower section of the first wall, and wherein the second inner surface of the upper section of the second wall is parallel to the second inner surface of the lower section of the second wall; wherein the first inner surface of the upper section of the first wall, the first inner surface of the lower section of the first wall, and the second inner surface of the upper section of the second wall, and the second inner surface of the lower section of the second wall are all parallel to one another; wherein the first inner surface of the upper section of the first wall and the second inner surface of the upper section of the second wall are disposed in opposing relation, and the first inner surface of the lower section of the first wall and the second inner surface of the lower section of the second wall are disposed in opposing relation; wherein the first and second walls are the mirror image of one another; wherein the at least one clamping section comprises first and second clamping sections, wherein the first clamping section comprises a first portion of the upper wall that extends away from an outer surface of the first wall in the first dimension, and wherein the second clamping section comprises a second portion of the upper wall that extends away from an outer surface of the second wall in the first dimension; wherein the at least one clamping section comprises a single clamping section that protrudes from a first side of the clamp; and wherein an outer surface of a second side of the clamp comprises a channel.

Aspects of the foregoing embodiment also include: a building surface and a plurality of photovoltaic modules, wherein the mounting device is attached to the building surface, wherein the clamp engages only a single photovoltaic module in the form of a first photovoltaic module, wherein the single clamping section exerts a force on the first photovoltaic module in a direction of an underlying portion of the building surface, wherein the first photovoltaic module is on an edge of an array defined by the plurality of photovoltaic modules; wherein the at least one clamping section comprises first and second clamping sections that protrude from first and second sides, respectively, of the clamp.

Aspects of the foregoing embodiment also include: a building surface and a plurality of photovoltaic modules, wherein the mounting device is attached to the building surface, wherein the clamp engages only a single photovoltaic module in the form of a first photovoltaic module, wherein the first clamping section exerts a force on the first photovoltaic module in a direction of an underlying portion of the building surface, wherein the first photovoltaic module is on an edge of an array defined by the plurality of photovoltaic modules, and wherein the second clamping section fails to engage any photovoltaic module.

Aspects of the foregoing embodiment also include: a building surface and an array comprising first and second photovoltaic modules, wherein the mounting device is attached to the building surface, wherein the first clamping section engages and exerts a force on the first photovoltaic module in a direction of an underlying portion of the building surface, wherein the second clamping section engages and exerts a force on the second photovoltaic module in a direction of an underlying portion of the building surface, and wherein the stanchion is located between the first and second photovoltaic modules; further comprising a disk positioned on the upper surface of the mounting device, wherein the first threaded shaft of the standoff extends through the disk; wherein a perimeter of the disk is larger than a perimeter of a surface of the mounting device on which the disk is positioned.

Aspects of the foregoing embodiment also include: wherein an upper surface of the disk comprises a first raised section having an effective inner diameter and an effective outer diameter, wherein the upper surface further comprises a base within the effective inner diameter of the first raised section, wherein the base is recessed relative to an uppermost portion of the raised section, and wherein an end portion the stanchion extends through the base and engages the mounting device; wherein the first raised section is annular; wherein the first raised section comprises a closed perimeter that extends completely about the base; wherein the upper surface of the disk comprises a second raised section having an effective inner diameter, wherein the second raised section is positioned radially outward of the first raised section, wherein the upper surface of the disk further comprises a plurality of ribs that are spaced from one another and that each extend between the first raised section and the second raised section; wherein the second raised section is annular; wherein the second raised section comprises a closed perimeter that extends completely about the first raised section; wherein the upper surface further comprises a plurality of electrical bonding projections, wherein each the electrical bonding projection is disposed between an adjacent pair of ribs of the plurality of ribs, and wherein each the electrical bonding projection protrudes beyond an uppermost portion of each rib of its corresponding the adjacent pair of ribs.

Embodiments of the present disclosure also include a mounting assembly comprising: a clamp comprising: an upper wall comprising a central aperture, a first edge, and a second edge parallel to the first edge; a first sidewall extending from the upper wall proximate and substantially parallel to the first edge, the first sidewall spaced from the first edge to form a first clamping section; and a second sidewall extending from the upper wall proximate and substantially parallel to the second edge, the first and second sidewalls defining a stanchion receptacle; a stanchion comprising a first threaded hole and a first threaded shaft; a mounting plate comprising a central hole, an inner annular projection surrounding the central hole, an outer annular projection surrounding the inner annular projection, and a plurality of ribs extending from the inner annular projection to the outer annular projection; a mounting device comprising a second threaded hole; and a clamping fastener comprising a second threaded shaft; wherein the central aperture and the first threaded hole are configured to receive the second threaded shaft, and the central hole and the second threaded hole are configured to receive the first threaded shaft.

Aspects of the foregoing mounting assembly include: wherein the first sidewall is spaced from the second sidewall by a width of the stanchion, such that each of the two sidewalls contact the stanchion when the stanchion is positioned within the stanchion receptacle; wherein the second sidewall is spaced from the second edge to form a second clamping section; wherein the mounting plate comprises a plurality of bonding points; wherein the inner annular projection has a first height greater than a second height of the outer annular projection; wherein the mounting device further comprises a third threaded hole and a seam fastener removably engaged in the third threaded hole, and further wherein the seam fastener comprises a drive socket having an identical configuration to a drive socket of the clamping fastener; wherein the stanchion further comprises: a body portion from which the first threaded shaft extends; and a beveled portion between the first threaded shaft and the body portion; wherein the mounting plate further comprises a plurality of apertures therein; wherein the inner annular projection surrounds a recessed base; and wherein the first sidewall comprises a first portion proximate the upper wall and a second portion separated from the upper wall by the first portion; the second sidewall comprises a third portion proximate the upper wall and a fourth portion separated from the upper wall by the third portion; and the first portion is separated from the third portion by a first distance greater than a second distance that separates the second portion from the fourth portion.

Embodiments of the present disclosure also include a mounting assembly comprising: a mounting device comprising a planar upper surface having a first threaded aperture therein; a mounting plate adapted to be secured to the planar upper surface of the mounting device, the mounting plate comprising a first central hole; a stanchion comprising an upper body portion and a lower threaded shaft, the lower threaded shaft adapted to pass through the first central hole and engage the threaded aperture, and the upper body portion comprising a second threaded aperture; a clamp comprising: an upper wall with a second central hole therein; and two parallel sidewalls defining a stanchion receptacle, each of the two parallel sidewalls extending downwardly from the upper wall to a free end, wherein a first distance separates a portion of the two parallel sidewalls proximate the upper wall, and a second distance less than the first distance separates the free ends of the two parallel sidewalls; and a clamping fastener configured to extend through the second central hole and threadably engage the second threaded aperture to secure the clamp to the stanchion.

Aspects of the foregoing mounting assembly include: wherein the stanchion further comprises a beveled portion in between the upper body portion and the lower threaded shaft; wherein the mounting plate further comprises a plurality of radially extending ribs; wherein the mounting plate further comprises a plurality of bonding projections, each bonding projection comprising a plurality of spikes and positioned in between adjacent ones of the plurality of radially extending ribs; wherein the mounting plate further comprises an inner annular projection surrounding the first central hole and an outer annular projection surrounding the inner annular projection; wherein the plurality of radially extending ribs extend from the inner annular projection to the outer annular projection; and wherein the inner annular projection has a first height greater than a second height of the outer annular projection; wherein the mounting plate further comprises a plurality of apertures between the outer annular projection and an outer edge of the mounting plate.

Embodiments of the present disclosure also include a mounting assembly comprising: a mounting plate comprising a first aperture, a recessed base surrounding the first aperture and having a first diameter, and an annular projection surrounding the recessed base; a stanchion comprising a threaded shaft configured to extend through the first aperture, a body portion comprising a second aperture, and a beveled portion in between the threaded shaft and the body portion, the body portion having a second diameter less than the first diameter; a clamp comprising: an upper wall with a second aperture in between a first edge and a second edge that is parallel to the first edge; a first sidewall extending downwardly from the upper wall and terminating in a first free end, the first sidewall parallel to the first edge and having a first portion in between the first free end and the upper wall; and a second sidewall extending downwardly from the upper wall and terminating in a second free end, the second sidewall spaced from the first sidewall and parallel to the first edge and having a second portion in between the second free end and the upper wall; wherein the first free end is spaced from the second free end by a first distance substantially equal to the first diameter; and the first portion is spaced from the second portion by a second distance greater than the first distance; and a clamping fastener configured to extend through the second aperture and threadably engage the second aperture to secure the clamp to the stanchion.

Aspects of the foregoing mounting assembly include: wherein the mounting plate further comprises a plurality of bonding projections extending upward, each bonding projection comprising a plurality of spikes.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

For the avoidance of doubt, any of the features described above in connection with one embodiment of a mounting assembly or component thereof described herein may be utilized in connection with another embodiment of a mounting assembly or a corresponding component thereof described herein. As just one, non-limiting example, a grounding projection 172 may be utilized in a mounting assembly 200d instead of or in addition to one or more of the bonding projections 256.

What is claimed is:

1. A mounting system to mount a photovoltaic module to a surface of a building, comprising:
a clamp, comprising:
an upper wall with an aperture, a first surface, and a second surface opposite to the first surface, wherein a medial section of the first surface includes the aperture and defines a first reference plane, and wherein no portion of the clamp intersects the first reference plane;
a first sidewall extending from the upper wall proximate to the second surface; and
a second sidewall extending from the upper wall proximate to the second surface, the first and second sidewalls defining a stanchion receptacle;
a mounting plate with an upper surface and a lower surface;
a stanchion extending from the upper surface of the mounting plate, the stanchion comprising:
a first end spaced from the upper surface of the mounting plate; and
a first threaded hole extending through the first end into the stanchion;
a mounting device comprising a body with:
a top surface to support the lower surface of the mounting plate;
a bottom surface;
a first side surface;
a slot extending into the body through the bottom surface to receive a standing seam extending from the surface of the building; and
a second threaded hole extending through the first side surface to the slot, the second threaded hole configured to receive a seam fastener to engage the standing seam when the standing seam is positioned within the slot; and
a clamping fastener comprising a first threaded shaft;
wherein the aperture of the clamp and the first threaded hole of the stanchion are configured to receive the first threaded shaft of the clamping fastener.

2. The mounting system of claim 1, wherein:
the first sidewall has a first inner surface;
the second sidewall has a second inner surface; and
a portion of the first inner surface is spaced from a portion of the second inner surface by a distance approximately equal to a width of the stanchion such that at least a portion of one of the first and second inner surfaces contacts at least a portion of the stanchion when the stanchion is positioned within the stanchion receptacle.

3. The mounting system of claim 1, wherein:
the second surface of the upper wall defines a second reference plane;
the upper wall extends from a first edge to a second edge, the first and second edges being closer to the second reference plane than to the first reference plane;
the first sidewall extends from the upper wall and is offset from the first edge by a first edge distance to form a first clamping section; and
the second sidewall extends from the upper wall and is offset from the second edge by a second edge distance to form a second clamping section.

4. The mounting system of claim 1, wherein:
the mounting plate comprises a hole extending through the upper and lower surfaces;
the stanchion comprises a second end with a second threaded shaft configured to extend through the hole of the mounting plate; and the mounting device comprises a third threaded hole extending through the top surface and into the body, the third threaded hole configured to receive the second threaded shaft of the stanchion to secure the mounting plate to the mounting device between the second end of the stanchion and the top surface of the mounting device.

5. The mounting system of claim 1, wherein the mounting plate has an outer perimeter that extends away from the first side surface of the mounting device when the mounting plate is secured to the mounting device.

6. The mounting system of claim 1, wherein:
the first sidewall comprises:
   a first upper end that intersects the upper wall;
   a first free end spaced from the upper wall; and
   a first intermediate section between the first upper end and the first free end; and
the second sidewall comprises:
   a second upper end that intersects the upper wall, the second upper end separated from the first upper end by a first interior distance;
   a second free end spaced from the upper wall, the second free end separated from the first free end by a third interior distance; and
   a second intermediate section between the second upper end and the second free end, the second intermediate section separated from the first intermediate section by a second interior distance, wherein the first interior distance is greater than the second interior distance, and wherein the second interior distance is greater than the third interior distance.

7. The mounting system of claim 1, wherein the stanchion further comprises a body portion including:
the first end, wherein the first end is positionable within the stanchion receptacle of the clamp;
a first flat surface oriented approximately perpendicular to the first end; and
a second flat surface positioned opposite to the first flat surface, wherein the first threaded hole of the stanchion extends into at least a portion of the body portion between the first and second flat surfaces.

8. The mounting system of claim 1, wherein the upper wall further comprises:
a first edge; and
a second edge, wherein the first surface of the upper wall comprises:
   the medial section;
   a first edge section that extends from the medial section and away from the first reference plane to the first edge; and
   a second edge section that extends from the medial section away from the first reference plane to the second edge.

9. The mounting system of claim 1, wherein, when the clamp is secured to the stanchion by the clamping fastener:
a first free end of the first sidewall of the clamp is positioned between the upper wall of the clamp and the mounting plate; and
a distance between the second surface of the clamp and the upper surface of the mounting plate decreases as the clamping fastener is rotated to advance the first threaded shaft of the clamping fastener into the first threaded hole of the stanchion.

10. The mounting system of claim 1, wherein:
the first sidewall extends a first sidewall length to a first free end and comprises a first outer surface;
the second sidewall extends a second sidewall length to a second free end and comprises a second outer surface;
the first outer surface is separated from the second outer surface by a first outer distance proximate the upper wall; and
the first outer surface is separated from the second outer surface by a second outer distance proximate to the first and second free ends, the first outer distance being greater than the second outer distance.

11. A mounting system selectively engageable to a standing seam extending from a surface of a building, comprising:
a mounting plate comprising an upper surface and a lower surface;
a stanchion comprising a body portion extending away from the upper surface, the body portion comprising:
   a first end spaced from the upper surface by a first stanchion length; and
   a first threaded aperture extending through the first end into the body portion;
a clamp comprising:
   an upper wall with an aperture therein and a first surface that defines a first reference plane, wherein no portion of the clamp intersects the first reference plane;
   a first sidewall extending from the upper wall to a first free end, the first sidewall comprising a first exterior surface and a first intermediate section between the upper wall and the first free end; and
   a second sidewall extending from the upper wall to a second free end, the second sidewall comprising a second exterior surface and a second intermediate section between the upper wall and the second free end, wherein the second exterior surface is spaced from the first exterior surface by a first outer distance proximate to the upper wall, wherein the second exterior surface is spaced from the first exterior surface by a second outer distance at the first and second intermediate sections, the second outer distance being less than the first outer distance, and wherein the second exterior surface is spaced from the first exterior surface by a third outer distance proximate to the first and second free ends, the third outer distance being less than the second outer distance;
a stanchion receptacle defined between the first and second sidewalls of the clamp; and
a clamping fastener configured to extend through the aperture of the clamp and threadably engage the first threaded aperture of the stanchion to secure the clamp to the stanchion; and
a mounting device, comprising:
   a top surface to support the lower surface of the mounting plate;
   a first side surface;
   a slot to receive the standing seam extending from the surface of the building; and
   a second threaded aperture extending through the first side surface to the slot, the second threaded aperture configured to receive a seam fastener to engage the standing seam in the slot.

12. The mounting system of claim 11, wherein the mounting plate further comprises:
a hole;
an outer annulus;

an inner annular projection surrounding the hole and that extends above the outer annulus to a first height;

an outer annular projection surrounding the inner annular projection and that extends above the outer annulus to a second height that is less than the first height; and a plurality of ribs that extend radially from the hole, wherein the plurality of ribs extend between the inner annular projection and the outer annular projection; and wherein the stanchion further comprises a threaded shaft extending from the body portion that is configured to extend through the hole of the mounting plate and threadably engage a threaded aperture of the mounting device.

13. The mounting system of claim 11, wherein the upper wall of the clamp further comprises:

a second surface that defines a second reference plane, wherein the first and second sidewalls intersect the second reference plane;

a first end;

a second end opposite the first end;

a first edge extending from the first end to the second end; and a second edge extending from the first end to the second end, the first and second edges being closer to the second reference plane than to the first reference plane.

14. The mounting system of claim 11, wherein the first threaded aperture of the stanchion extends into at least a portion of the body portion between first and second flat surfaces.

15. The mounting system of claim 11, wherein:

the first sidewall of the clamp comprises a first inner surface;

the second sidewall of the clamp comprises a second inner surface;

a first interior distance separates the first inner surface from the second inner surface proximate to the upper wall;

a second interior distance separates the first inner surface from the second inner surface at the first and second intermediate sections, the second interior distance being less than the first interior distance; and a third interior distance separates the first inner surface from the second inner surface proximate to the first and second free ends, wherein the third interior distance is less than the second interior distance, and wherein the third interior distance is greater than a width of the stanchion.

16. The mounting system of claim 13, wherein the first sidewall is offset from the first edge by a first edge distance to form a first clamping section.

* * * * *